(12) United States Patent
Sawyer et al.

(10) Patent No.: US 12,070,726 B2
(45) Date of Patent: Aug. 27, 2024

(54) BEVERAGE CARBONATION SYSTEM

(71) Applicant: BONNE O INC., Toronto (CA)

(72) Inventors: Thomas Roy Sawyer, Toronto (CA); Eleu Thereus Tai Sung Um, Toronto (CA); Lukas Jeroen ten Kortenaar, Toronto (CA); Michael James Norman Matsumoto, Toronto (CA)

(73) Assignee: BONNE O INC., Toronto (CA)

( * ) Notice: Subject to any disclaimer, the term of this patent is extended or adjusted under 35 U.S.C. 154(b) by 0 days.

(21) Appl. No.: 18/381,311

(22) Filed: Oct. 18, 2023

(65) Prior Publication Data

US 2024/0042399 A1 Feb. 8, 2024

Related U.S. Application Data

(63) Continuation of application No. 17/967,010, filed on Oct. 17, 2022, now Pat. No. 11,845,045, which is a
(Continued)

(51) Int. Cl.
*B01F 23/2361* (2022.01)
*A23L 2/54* (2006.01)
(Continued)

(52) U.S. Cl.
CPC ............ *B01F 23/2361* (2022.01); *A23L 2/54* (2013.01); *B01F 23/237621* (2022.01); *B01F 2101/14* (2022.01)

(58) Field of Classification Search
CPC .................. A23L 2/54; B01F 23/2361; B01F 23/237621; B01F 2101/14
See application file for complete search history.

(56) References Cited

U.S. PATENT DOCUMENTS

| 565,922 A | 8/1896 | Prax |
|---|---|---|
| 1,577,235 A | 3/1926 | Hucks |

(Continued)

FOREIGN PATENT DOCUMENTS

| AU | 2011210627 B2 | 2/2014 |
|---|---|---|
| AU | 2013203669 B2 | 11/2014 |

(Continued)

OTHER PUBLICATIONS

Clippard Minimatic(R), Technical Data Bulletin dated Sep. 8: "Sub-Miniature 10 mm & 15 mm Valve Manifolds", 2018. 2 pages.
(Continued)

*Primary Examiner* — Anthony J Weier
(74) *Attorney, Agent, or Firm* — BERESKIN & PARR LLP/S.E.N.C.R.L., s.r.l.

(57) ABSTRACT

A beverage carbonator is included. The carbonator has a carbonator outlet, a carbonator inlet, and a fluid flow path extending between the carbonator outlet and the carbonator inlet. A carbonation chamber has a carbonation chamber gas outlet fluidly coupled to the fluid flow path and a carbonation chamber fluid inlet. A liquid reservoir is positioned upstream from the carbonation chamber fluid inlet. A flow valve is movable between a reservoir-connected position and a gas-recirculation position. A pump is fluidly coupled to the fluid flow path downstream of the flow valve.

8 Claims, 37 Drawing Sheets

Related U.S. Application Data continuation of application No. 16/433,041, filed on Jun. 6, 2019, now Pat. No. 11,529,594.

(60) Provisional application No. 62/768,015, filed on Nov. 15, 2018.

(51) Int. Cl.
*B01F 23/237* (2022.01)
*B01F 101/14* (2022.01)

(56) References Cited

U.S. PATENT DOCUMENTS

| | | |
|---|---|---|
| 1,587,320 A | 6/1926 | Hucks |
| 1,975,722 A | 10/1934 | Hucks |
| 2,102,920 A | 12/1937 | Savage |
| 2,205,147 A | 6/1940 | Madsen |
| 2,591,990 A | 4/1952 | Wisdom |
| 2,603,569 A | 7/1952 | Alther et al. |
| 2,742,363 A | 4/1956 | Hughes |
| 2,851,359 A | 9/1958 | Diller |
| 2,851,360 A | 9/1958 | Diller |
| 2,851,361 A | 9/1958 | Diller |
| 2,888,040 A | 5/1959 | Terwilliger et al. |
| 2,953,459 A | 9/1960 | Diller |
| 2,975,603 A | 3/1961 | Barnes et al. |
| D201,497 S | 6/1965 | Ninger |
| 3,241,977 A | 3/1966 | Mitchell et al. |
| 3,441,417 A | 4/1969 | Feldman et al. |
| 3,467,526 A | 9/1969 | Mitchell et al. |
| 3,476,520 A | 11/1969 | Hovey |
| 3,492,671 A | 1/1970 | Hovey |
| 3,556,803 A | 1/1971 | Ehrreich et al. |
| 3,576,644 A | 4/1971 | Anderson et al. |
| 3,667,962 A | 6/1972 | Fellenz et al. |
| D224,591 S | 8/1972 | Roberts |
| 3,687,684 A | 8/1972 | Wentworth et al. |
| D225,992 S | 1/1973 | Langauer |
| 3,723,614 A | 3/1973 | Langauer |
| D229,049 S | 11/1973 | Roberts |
| 3,881,636 A | 5/1975 | D'Aubreby |
| 3,888,998 A | 6/1975 | Sampson et al. |
| 3,926,342 A | 12/1975 | Selvia et al. |
| 3,992,493 A | 11/1976 | Whyte et al. |
| 4,007,134 A | 2/1977 | Liepa et al. |
| 4,009,285 A | 2/1977 | Spooner |
| 4,025,655 A | 5/1977 | Whyte et al. |
| 4,040,342 A | 8/1977 | Austin et al. |
| 4,110,255 A | 8/1978 | Liepa et al. |
| 4,123,390 A | 10/1978 | Sherman et al. |
| 4,147,808 A | 4/1979 | Liepa et al. |
| 4,186,215 A | 1/1980 | Buchel |
| 4,215,104 A | 7/1980 | David et al. |
| 4,251,473 A | 2/1981 | Gilbey |
| 4,285,977 A | 8/1981 | Yezek et al. |
| D260,477 S | 9/1981 | Jones |
| 4,316,409 A | 2/1982 | Adams et al. |
| 4,399,081 A | 8/1983 | Mabb |
| 4,399,744 A | 8/1983 | Ogden |
| 4,458,584 A | 7/1984 | Annese et al. |
| 4,460,612 A | 7/1984 | Saleeb et al. |
| 4,466,342 A | 8/1984 | Basile et al. |
| 4,475,448 A | 10/1984 | Shoaf et al. |
| 4,503,031 A | 3/1985 | Glassman |
| 4,520,950 A | 6/1985 | Jeans |
| RE32,142 E | 5/1986 | Meyers |
| 4,636,337 A | 1/1987 | Gupta et al. |
| 4,650,669 A | 3/1987 | Alexander et al. |
| 4,695,468 A | 9/1987 | Boston |
| 4,719,056 A | 1/1988 | Scott |
| 4,760,138 A | 7/1988 | So et al. |
| 4,760,865 A | 8/1988 | Rilett |
| D298,061 S | 10/1988 | Flury et al. |
| 4,785,973 A | 11/1988 | Kobe |
| 4,786,519 A | 11/1988 | Gupta |
| 4,854,343 A | 8/1989 | Rilett |
| 4,871,571 A | 10/1989 | Jensen et al. |
| 4,927,569 A | 5/1990 | Robinson |
| 4,999,140 A | 3/1991 | Sutherland et al. |
| 5,021,219 A | 6/1991 | Rudick et al. |
| 5,112,539 A | 5/1992 | Dietmar |
| 5,174,901 A | 12/1992 | Smith |
| 5,182,084 A | 1/1993 | Plester |
| 5,192,513 A | 3/1993 | Stumphauzer et al. |
| 5,226,450 A | 7/1993 | Lambourn |
| 5,260,081 A | 11/1993 | Stumphauzer et al. |
| 5,300,308 A | 4/1994 | Louridas |
| 5,325,765 A | 7/1994 | Sylvan et al. |
| 5,350,587 A | 9/1994 | Plester |
| 5,353,958 A | 10/1994 | Hawkins |
| 5,460,846 A | 10/1995 | Stumphauzer et al. |
| 5,549,037 A | 8/1996 | Stumphauzer et al. |
| 5,743,433 A | 4/1998 | Hawkins et al. |
| D404,231 S | 1/1999 | Woodring |
| 5,870,944 A | 2/1999 | Vander Zalm et al. |
| 5,918,768 A | 7/1999 | Ford |
| 6,102,212 A | 8/2000 | Strid |
| 6,113,080 A | 9/2000 | Kazuma |
| D440,650 S | 4/2001 | Hite et al. |
| D452,433 S | 12/2001 | Lazaris |
| 6,505,758 B2 | 1/2003 | Black et al. |
| 6,607,762 B2 | 8/2003 | Lazaris et al. |
| D485,942 S | 1/2004 | Mcleish |
| 6,814,990 B2 | 11/2004 | Zeng |
| D504,325 S | 4/2005 | Vovan |
| D505,335 S | 5/2005 | Grenda |
| 6,926,170 B2 | 8/2005 | Groesbeck |
| D515,880 S | 2/2006 | Lerner |
| D535,390 S | 1/2007 | Stawski et al. |
| 7,213,505 B2 | 5/2007 | Kollep |
| D560,492 S | 1/2008 | Markowicz et al. |
| D566,388 S | 4/2008 | Nevins |
| D586,397 S | 2/2009 | Farnworth et al. |
| D590,596 S | 4/2009 | Dretzka |
| D595,155 S | 6/2009 | Larson |
| D610,406 S | 2/2010 | Rauckman |
| D613,031 S | 4/2010 | Pawlowski et al. |
| 7,706,671 B2 | 4/2010 | Brown |
| D619,240 S | 7/2010 | Swagler et al. |
| D621,718 S | 8/2010 | Mehdizadeh |
| 7,798,055 B2 | 9/2010 | Mandralis et al. |
| D626,214 S | 10/2010 | Spengler |
| 7,838,056 B2 | 11/2010 | Forgac et al. |
| D633,341 S | 3/2011 | Smyers |
| D641,863 S | 7/2011 | Spengler |
| D641,864 S | 7/2011 | Spengler |
| 7,975,988 B2 | 7/2011 | Thomson et al. |
| D649,392 S | 11/2011 | Cahen |
| D655,165 S | 3/2012 | Jensen et al. |
| D666,051 S | 8/2012 | De Pr |
| D672,029 S | 12/2012 | Inoue |
| D687,662 S | 8/2013 | Beghelli |
| D687,664 S | 8/2013 | Beghelli |
| D707,790 S | 6/2014 | Beghelli |
| D707,791 S | 6/2014 | Beghelli |
| D711,621 S | 8/2014 | Hatherell |
| 8,808,775 B2 | 8/2014 | Novak et al. |
| D720,516 S | 1/2015 | Hatherell |
| D724,369 S | 3/2015 | Cahen |
| 8,985,561 B2 | 3/2015 | Hatherell |
| D728,987 S | 5/2015 | Cahen |
| D731,223 S | 6/2015 | Hatherell |
| D738,149 S | 9/2015 | Ye |
| D747,144 S | 1/2016 | Sun |
| D755,001 S | 5/2016 | Lintner |
| 9,505,510 B2 | 11/2016 | Hatherell |
| D779,257 S | 2/2017 | Hale |
| D796,885 S | 9/2017 | Wang |
| 9,790,076 B2 | 10/2017 | Novak et al. |
| 9,867,493 B2 | 1/2018 | Covey et al. |
| D812,952 S | 3/2018 | Fedorak et al. |
| 9,936,834 B2 | 4/2018 | Covey et al. |
| D840,733 S | 2/2019 | Hale |
| D853,166 S | 7/2019 | Koury et al. |

(56) References Cited

U.S. PATENT DOCUMENTS

| | | | |
|---|---|---|---|
| D853,167 S | 7/2019 | Koury et al. | |
| 10,343,885 B2 | 7/2019 | Novak et al. | |
| 10,456,757 B1 | 10/2019 | Blichmann | |
| D888,486 S | 6/2020 | Yang et al. | |
| 11,529,594 B2 | 12/2022 | Sawyer et al. | |
| 11,845,045 B1* | 12/2023 | Sawyer | B01F 23/2361 |
| 2002/0136816 A1 | 9/2002 | Kim | |
| 2003/0007923 A1 | 1/2003 | Copenhafer et al. | |
| 2003/0211204 A1 | 11/2003 | Fields et al. | |
| 2004/0185150 A1 | 9/2004 | Francis et al. | |
| 2004/0245279 A1 | 12/2004 | Bradley et al. | |
| 2005/0181108 A1 | 8/2005 | Kushner et al. | |
| 2006/0068064 A1 | 3/2006 | Richards | |
| 2006/0112831 A1 | 6/2006 | Greenwald et al. | |
| 2007/0012051 A1 | 1/2007 | Acton et al. | |
| 2007/0071808 A1 | 3/2007 | Janik et al. | |
| 2007/0175927 A1 | 8/2007 | Ozanne et al. | |
| 2008/0050500 A1 | 2/2008 | Muranishi et al. | |
| 2008/0115674 A1 | 5/2008 | Huang et al. | |
| 2008/0134902 A1 | 6/2008 | Zimmerman et al. | |
| 2009/0121364 A1 | 5/2009 | Scott | |
| 2009/0136632 A1 | 5/2009 | Gutwein et al. | |
| 2009/0219140 A1 | 9/2009 | Guard et al. | |
| 2009/0223375 A1 | 9/2009 | Verbeek | |
| 2009/0223895 A1 | 9/2009 | Zha et al. | |
| 2010/0003384 A1 | 1/2010 | Tacovone et al. | |
| 2010/0005088 A1 | 1/2010 | Zhang | |
| 2010/0018406 A1 | 1/2010 | Koopman et al. | |
| 2010/0024658 A1 | 2/2010 | Jacobs et al. | |
| 2010/0028495 A1 | 2/2010 | Novak et al. | |
| 2010/0034889 A1 | 2/2010 | Rau et al. | |
| 2010/0129490 A1 | 5/2010 | Williams et al. | |
| 2010/0166915 A1 | 7/2010 | Mathisen et al. | |
| 2010/0209582 A1 | 8/2010 | Wyss et al. | |
| 2010/0288131 A1 | 11/2010 | Kilber et al. | |
| 2011/0020500 A1 | 1/2011 | Eichler et al. | |
| 2011/0020508 A1 | 1/2011 | Santoiemmo | |
| 2011/0076361 A1 | 3/2011 | Peterson et al. | |
| 2011/0226343 A1 | 9/2011 | Novak et al. | |
| 2011/0244040 A1 | 10/2011 | Ono et al. | |
| 2012/0082769 A1 | 4/2012 | Singh | |
| 2012/0292790 A1 | 11/2012 | Tatera | |
| 2014/0004240 A1 | 1/2014 | Hatherell | |
| 2014/0065266 A1 | 3/2014 | Shalev | |
| 2014/0070431 A1 | 3/2014 | Hatherell | |
| 2014/0079856 A1 | 3/2014 | Hatherell | |
| 2014/0141078 A1 | 5/2014 | Slaboden | |
| 2014/0288495 A1 | 9/2014 | Olmos | |
| 2014/0331867 A1 | 11/2014 | Covey et al. | |
| 2014/0335239 A1 | 11/2014 | Covey et al. | |
| 2015/0342212 A1 | 12/2015 | Yang | |
| 2016/0106136 A1* | 4/2016 | Gordon | F28D 1/06 |
| | | | 426/477 |
| 2016/0318703 A1 | 11/2016 | Macias | |
| 2017/0280750 A1* | 10/2017 | Arnaud | A23L 27/72 |
| 2018/0057230 A1 | 3/2018 | Johnson | |
| 2018/0153331 A1 | 6/2018 | Covey et al. | |
| 2018/0289205 A1 | 10/2018 | Covey et al. | |
| 2019/0029291 A1 | 1/2019 | Singer | |
| 2019/0193928 A1 | 6/2019 | Broen et al. | |
| 2020/0146500 A1 | 5/2020 | Rice et al. | |

FOREIGN PATENT DOCUMENTS

| | | |
|---|---|---|
| AU | 2014202419 B2 | 11/2014 |
| AU | 2014274512 B2 | 4/2016 |
| AU | 2017204100 B2 | 5/2018 |
| AU | 2018220086 A1 | 9/2018 |
| CA | 1273285 A | 8/1990 |
| CA | 2443102 A1 | 10/2002 |
| CA | 3024818 A1 | 8/2011 |
| CA | 3007252 A1 | 2/2013 |
| CA | 2875899 A1 | 1/2014 |
| CA | 2933264 A1 | 8/2015 |
| CA | 2843889 C | 7/2018 |
| CA | 2788496 C | 1/2019 |
| CA | 181210 S | 2/2019 |
| CL | 2014000263 A1 | 6/2015 |
| CN | 201890460 U | 7/2011 |
| CN | 202067824 U | 12/2011 |
| CN | 102491398 A | 6/2012 |
| CN | 203634009 U | 6/2014 |
| CN | 104938758 A | 9/2015 |
| CN | 102843938 B | 1/2016 |
| CN | 103857617 B | 1/2016 |
| CN | 104887078 B | 11/2017 |
| DE | 202005009312 U1 | 11/2005 |
| DE | 102007001609 A1 | 7/2008 |
| EP | 40030 A2 | 11/1981 |
| EP | 1346760 A1 | 9/2003 |
| EP | 2341008 B1 | 4/2013 |
| EP | 2531080 B1 | 11/2014 |
| EP | 2786682 B1 | 12/2015 |
| EP | 2921087 B1 | 10/2016 |
| EP | 2739559 B1 | 3/2017 |
| ES | 2540244 T3 | 7/2015 |
| ES | 2563195 T3 | 3/2016 |
| ES | 2612103 T3 | 5/2017 |
| GB | 323102 A | 12/1929 |
| GB | 413220 A | 7/1934 |
| GB | 2059791 A | 4/1981 |
| GB | 2038953 B | 9/1982 |
| GB | 2117657 A | 10/1983 |
| GB | 2139910 B | 4/1987 |
| HK | 1213747 A1 | 7/2016 |
| HK | 1215519 A1 | 9/2016 |
| HK | 1216288 A1 | 11/2016 |
| HK | 1216289 A1 | 11/2016 |
| IN | 7583DELNP2012 A | 3/2014 |
| IN | 1599DELNP2014 A | 5/2016 |
| JP | 5766212 B2 | 8/2015 |
| JP | 6058079 B2 | 1/2017 |
| JP | 6058080 B2 | 1/2017 |
| JP | 6058744 B2 | 1/2017 |
| JP | 6129834 B2 | 5/2017 |
| KR | 101750003 B1 | 6/2017 |
| MX | 2012008857 A | 12/2012 |
| MY | 163441 A | 9/2017 |
| NZ | 620266 A | 12/2014 |
| NZ | 701776 A | 1/2015 |
| RU | 2600721 C2 | 10/2016 |
| TW | I583311 B | 5/2017 |
| TW | I610628 B | 1/2018 |
| WO | 9405407 A1 | 3/1994 |
| WO | 9405409 A1 | 3/1994 |
| WO | 9416579 A1 | 8/1994 |
| WO | 9825485 A2 | 6/1998 |
| WO | 2004072351 A1 | 8/2004 |
| WO | 2005079361 A2 | 9/2005 |
| WO | 2006002836 A1 | 1/2006 |
| WO | 2007103635 A1 | 9/2007 |
| WO | 2008124851 A1 | 10/2008 |
| WO | 2009114119 A1 | 9/2009 |
| WO | 2011094677 A2 | 8/2011 |
| WO | 2012162762 A1 | 12/2012 |
| WO | 2013019963 A2 | 2/2013 |
| WO | 2014000092 A1 | 1/2014 |
| WO | 2014033705 A2 | 3/2014 |
| WO | 2014131101 A1 | 9/2014 |
| WO | 2020084615 A1 | 4/2020 |

OTHER PUBLICATIONS

International Search Report and Written Opinion; International Application No. PCT/CA2013/000605; dated Oct. 1, 2013. 8 pages.

Vignesh Ramachandran, "SPRiZZi Drink Machine Is Like a Keurig for Soda"; Webpages from http://mashable.com/2013/05/02/sprizzi-drink-machine; Published May 2, 2013. 1 page.

Sprizzi Drink-Co; Webpages from http://www.sprizzidrink.com; Accessed Dec. 4, 2013. 28 pages.

Michael Breault; "Kickstarter: Drink Machine by SPRiZZi . . . The Ultimate Beverage Solution!"; Webpages from http://www.

(56) References Cited

OTHER PUBLICATIONS kickstartercom/projects/sprizzi/drink-machine-by-sprizzi-the-ultimate-beverage-sol.com; Earliest update noted in document: May 1, 2013. 33 pages.
Sprizzi Drink-Co.; Webpages archived from www.sprizzidrink.com, by the "Internet Archive Wayback Machine" at http://web.archive.org/web/20120615195921/http://www.sprizzidrink.com; Archive Date: Jun. 15, 2012. 3 pages.
Sodastream; Webpages from http://www.sodastream.ca/en/index.php; Accessed Dec. 4, 2013.
Wikipedia, "Sodastream"; Webpages from http://en.wikipedia.org/wiki/Sodastream; Modified Jun. 3, 2013; Accessed Jul. 18, 2013. 79 pages.
International Search Report and Written Opinion; International Application No. PCT/CA2013/001067; Dated Apr. 8, 2014. 11 pages.
Watson, Elaine; Green Mountain Coffee Roasters: 'Game-changing' Keurig 2.0 will tackle unlicensed K-Cup challenge; Dated Nov. 22, 2013; webpages from http://www.foodnavigator-usa.com/Manufacturers/Green-Mountain-Coffee-Roasters-Game-changing-Keurig-2.0-will-tackle-unlicensed-K-Cup-challenge. 4 pages.
Kelley, Brian; Sullivan, Kevin; Hartley, Kevin "Innovation Pipeline", KeurigTM Green MountainTM Investor Presentation; first accessed online Sep. 10, 2013 at http://investor.keuriggreenmountain.com/investorday.cfm. 29 pages.
Database GNPD [online] MINTEL; Oct. 1, 2003 (Oct. 1, 2003), "Paracetamol Effervescent Tablets", XP002762732, retrieved from http://www.gnpd.com/sinatra/recordpage/10150524/from_search/TsYLBEweAO/?page=1 Database accession No. 10150524 , 1 page.
Database GNPD [online] MINTEL; Apr. 1, 2012 (Apr. 1, 2012), "Pain & Fever Relief Tablets", XP002762733, retrieved from http://www.gnpd.com/sinatra/recordpage/1769935/from_search/qZyC5cU2Mf/?page=1 Database accession No. 1769935. 1 page.
International Search Report; PCT Application No. PCT/CA2019/051621, dated Feb. 12, 2020. 8 pages.
Elaine Watson, Stirz seeks to disrupt instant coffee market with dissolvable pods, Food navigator-USA.com, Mar. 1, 2020. 4 pages.

* cited by examiner

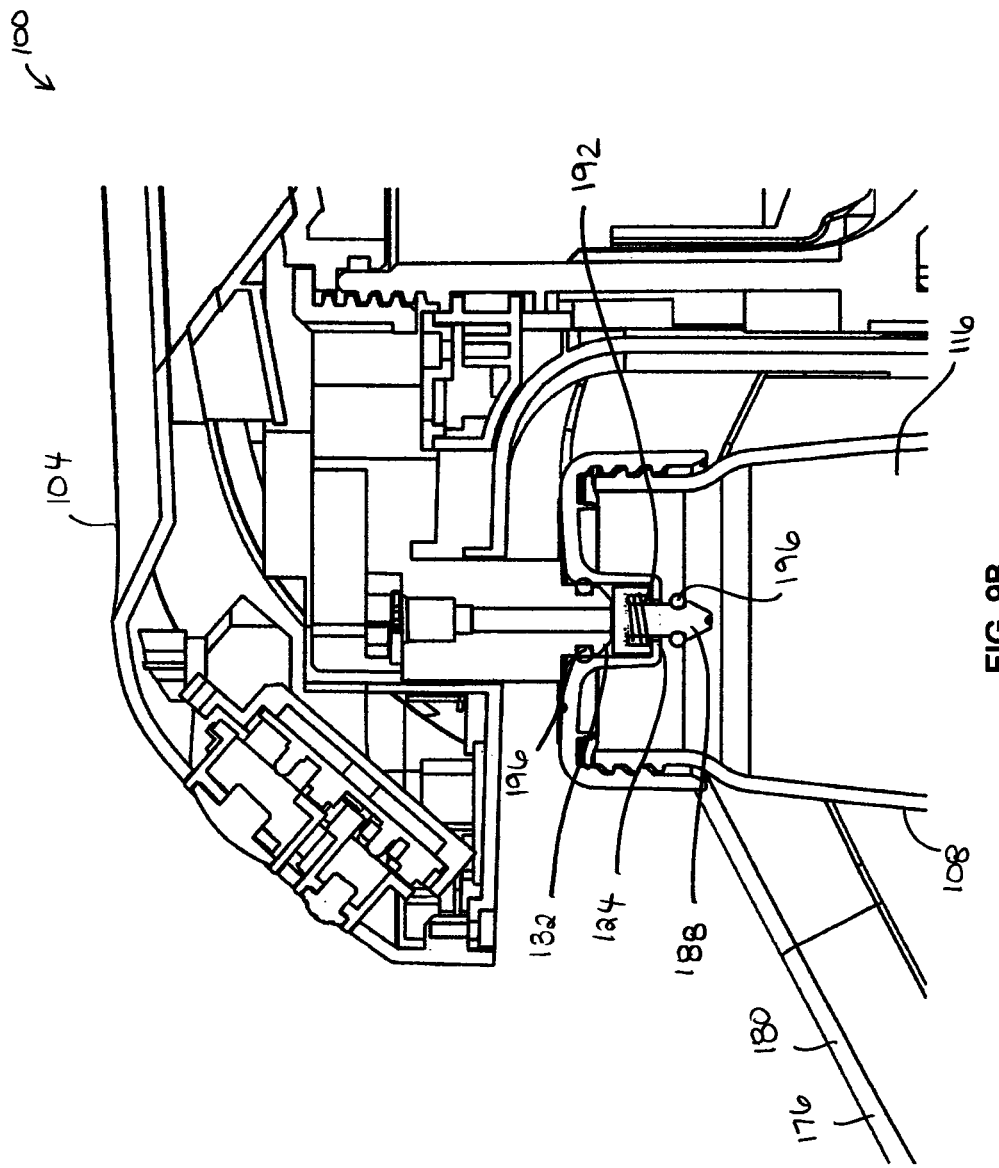

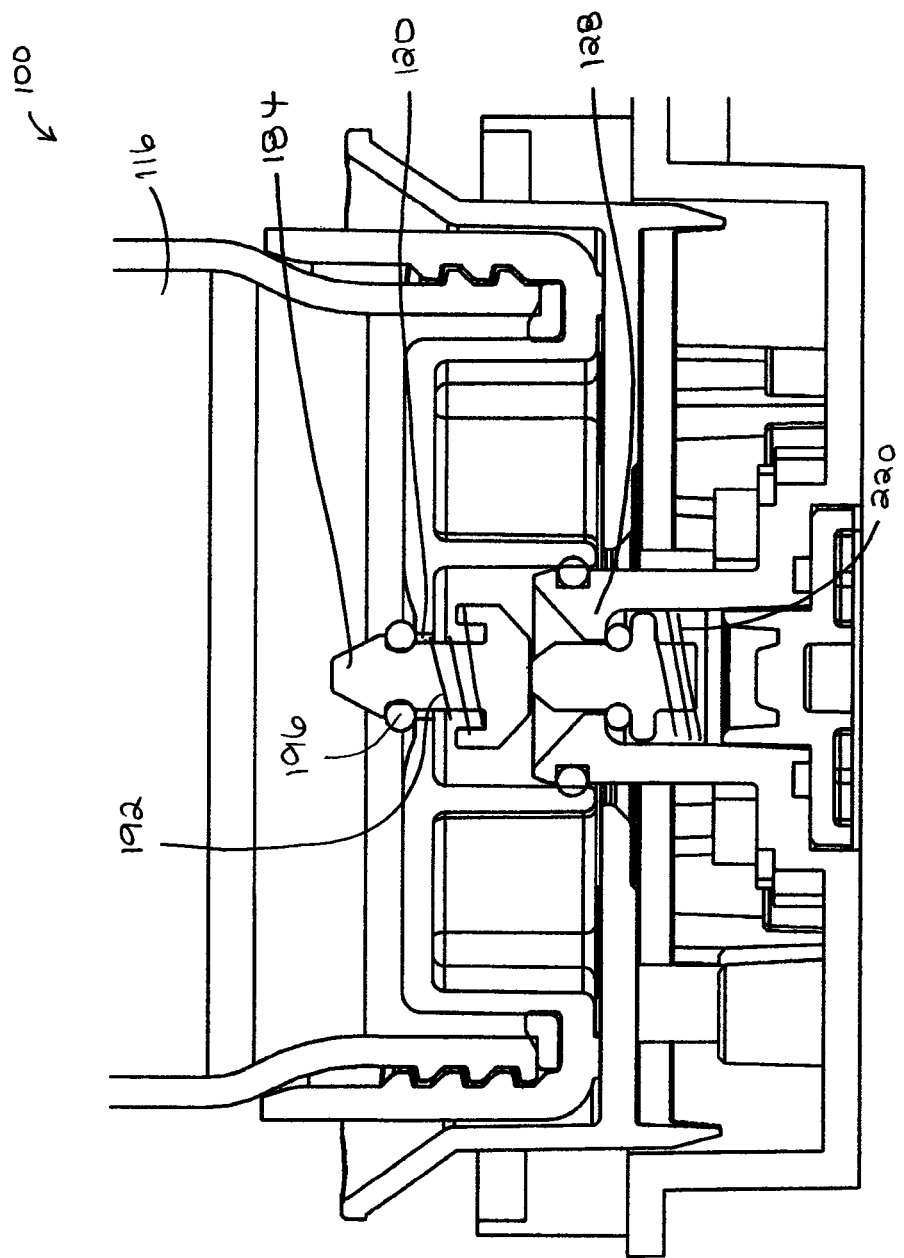

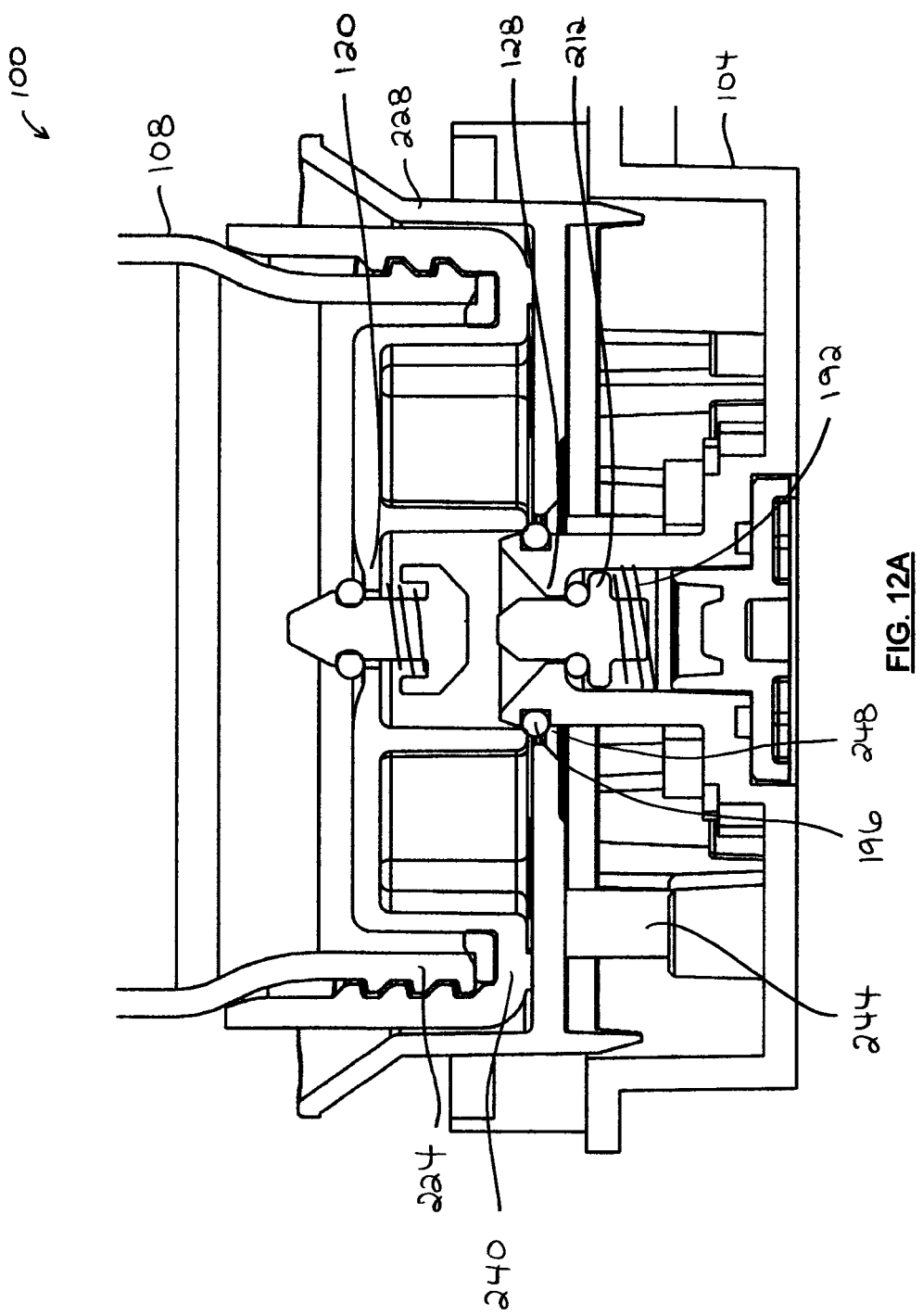

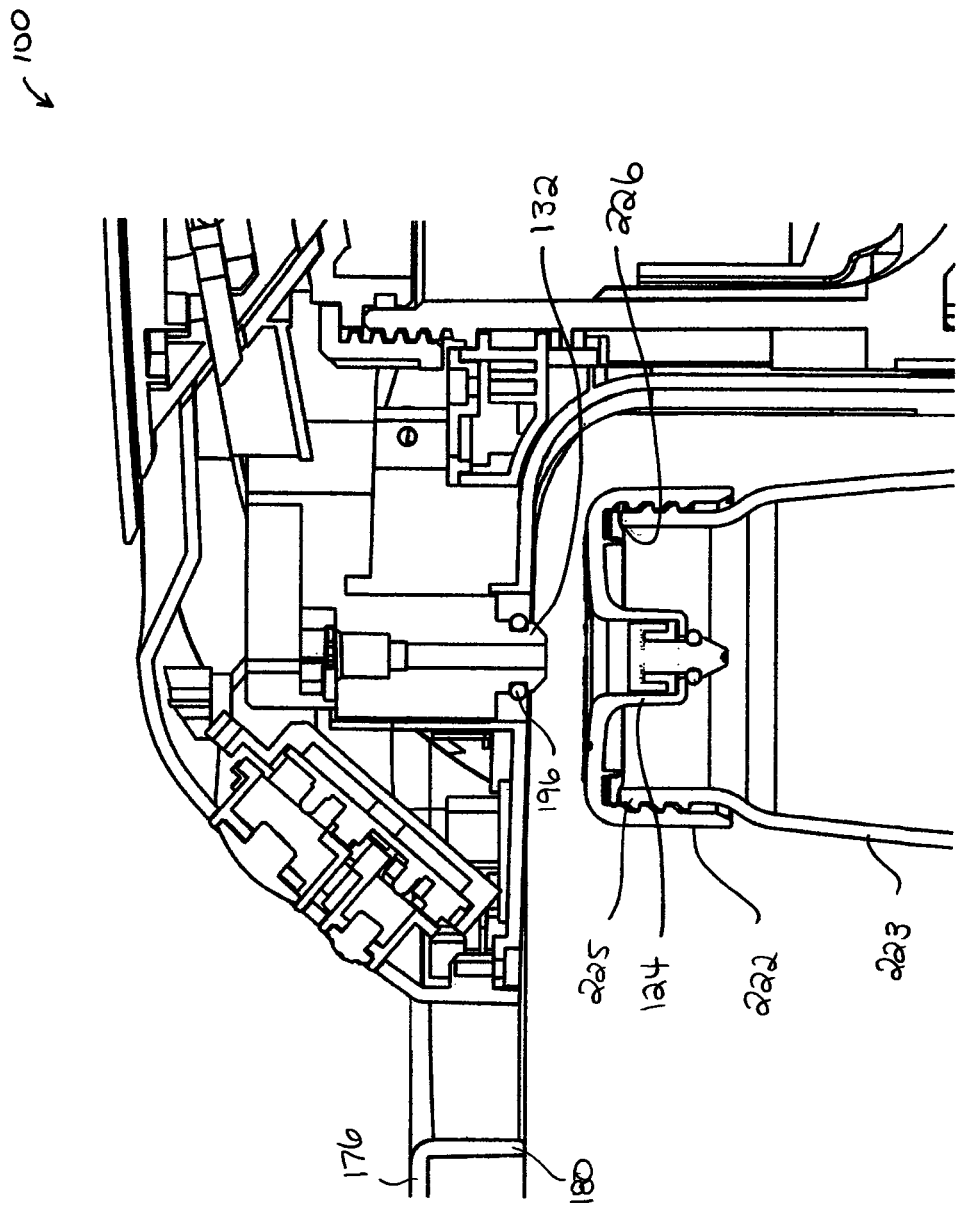

BEVERAGE CARBONATION SYSTEM

CROSS-REFERENCE TO RELATED APPLICATIONS

This application is a continuation of U.S. patent application Ser. No. 17/967,010, filed on Oct. 17, 2022, now U.S. Pat. No. 11,845,045, which is a continuation of Ser. No. 16/433,041, filed on Jun. 6, 2019, now U.S. Pat. No. 11,529,594, which claims the benefit of U.S. Provisional Application Ser. No. 62/768,015 filed Nov. 15, 2018, which are incorporated herein by reference in their entireties.

FIELD

This application relates to the field of beverage carbonation systems, beverage carbonators, and methods of carbonating a beverage.

INTRODUCTION

Carbonated beverages such as, for example, sodas and sparkling water are popular with consumers. Many carbonated beverages are prepared at a factory and shipped to stores, where consumers travel to purchase them. Each of the preparation, shipping, and travel may contribute to a higher cost per beverage for the consumer. Accordingly, it may be desirable to have a beverage carbonation system usable by a consumer in his/her home, for example. This may also be more convenient for a consumer.

DRAWINGS

FIGS. 9A-9B are partial cross-sectional views, each taken along line 7-7 in FIG. 2, with system 100 in a container engaged position;

FIGS. 11A-11B are partial cross-sectional views, each taken along line 7-7 in FIG. 2, with system 100 in a container sealed position;

FIGS. 12A-12B are partial cross-sectional views, each taken along line 7-7 in FIG. 2, with system 100 in a container disengaged position;

SUMMARY

Figure 2:
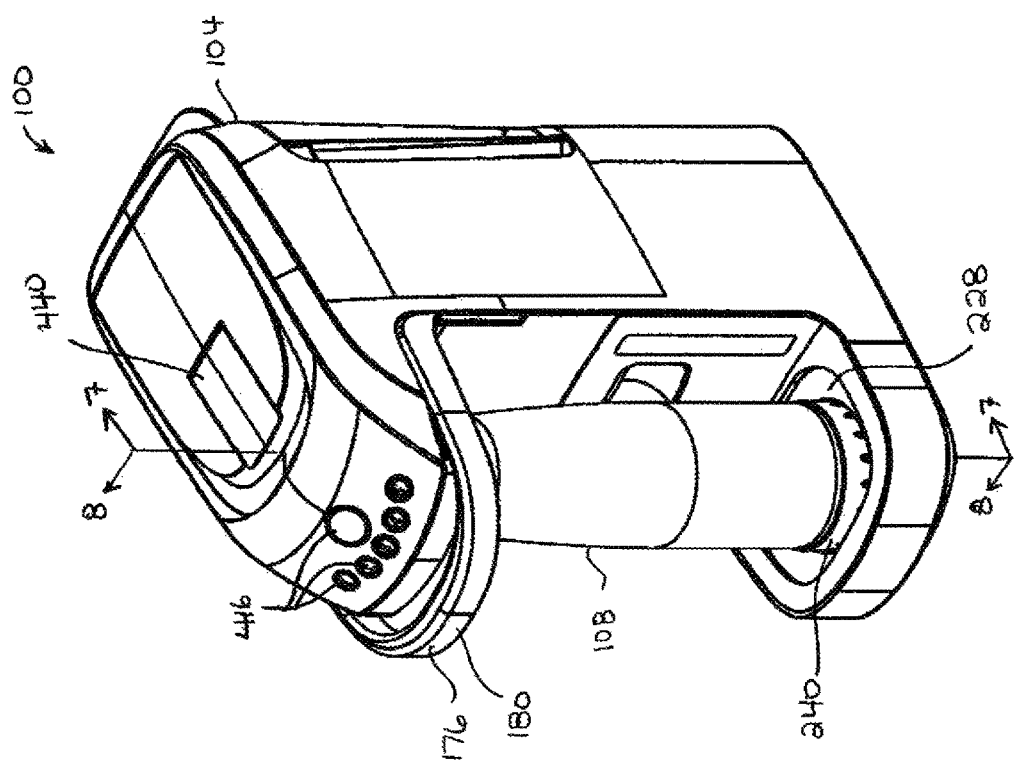
FIG. 2 is a perspective view of a beverage carbonation system, including the beverage carbonator of FIG. 1 and a beverage container, in accordance with an embodiment.

In one aspect, a method of carbonating a beverage is provided. The method may include:

(i) providing a beverage container connected to a beverage carbonator, the beverage container having a container inner volume, a carbonated beverage in the container inner volume, a container inlet valve, and a container outlet valve, the beverage carbonator having a carbonator outlet valve, a carbonator inlet valve, and a fluid flow path extending between the carbonator outlet valve and the carbonator inlet valve, wherein the container inlet valve and the carbonator outlet valve are both open and fluidly coupled to each other, and the container outlet valve is open and fluidly coupled to the carbonator inlet;

(ii) after (i), closing the carbonator outlet valve thereby retaining an above-atmospheric system pressure within the fluid flow path; and (iii) simultaneously with or after (ii), closing the container inlet valve and the container outlet valve to hermetically seal the container inner volume.

In another aspect, a beverage carbonation system is provided. The system may include a beverage container and a beverage carbonator. The beverage container may include a container inner volume, a container inlet valve, and a container outlet valve. The beverage carbonator may include a carbonator outlet valve, a carbonator inlet, a fluid flow path extending between the carbonator outlet valve and the carbonator inlet, and a user-operable container engagement actuator. When the beverage container is connected to the beverage carbonator, the container engagement actuator may be movable according to a disengagement sequence including, in order: (i) a container engaged position, in which the beverage container inlet valve and the carbonator outlet valve are both open and fluidly coupled to each other, and the container outlet valve is open and fluidly coupled to the carbonator inlet; (ii) a carbonator sealed position, in which the carbonator outlet valve is closed thereby sealing an above-atmospheric system pressure within the fluid flow path; and (iii) simultaneously with or after (ii), a container sealed position, in which the container inlet valve and the container outlet valve are closed thereby hermetically sealing the container inner volume.

In another aspect, a method of carbonating a beverage is provided. The method may include: pumping liquid from a reservoir across a flow valve to a carbonation chamber; generating carbon dioxide gas in the carbonation chamber from an aqueous solution including the pumped liquid and a carbonation source in the carbonation chamber; directing the generated carbon dioxide gas along a fluid flow path into contact with a beverage in a beverage container; toggling the flow valve in response to a system gas pressure exceeding a predetermined threshold, the flow valve when toggled fluidly disconnecting the reservoir from the pump and fluidly connecting the pump to the fluid flow path at a location downstream of the beverage container; and recirculating, using the pump, carbon dioxide gas exiting the beverage container back along the fluid flow path and back into the beverage container.

In another aspect, a beverage carbonator is provided. The beverage carbonator may include a carbonator outlet, a carbonator inlet, a fluid flow path, carbonation chamber, a liquid reservoir, a flow valve, and a pump. The fluid flow path may extend between the carbonator outlet and the carbonator inlet. The carbonation chamber may include a carbonation chamber gas outlet fluidly coupled to the fluid flow path, and a carbonation chamber fluid inlet. The liquid reservoir may be positioned upstream from the carbonation chamber fluid inlet. The flow valve may be movable between a reservoir-connected position and a gas-recirculation position. In the reservoir-connected position, the liquid reservoir may be fluidly connected to the carbonation chamber fluid inlet and the flow valve may inhibit gas flow from the carbonator inlet towards the carbonator outlet. In the gas-recirculation position, the flow valve may inhibit liquid flow from the liquid reservoir to the carbonation chamber fluid inlet and the carbonator inlet may be fluidly connected to the carbonator outlet. The pump may be fluidly coupled to the fluid flow path downstream of the flow valve.

In another aspect, a beverage carbonator is provided. The beverage carbonator may include a carbonation chamber having a carbonation source inlet, a fluid inlet, a gas outlet, and a carbonation source carrier. The carbonation source carrier may be positioned to receive carbonation source deposited into the carbonation chamber through the carbonation source inlet. The carbonation source carrier and the fluid inlet may be arranged to hold carbonation source carried on the carbonation source carrier apart from liquid admitted into the carbonation chamber through the fluid inlet until a predetermined volume of liquid has accumulated in the carbonation chamber.

In another aspect, a method of generating carbon dioxide gas for a beverage is provided. The method may include depositing carbonation source through a carbonation source inlet of a carbonation chamber onto a carbonation source carrier within the carbonation chamber; delivering a predetermined volume of liquid through a carbonation chamber fluid inlet into the carbonation chamber, the predetermined volume of liquid accumulating in the carbonation chamber without contacting the carbonation source; and continuing to delivering liquid through the carbonation chamber fluid inlet into the carbonation chamber, the liquid contacting the carbonation source whereby carbon dioxide is generated.

Description of Various Embodiments

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a first element is said to be 'communicatively coupled to' or 'communicatively connected to' or 'connected in communication with' a second element where the first element is configured to send or receive electronic signals (e.g. data) to or from the second element, and the second element is configured to receive or send the electronic signals from or to the first element. The communication may be wired (e.g. the first and second elements are connected by one or more data cables), or wireless (e.g. at least one of the first and second elements has a wireless transmitter, and at least the other of the first and second elements has a wireless receiver). The electronic signals may be analog or digital. The communication may be one-way or two-way. In some cases, the communication may conform to one or more standard protocols (e.g. SPI, $I^2C$, Bluetooth™, or IEEE™ 802.11).

As used herein and in the claims, two components are said to be "fluidly connected" or "fluidly coupled" where the two components are positioned along a common fluid flow path. "Fluid" refers to liquid and/or gas. The fluid connection may be formed in any manner that can transfer fluids between the two components, such as by a fluid conduit which may be formed as a pipe, hose, channel, or bored passageway. One or more other components can be positioned between the two fluidly coupled components. Two components described as being "downstream" or "upstream" of one another, are by implication fluidly connected.

As used herein and in the claims, a group of elements are said to 'collectively' perform an act where that act is performed by any one of the elements in the group, or performed cooperatively by two or more (or all) elements in the group.

Some elements herein may be identified by a part number, which is composed of a base number followed by an alphabetical or subscript-numerical suffix (e.g. $112a$, or $112_1$). Multiple elements herein may be identified by part numbers that share a base number in common and that differ by their suffixes (e.g. $112_1$, $112_2$, and $112_3$). All elements with a common base number may be referred to collectively or generically using the base number without a suffix (e.g. 112).

Figure 1:
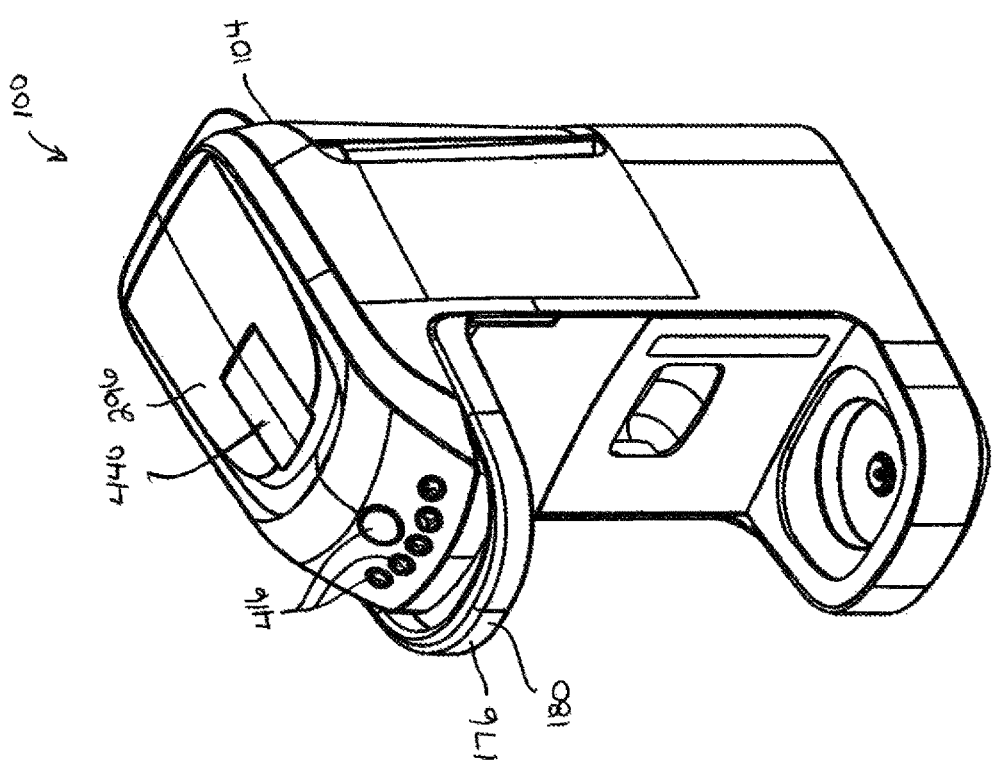
FIG. 1 is a perspective view of a beverage carbonator in accordance with an embodiment.

Reference is first made to FIGS. 1-2. Embodiments herein relate to a beverage carbonation system 100 including a beverage carbonator 104 and a beverage container 108. In use, the beverage container 108 can be filled with a liquid beverage (e.g. water, juice, alcoholic drink, etc.), the beverage container 108 connected to the beverage carbonator 104, and the beverage carbonator 104 activated to carbonate the beverage. In the result, the beverage container 108 holds a carbonated liquid beverage.

In some embodiments, the beverage carbonation system 100 may carbonate the beverage in-situ within the beverage container 108. That is, the beverage may at all times remain in the beverage container 108 from the time the beverage container 108 is connected to the beverage carbonator 104 until the beverage container 108 is removed from the beverage carbonator 104. As compared with a system that moves the beverage into the beverage carbonator, this can avoid the beverage spoiling a fluid flow path in the beverage carbonator, such as may occur with a juice or sugary drink beverage, which can form a sticky residue when dried. In some cases, such spoiling can cause damage to the beverage carbonator, contaminate subsequently carbonated beverages, and/or require time consuming maintenance (e.g. flushing the beverage carbonator with a cleaning agent).

Alternatively or in addition to carbonating beverages in-situ within beverage container 108, beverage carbonator 104 may retain an above-atmospheric system pressure after the beverage is carbonated. The above-atmospheric system pressure may be vented through a carbonation chamber byproduct outlet to evacuate the carbonation chamber of byproduct produced by the reaction that generated the carbon dioxide gas. The evacuated byproduct may collect in an emptyable (e.g. removable) byproduct container. This design allows use of the system pressure remaining after carbonation is complete to clear byproduct from the carbonation chamber, thereby reducing or eliminating any need for users to access and clean the carbonation chamber. In the result, beverage carbonation system 100 may require less maintenance and therefore provide more convenience to users. Users are more likely to use beverage carbonation system 100 frequently if doing so involves less time and effort.

Alternatively or in addition to carbonating beverages in-situ within beverage container 108, and alternatively or in addition to using an above-atmospheric system pressure to evacuate byproduct from the carbonation chamber, beverage carbonator 104 may be configured with a beverage carbonator that accumulates a predetermined minimum volume of liquid (e.g. water) from the liquid reservoir before that liquid makes contact with the carbonation source (e.g. powdered mixture of sodium bicarbonate and citric acid). Upon contact, the liquid and carbonation source form an aqueous mixture in which a reaction takes place, which produces carbon dioxide gas. However, where very little liquid is present in the carbonation chamber at the time the reaction takes place, a premature rise in system pressure may trigger the delivery of liquid into the carbonation chamber before there is sufficient liquid for a complete reaction of the carbonation source. Embodiments disclosed herein may mitigate this by collecting at least a predetermined minimum volume of liquid in the carbonation chamber prior to initiating the reaction.

Alternatively or in addition to carbonating beverages in-situ within beverage container 108, alternatively or in addition to using an above-atmospheric system pressure to evacuate byproduct from the carbonation chamber, and alternatively or in addition to providing a carbonation chamber that collects a predetermined minimum volume of liquid before initiating a reaction, beverage carbonator 104 may be configured to cease delivering liquid from the liquid reservoir to the carbonation chamber in response to achieving a predetermined minimum system gas pressure. The amount of liquid (e.g. water) from the liquid reservoir required to completely react the carbonation source in the carbonation chamber may depend on the amount of carbonation source deposited into the carbonation chamber, the formulation of the carbonation source used, and/or the manner in which the carbonation source is deposited into the carbonation chamber. Waiting until the system gas pressure reaches at least a predetermined minimum pressure before stopping the addition of liquid into the carbonation chamber may ensure that there is sufficient liquid for a complete reaction of the carbonation source.

Alternatively or in addition to carbonating beverages in-situ within beverage container 108, alternatively or in addition to using an above-atmospheric system pressure to evacuate byproduct from the carbonation chamber, alternatively or in addition to providing a carbonation chamber that collects a predetermined minimum volume of liquid before initiating a reaction, and alternatively or in addition to providing a beverage carbonator that ceases delivering liquid from the liquid reservoir to the carbonation chamber in response to achieving a predetermined minimum system gas pressure, beverage carbonator 104 may be configured to begin recirculating gas in response to achieving predetermined minimum system gas pressure. For example, the pump may be reconfigured from drawing liquid to recirculate gas exiting the beverage container after a predetermined minimum system gas pressure is achieved. This allows the system gas pressure upstream and downstream of the pump to normalize. This may reduce the pressure drop across the pump, which reduces strain on the pump. Moreover, elevated system gas pressure contributes to keeping the reaction in the carbonation chamber acquiescent. By delaying gas recirculation, the system gas pressure can rise quickly, and therefore quickly calm the reaction in the carbonation chamber, which mitigates the aqueous mixture becoming entrained in the gas flow and mixing into the beverage.

As used herein, a carbonation source (also referred to as a "carbon dioxide source") may be any substance that when in an aqueous mixture, alone or in combination with other reactant(s) in the aqueous mixture, reacts to produce carbon dioxide gas. The carbonation source may be, for example an acid, a carbonate, or an acid mixed with a carbonate, in wet or dry form (e.g. monolithic or powdered), homogenously mixed or separated. In some cases, a solid material carbonation source is a mixture of sodium bicarbonate and citric acid, a mixture of potassium bicarbonate and citric acid, or combinations thereof. In this case, the liquid may include water. Sodium bicarbonate and citric acid are advantageous for use with water because the reaction does not create heat. This may be desirable for producing a cooled carbonated beverage. Moreover, a dry citric acid and sodium bicarbonate mixture may be relatively inexpensive, non-toxic, easy to handle, capable of pre-mixing (e.g. when used in powdered or tablet form).

The liquid referred to herein is any liquid-phase substance that when mixed with carbonation source in the carbonation chamber, produces an aqueous mixture in which a reaction takes place that generates carbon dioxide. In some cases, a liquid may be water. In some cases, the liquid may include a carbonate or may include an acid. For example, the liquid may include water mixed with sodium bicarbonate, or potassium bicarbonate, or citric acid. In other examples, the liquid may be an acidic juice (e.g. fruit juice). The bicarbonate or acid in the liquid may mix with the acid or bicarbonate in the carbonation chamber to form an aqueous mixture that includes both the acid and the bicarbonate, which react to produce carbon dioxide gas.

FIGS. 3-6 schematically illustrates a sequence of system states in the operation of system 100 to carbonate a beverage 112, in accordance with an embodiment. As shown, beverage container 108 (e.g. a bottle), may include an inner volume 116 (also referred to as "beverage chamber 116") holding beverage 112, a container inlet 120 (also referred to as "gas inlet 120") to admit gas (e.g. carbon dioxide gas) into inner volume 116, and a container outlet 124 (also referred to as "gas outlet 124") to discharge gas (e.g. carbon dioxide gas) from inner volume 116.

Beverage carbonator 104 may include a carbonator outlet 128 (also referred to as "gas outlet 128") to discharge gas from beverage carbonator 104 into container inlet 120, a carbonator inlet 132 (also referred to as "gas inlet 132") to receive gas from container outlet 124 into carbonator 104, a carbonator fluid flow path 136 extending between carbonator inlet 132 and carbonator outlet 128, a carbonation chamber 140 where carbon dioxide gas is generated (also referred to as the "carbon dioxide generation chamber"), a liquid reservoir 144 for supplying liquid 146 (e.g. water) to carbonation chamber 140, a pump 148 to move liquid from liquid reservoir 144 into carbonation chamber 140 and to recirculate gas from carbonator inlet 132 to carbonator outlet 128, and a flow valve 152 to fluidly connect pump 148 to liquid reservoir 144 or to carbonator inlet 132 in different system states. Carbonation chamber 140 is shown having a byproduct outlet 156 to a byproduct container 160.

In some embodiments, beverage carbonator 104 includes an electronic control system with an electronic controller 388. The electronic control system may include one or more inputs (e.g. user inputs) and outputs (e.g. valves, relays, switches, or pumps) that are communicatively coupled to electronic controller 388 and operated by control signals from electronic controller 388. For example, electronic controller 388 may determine the timing of events (e.g. activation of flow valve 152 and pump 148) based on a carbonation program stored in memory. In some cases, electronic controller 388 is responsive to inputs from, e.g. user inputs 416. For example, a user may manipulate user inputs 416 to direct the operation of electronic controller 388 (e.g. to select a carbonation level, start a carbonation cycle, or stop a carbonation cycle).

Figure 35:
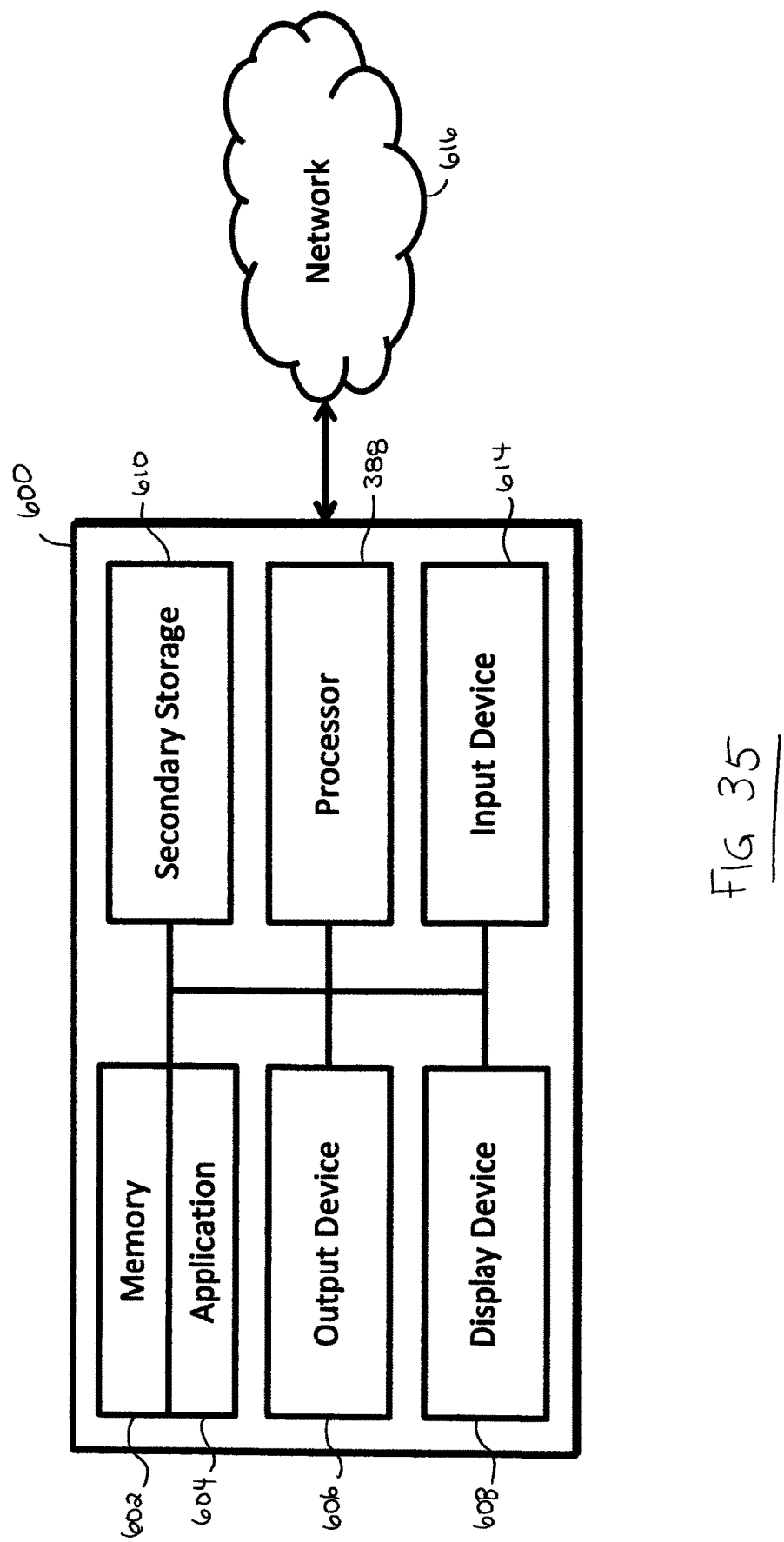
FIG. 35 is a schematic illustration of an electronic control system of the beverage carbonator of FIG. 1.

FIG. 35 shows an exemplary electronic control system 600 in accordance with an embodiment. As shown, electronic control system 600 may include a connection with a network 616 such as a wired or wireless connection to the Internet or to a private network. In some cases, network 616 includes other types of computer or telecommunication networks.

In the example shown, device 600 includes a memory 602, an application 604, an output device 606, a display device 608, a secondary storage device 610, a processor 388, and an input device 614. In some embodiments, device 600 includes multiple of any one or more of memory 602, application 604, output device 606, display device 608, secondary storage device 610, processor 388, and input device 614. In some embodiments, device 600 does not include one or more of applications 604, second storage devices 610, network connections, input devices 614, output devices 606, and display devices 608.

Memory 602 can include random access memory (RAM), read only memory (ROM), or similar types of memory. Also, in some embodiments, memory 602 stores one or more applications 604 for execution by processor 388. Applications 604 correspond with software modules including computer executable instructions to perform processing for the functions and methods described below (e.g. one or more carbonation programs). Secondary storage device 610 can include a hard disk drive, floppy disk drive, CD drive, DVD drive, Blu-ray drive, solid state drive, flash memory or other types of non-volatile data storage.

In some embodiments, device 600 stores information in a remote storage device, such as cloud storage, accessible across a network, such as network 616 or another network. In some embodiments, device 600 stores information distributed across multiple storage devices, such as memory 602 and secondary storage device 610 (i.e. each of the multiple storage devices stores a portion of the information and collectively the multiple storage devices store all of the information). Accordingly, storing data on a storage device as used herein and in the claims, means storing that data in a local storage device, storing that data in a remote storage device, or storing that data distributed across multiple storage devices, each of which can be local or remote.

Generally, processor 388 can execute computer readable instructions (also referred to as applications or programs). The computer readable instructions can be stored in memory 602 or in secondary storage 610, or can be received from remote storage accessible through network 616, for example. When executed, the computer readable instructions can configure the processor 388 (or multiple processors 388, collectively) to perform the acts described herein with reference to beverage carbonator 104 (FIG. 3), for example.

Input device 614 can include any device for entering information into device 600. For example, input device 614 can be a keyboard, key pad, button, switch, cursor-control device, touch-screen, camera, or microphone. Input device 614 can also include input ports and wireless radios (e.g. Bluetooth®, or 802.11x) for making wired and wireless connections to external devices (e.g. for sending control signals, such as user selections, to processor 388 from a smartphone or tablet).

Display device 608 can include any type of device for presenting visual information. For example, display device 608 can be a computer monitor, a flat-screen display, a projector, or a display panel (e.g. OLED or TFT display panel).

Output device 606 can include any device for outputting data, such as for example speakers. In at least one embodiment, output device 606 includes one or more of output ports and wireless radios (e.g. Bluetooth®, or 802.11x) for making wired and/or wireless connections to external devices (e.g. for sending alerts, such as a carbonation complete notification or error notification to a user's smartphone).

FIG. 35 illustrates one example hardware schematic of a device 600. In alternative embodiments, device 600 contains fewer, additional or different components. In addition, although aspects of an implementation of device 600 are described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM.

Figure 3:
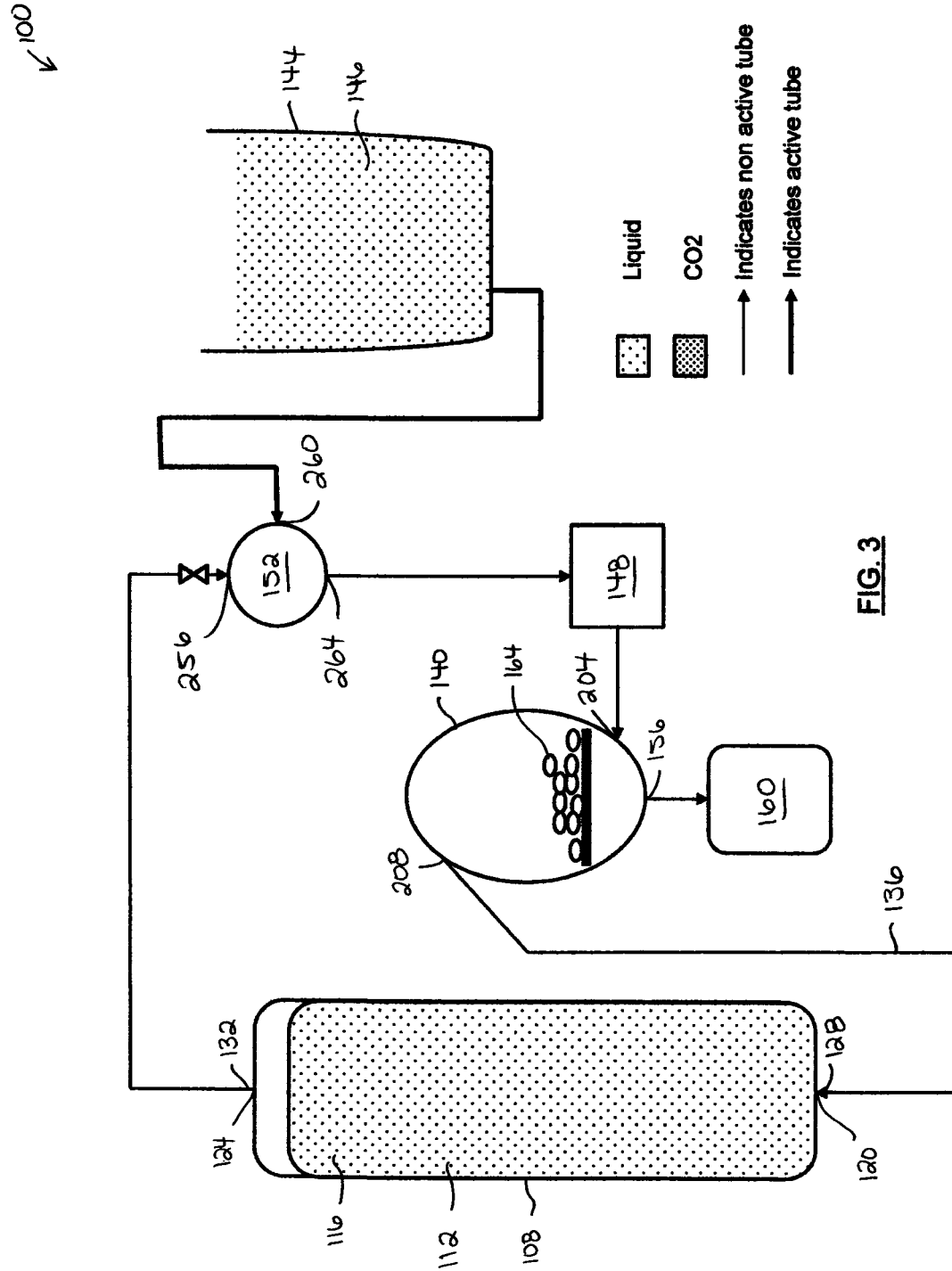
FIG. 3 is a schematic illustration of the beverage carbonation system of FIG. 2, in a container connected state.

FIG. 3 shows a system state ("container connected state") in which beverage container 108 is connected to beverage carbonator 104, prior to initiating carbonation of beverage 112. As shown, beverage container inlet 120 and carbonator outlet 124 are fluidly coupled, and container outlet 124 and carbonator inlet 132 are fluidly coupled. Carbonation source 164 (e.g. powdered mixture of sodium bicarbonate and citric acid) is shown deposited into carbonation chamber 140. Flow valve 152 is shown fluidly connecting liquid reservoir 144 to pump 148, and fluidly disconnecting gas flow along fluid flow path 136 from carbonator inlet 132 to carbonator outlet 128. Byproduct outlet 156 is closed and pump 148 is deactivated (i.e. not moving fluid).

Figure 4:
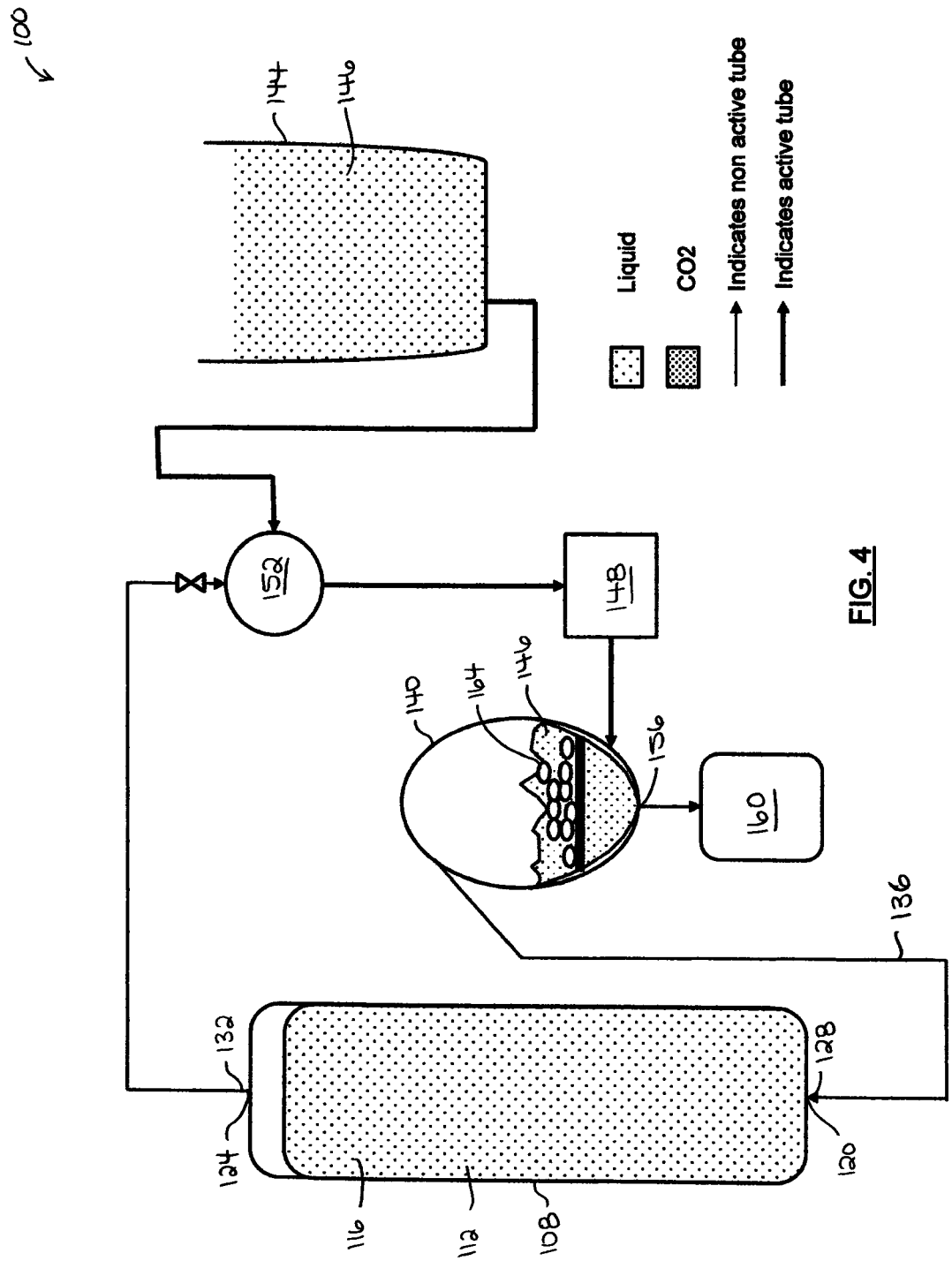
FIG. 4 is a schematic illustration of the beverage carbonation system of FIG. 2, in a reservoir draw state.

FIG. 4 shows a system state ("reservoir draw state") shortly after activating beverage carbonator 104. As compared with the state of FIG. 3, pump 148 is activated and moving liquid 146 from reservoir 144 into carbonation chamber 140 to form an aqueous mixture with carbonation source 164, in which a reaction will take place and generate carbon dioxide gas. The generated carbon dioxide gas may flow from carbonation chamber 140 through beverage container 108 and back into fluid flow path 136 at carbonator inlet 132. Flow valve 152 is shown closing fluid flow path 136 upstream of carbonation chamber 140, which inhibits the carbon dioxide gas that has re-entered carbonator inlet 132 from recirculating back into beverage container 108. In alternative embodiments, the generated carbon dioxide gas remains in beverage carbonator 104 and does not enter beverage container 108 at all during the reservoir draw state.

Figure 5:
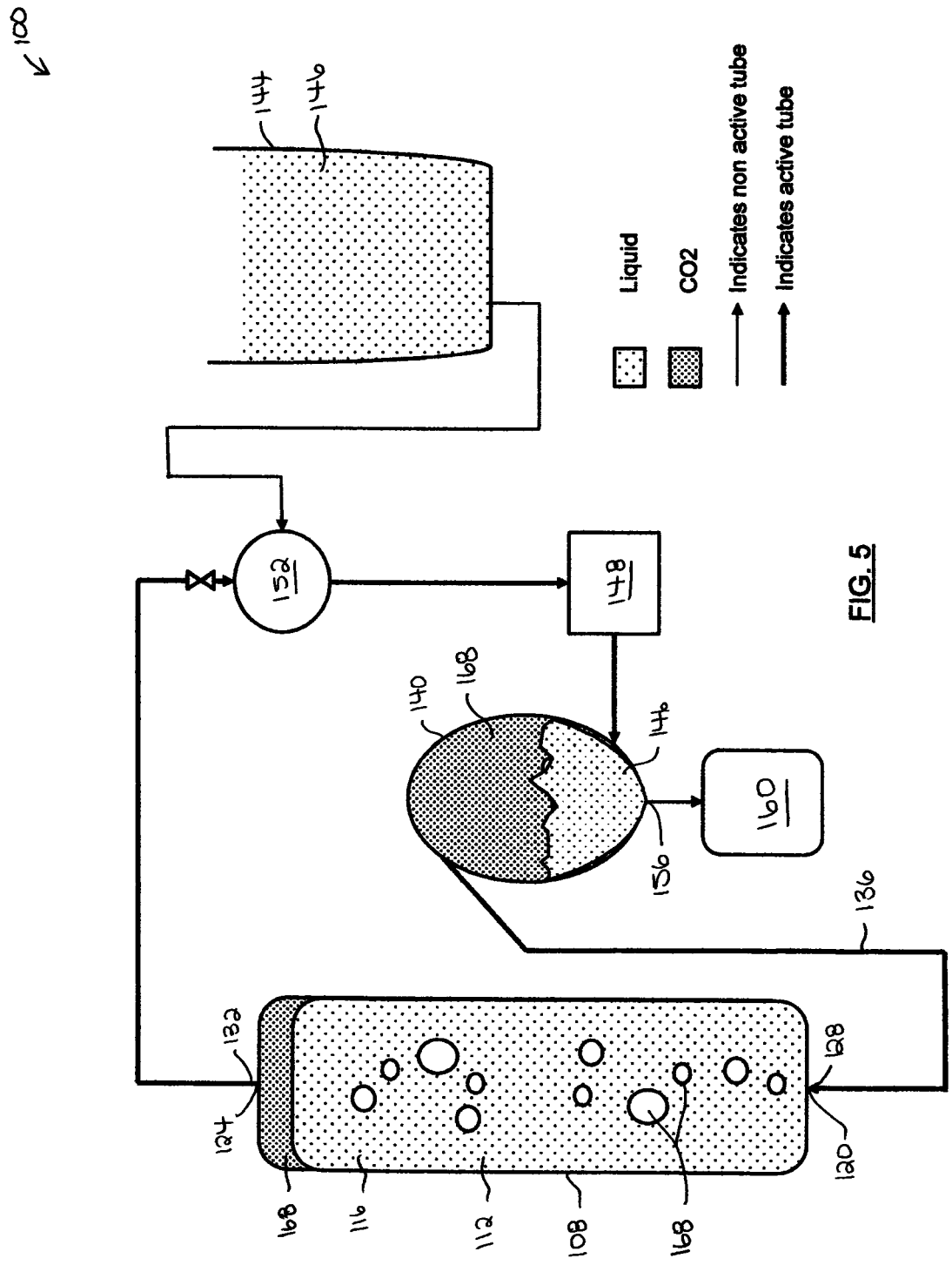
FIG. 5 is a schematic illustration of the beverage carbonation system of FIG. 2, in a gas recirculation state.

FIG. 5 shows a system state ("gas recirculation state") shortly after carbon dioxide gas 168 has been generated by the reaction in the aqueous mixture of liquid 146 and carbonation source 164 (FIG. 4) in carbonation chamber 140. As compared with the state of FIG. 4, flow valve 152 is fluidly disconnecting pump 148 from liquid reservoir 144, and fluidly connecting pump 148 to carbonator inlet 132. As shown, pump 148 is activated and moving carbon dioxide gas 168 generated in carbonation chamber 140 into beverage container 108 via carbonator outlet 128 and container inlet 132. The carbon dioxide gas 168 exits container outlet 124 into carbonator inlet 132 after contacting beverage 112. Pump 148 recirculates the carbon dioxide gas 168 entering carbonator inlet 132 back into beverage container 108 through carbonator outlet 128 and container inlet 120. The illustrated state may continue for a duration (e.g. 1 to 5 minutes) sufficient to absorb a target concentration of carbon dioxide into beverage 112. Beverage carbonation system 100 may permit the user to control the level of carbonation in the final beverage 112. In general, a shorter duration (e.g. 1 to 2 minutes) of recirculation may produce a less carbonated beverage 112, and a longer duration (e.g. 3 to 5 minutes) of recirculation may produce a more carbonated beverage 112. Alternatively or in addition, the level of carbonation in the final beverage 112 may be varied by the amount and composition of carbonation source 164 originally deposited into the carbonation chamber 140. For example, by mass, sodium bicarbonate can generate a greater volume of carbon dioxide than potassium bicarbonate. Moreover, the quality of carbonation may be varied by the composition of carbonation source 164 deposited into the carbonation chamber 140. For example, as compared to sodium bicarbonate, potassium bicarbonate generates carbon dioxide that when absorbed into the beverage 112 have a softer mouth-feel.

Figure 6:
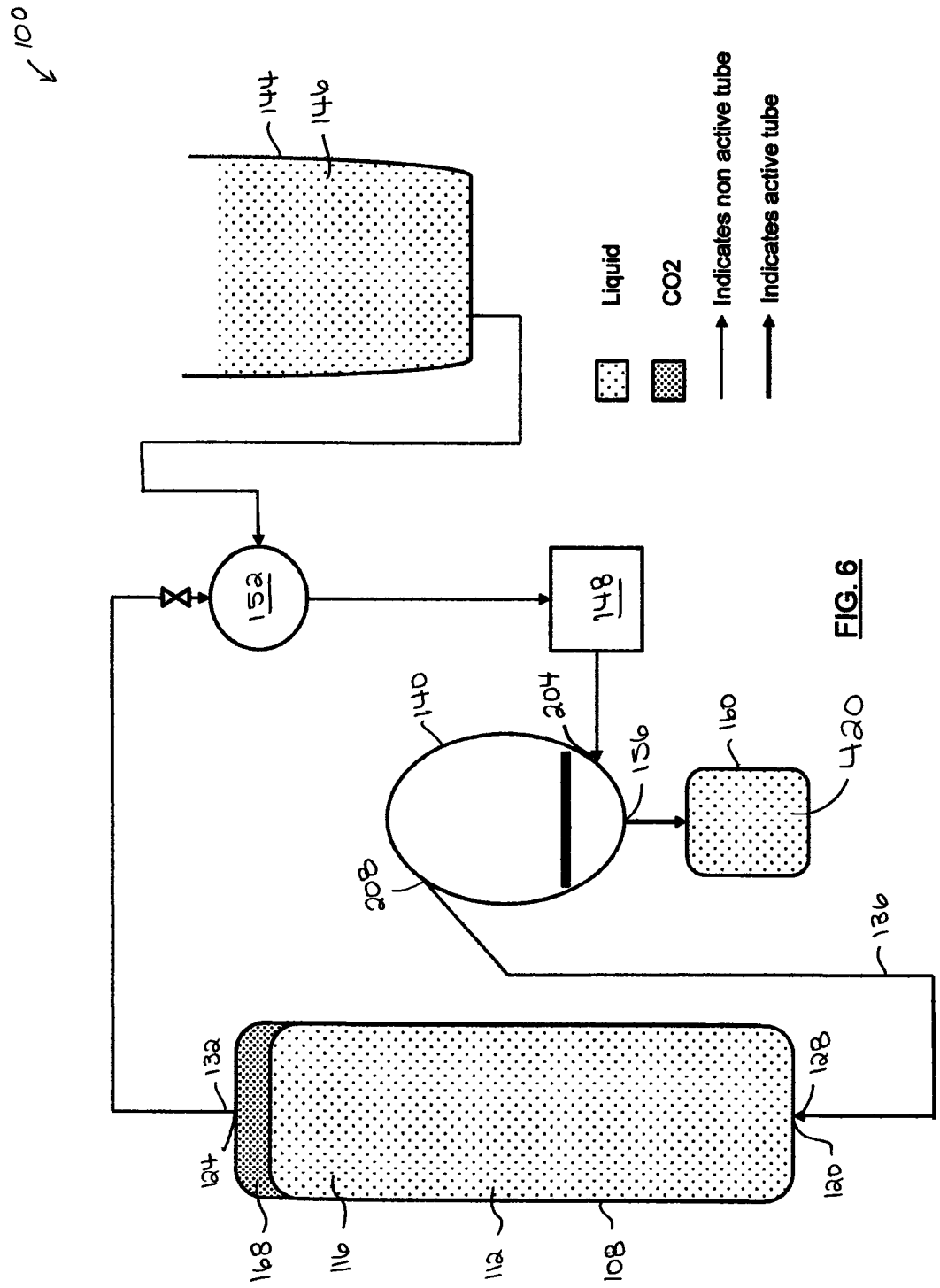
FIG. 6 is a schematic illustration of the beverage carbonation system of FIG. 2, in a container sealed state.

FIG. 6 shows a system state ("container sealed state") shortly after beverage container 108 has been sealed for removal from beverage carbonator 104. As compared with the state of FIG. 5, beverage container inlet and outlet 120, 124 are disconnected from beverage carbonator 104 and hermetically seal container inner volume 116 to prevent a loss of carbonation from carbonated beverage 112. Further, above-atmospheric pressure is trapped within carbonation chamber 140 (e.g. by closing carbonator outlet 128 and deactivating pump 148), and then byproduct outlet 156 is opened to vent the trapped above-atmospheric gas pressure through byproduct outlet 156 thereby evacuating reaction byproduct from byproduct carbonation chamber 140 through byproduct outlet 156 into byproduct container 160.

The user may empty byproduct container 160 after carbonating one or many beverage containers 108 of beverage 112.

Figure 7:
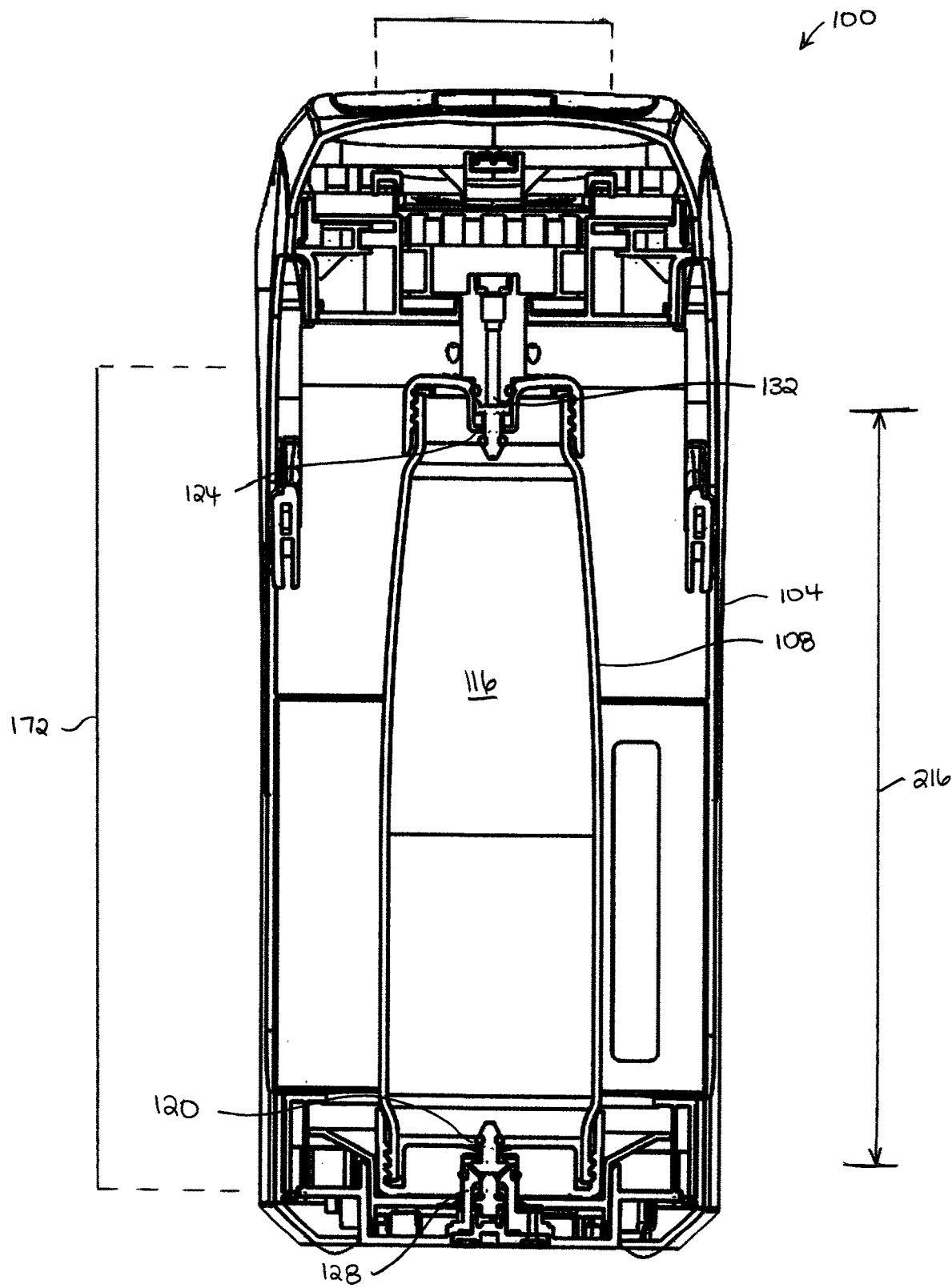
FIG. 7 is a cross-sectional view taken along line 7-7 in FIG. 2, with the beverage container engaged with the beverage carbonator.
Figure 8:
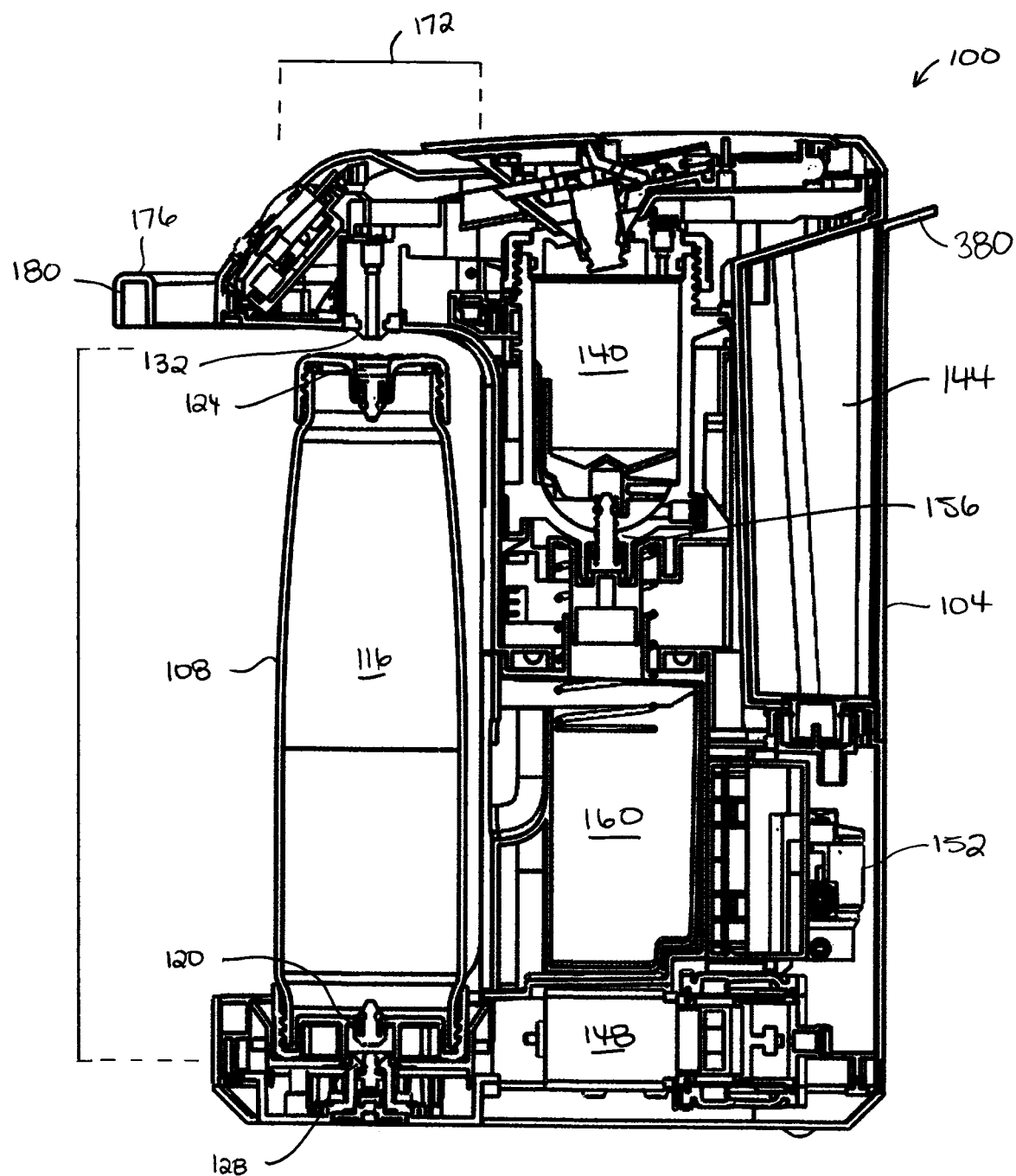
FIG. 8 is a cross-sectional view taken along line 8-8 in FIG. 2, with the beverage container disengaged with the beverage carbonator.

Reference is now made to FIG. 7-8. As shown, beverage carbonator 104 and beverage container 108 may be configured to provide a disengagement sequence in which beverage container 108 is sealed before container inlet and outlet 120, 124 are unsealed from carbonator outlet and inlet 128, 132 respectively. This may maintain the above-atmospheric system pressure at container inlet and outlet 120, 124 at least until container inlet and outlet 120, 124 are sealed. In turn, this may prevent carbon dioxide gas from venting out of beverage container 108, which may occur if either container inlet or outlet 120, 124 was open and exposed to ambient (i.e. atmospheric) pressure. Accordingly, this arrangement may help mitigate a loss of carbonation when disconnecting beverage container 108 from beverage carbonator 104.

In another aspect, the disengagement sequence may include sealing above-atmospheric system gas pressure within beverage carbonator 104 prior to or simultaneously as beverage container 108 is unsealed from beverage carbonator 104 (e.g. before container inlet and outlet 120, 124 are unsealed from carbonator outlet and inlet 128, 132 respectively). This can allow the trapped above-atmospheric system gas pressure to be vented through byproduct outlet 156 to evacuate byproduct from carbonation chamber 140 into byproduct container 160. In some examples, carbonator outlet 128 may be closed prior to unsealing carbonator outlet 128 from container inlet 120. This may close fluid flow path 136 at or downstream of carbonation chamber 140. Fluid flow path 136 (FIG. 3) may be additionally sealed at or upstream of carbonation chamber 140, such as by pump 148, flow valve 152, or by closing carbonator inlet 132.

FIGS. 7-8 show examples in which beverage container 108 is positioned in a container receiving region 172 of beverage carbonator 104. In FIG. 7, beverage container 108 is connected to beverage carbonator 104 with container inlet and outlet 120, 124 sealed to carbonator outlet and inlet 128, 132 respectively. As shown, container inlet and outlet 120, 124 and carbonator outlet and inlet 128, 132 are all open to allow carbon dioxide to enter container inner volume 116 through container inlet 120 and carbonator outlet 128, and to exit container inner volume 116 through container outlet 124 and carbonator inlet 132. In FIG. 8, container inlet and outlet 120, 124 are closed and unsealed from carbonator outlet and inlet 128, 132 respectively. Further, carbonator outlet 128 is closed, and above-atmospheric system pressure that was trapped inside carbonation chamber 140 has vented out of byproduct outlet 156 to evacuate carbonation chamber 140 of byproduct.

Reference is now made to FIGS. 9A-12B, which illustrate steps in a disengagement sequence. The illustrated disengagement sequence may be directed by (e.g. performed by) a container engagement actuator 176. As shown, in FIG. 1, container engagement actuator 176 may include a manually user-operable member 180 to move system 100 through the steps of the disengagement sequence described below. Alternatively or in addition, container engagement actuator 176 may include a powered device(s) (e.g. electro-mechanical device, such as a motor or solenoid) that may be activated to move system 100 through the steps of the disengagement sequence. In the illustrated embodiment, container engagement actuator 176 includes a lever 180 that is movable (e.g. rotatable) to move system 100 through the steps of the disengagement sequence. Although reference below is made to "lever" 180, it will be appreciated that other manually user-operable members 180 may substitute the lever.

An advantage of using a manually user-operable member 180 is that it may provide the user with greater control over the operation of system 100, and may be simpler and less expensive to design and manufacture. On other hand, a container engagement actuator 176 including powered device(s) may be automatically activated (i.e. by controller 388 (FIG. 35), without user intervention) by programmed logic (e.g. a carbonation program stored in memory), which may improve the convenience of system 100 by reducing the user interactions required to operate system 100.

Figure 9A:
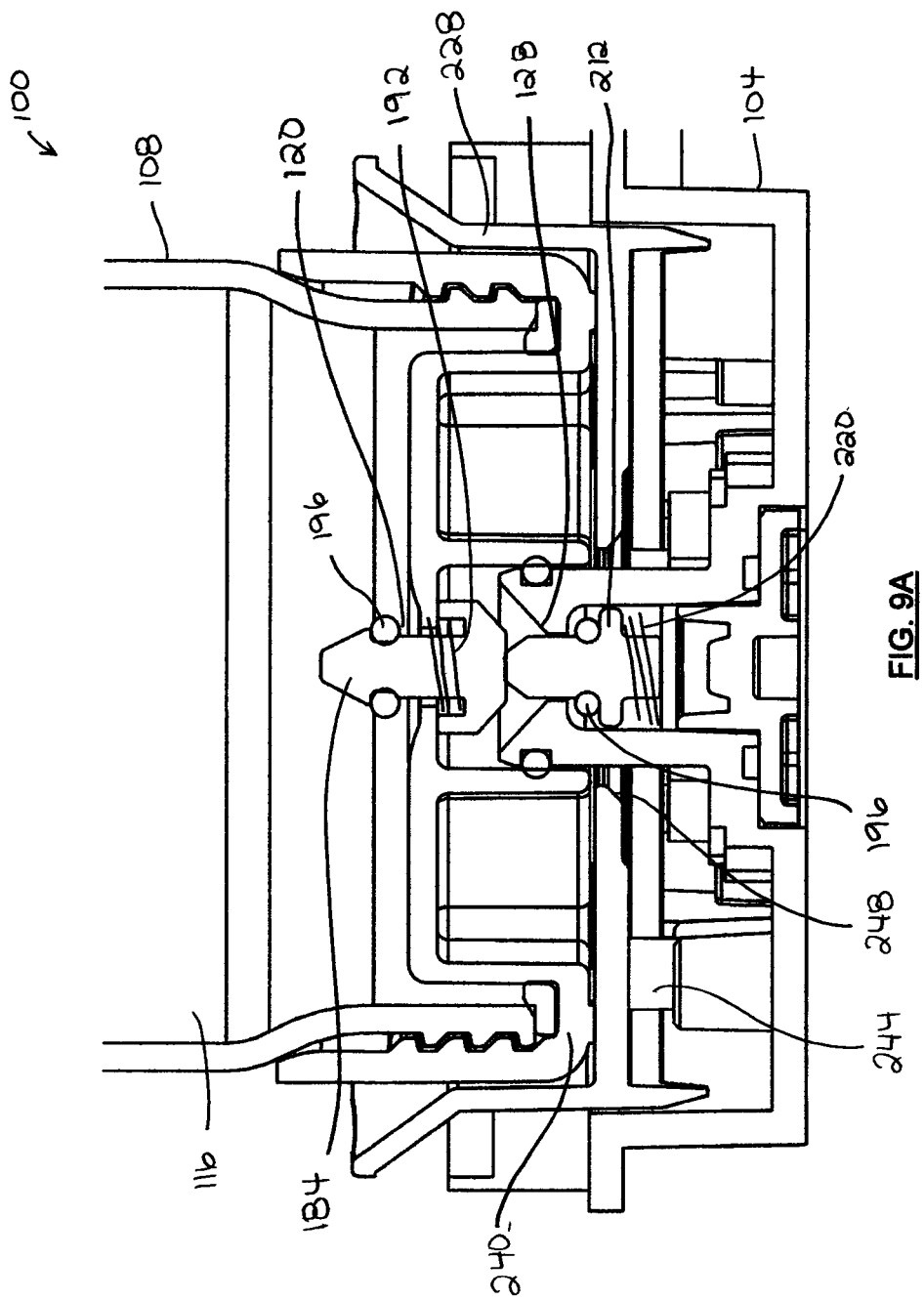

FIGS. 9A-9B show carbonation system 100 in a container engaged position, in accordance with an embodiment. Engagement actuator 176 may be in an engaged position. For example, lever 180 may be move to one end of lever 180's range of motion (e.g. pulled all the way down). As shown, when in the container engaged position, container inlet and outlet 120, 124 may be sealed to carbonator inlet and outlet 128, 132, and inlet and outlets 120, 124, 128, 132 may be open to allow gas (e.g. carbon dioxide) to circulate from beverage carbonator 104 into container inner volume 116, and from container inner volume 116 back into beverage carbonator 104, and so on. This allows a volume of carbon dioxide generated by beverage carbonator 104 to make repeated contact with the beverage inside beverage container 108, and thereby accelerate absorption into the beverage. Consequently, beverage carbonation system 100 may take less time to carbonate a beverage, all else being equal.

Figure 11B:
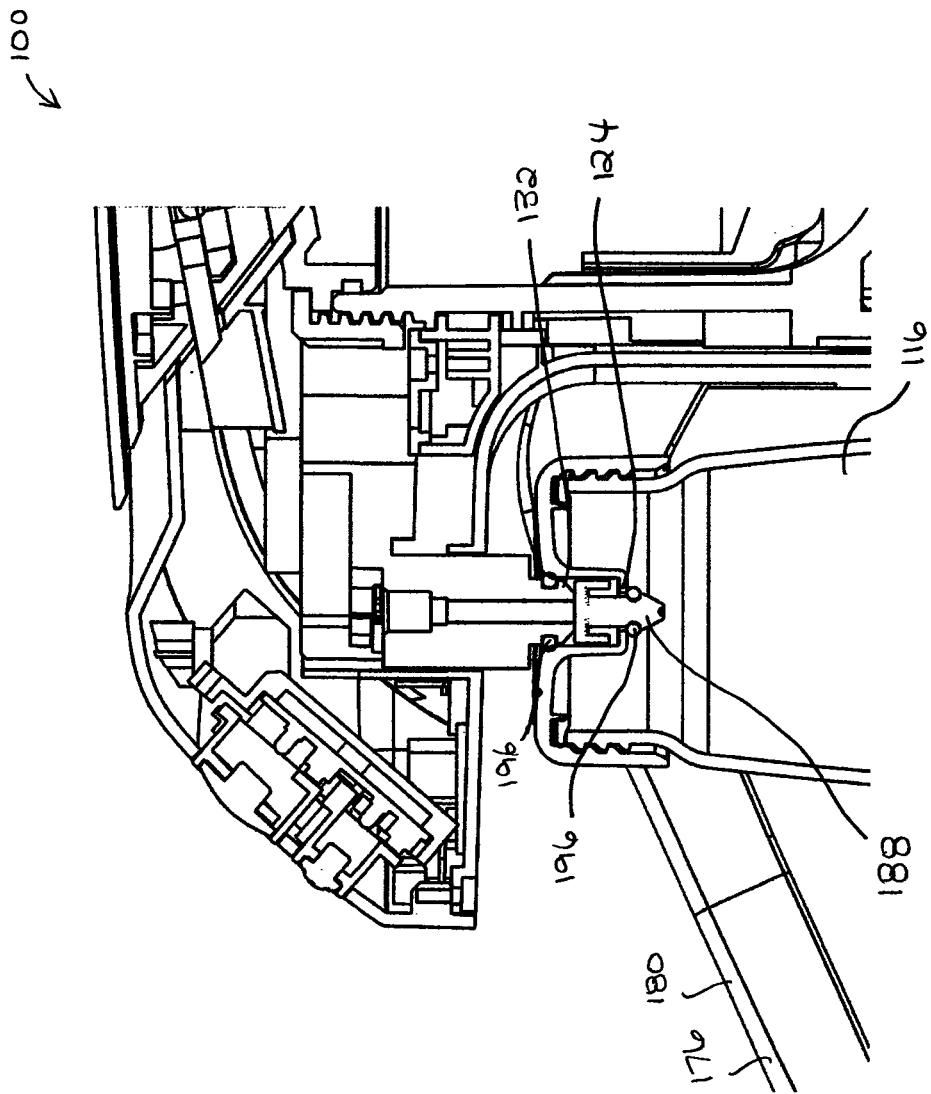

Container inlet and outlet 120, 124 and carbonator inlet and outlet 128, 132 may be fluidly connected in any manner that allows container inlet and outlet 120, 124 to reclose to seal container inner volume 116. As shown, container inlet 120 includes a container inlet valve 184, and container outlet 124 includes a container outlet valve 188. Container inlet and outlet valves 184, 188 each have an open position (shown) in which gas (e.g. carbon dioxide gas) can pass through container inlet and outlet 120, 124 to exchange gas between beverage carbonator 104 and container inner volume 116. FIGS. 11A-11B show valves 184, 188 in a closed position, in which valves 184, 188 close container inlet and outlet 120, 124 thereby sealing container inner volume 116 and preventing any entry or exit of gas (indeed, any fluid) into or out of container inner volume 116.

Referring again to FIGS. 9A-9B, container inlet and outlet valves 184, 188 may be opened in any manner. In the illustrated embodiment container inlet and outlet valves 184, 188 are biased (e.g. by springs 192) to the closed position, and held in the open position by the beverage carbonator 104 when in the container engaged position. An advantage of this design is that it allows container inlet and outlet valves 184, 188 to reclose automatically when disconnecting beverage container 108 from beverage carbonator 104, and to remain closed until reconnected to beverage carbonator 104. In the example shown, when in the container engaged position, carbonator outlet 128 engages with (e.g. applies force upon) container inlet 120 to hold container inlet 120 open, and carbonator inlet 132 engages with (e.g. applies force upon) container outlet 124 to hold container outlet 124 open.

In other embodiments, beverage carbonator 104 may not hold container inlet and outlet valves 184, 188 open. For example, container inlet and outlet valves 184, 188 may be manually openable (i.e. by hand) after connecting beverage container 108 to beverage carbonator 104. This may simplify the design of beverage carbonation system 100, which may reduce manufacturing costs.

Still referring to FIGS. 9A-9B, container inlet and outlet 120, 124 may be sealed to carbonator outlet and inlet 128, 132, respectively. This may provide a gas tight connection between container inlet and outlet 120, 124 and carbonator outlet and inlet 128, 132, which may mitigate a loss of gas (e.g. carbon dioxide) to the environment when exchanging gas across inlet and outlets 120, 124, 128, 132. The seal between container inlet and outlet 120, 124, and carbonator outlet and inlet 128, 132 respectively, may be formed in any manner that reduces or eliminates a loss of gas to environment. In some embodiments, the seal may be formed by threads or an interference fit. In other embodiments, one or both of container inlet 120 and carbonator outlet 128 includes a sealing member 196 (also referred to as a seal or gasket). Similarly, one or both of container outlet 124 and carbonator inlet 132 may include a sealing member 196 or 220 (also referred to as a seal or gasket). In the illustrated example, carbonator outlet and inlet 128, 132 each include a seal 196 (e.g. an O-ring) that contacts container inlet and outlet 120, 124 respectively when carbonator outlet and inlet 128, 132 are sealed to container inlet and outlet 120, 124 respectively.

As discussed above with reference to FIG. 6, in some embodiments, above-atmospheric gas pressure may be trapped in carbonation chamber 140 to use for evacuating carbonation chamber 140 of byproduct after the carbonation cycle is completed. This may be achieved by closing fluid flow path 136 at or upstream of carbonation chamber fluid inlet 204, and closing fluid flow path 136 at or downstream of carbonation chamber gas outlet 208. For example, beverage carbonator 104 may (i) include a closeable valve at carbonation chamber fluid inlet 204, or (ii) pump 148 may obstruct fluid flow when deactivated, or (iii) flow valve 152 may have a position that obstructs fluid flow, or (iv) carbonator inlet 132 may have closeable valve. Similarly, beverage carbonator 104 may include a closeable valve at carbonation chamber gas outlet 208 or at carbonator outlet 128.

Returning to FIGS. 9A-9B, the illustrated example shows carbonator outlet 128 having a carbonator outlet valve 212. Carbonator outlet valve 212 may be movable between an open position (shown), in which gas (e.g. carbon dioxide gas) can pass through carbonator outlet 128 to deliver gas from beverage carbonator 104 to container inner volume 116, and a closed position (FIG. 12A) in which carbonator outlet 128 is closed and prevents above-atmospheric gas from escaping beverage carbonator 104 through carbonator outlet 128. Accordingly, carbonator outlet valve 212 may be closeable to help trap above-atmospheric system gas pressure within carbonation chamber 140 (FIG. 6) located upstream of carbonator outlet valve 212.

Carbonator outlet valve 212 may be opened and closed in any manner. In the illustrated embodiment carbonator outlet valve 212 is biased (e.g. by spring 192) to the closed position, and held in the open position by beverage container 108 when system 100 is in the container engaged position. An advantage of this design is that it allows carbonator outlet valve 212 to reclose automatically when disconnecting beverage container 108 from beverage carbonator 104, and to remain closed until beverage container 108 is reconnected to beverage carbonator 104. In the example shown, when in the container engaged position, container inlet 120 engages with (e.g. applies force upon) carbonator outlet valve 212 to hold carbonator outlet valve 212 open.

Figure 10:
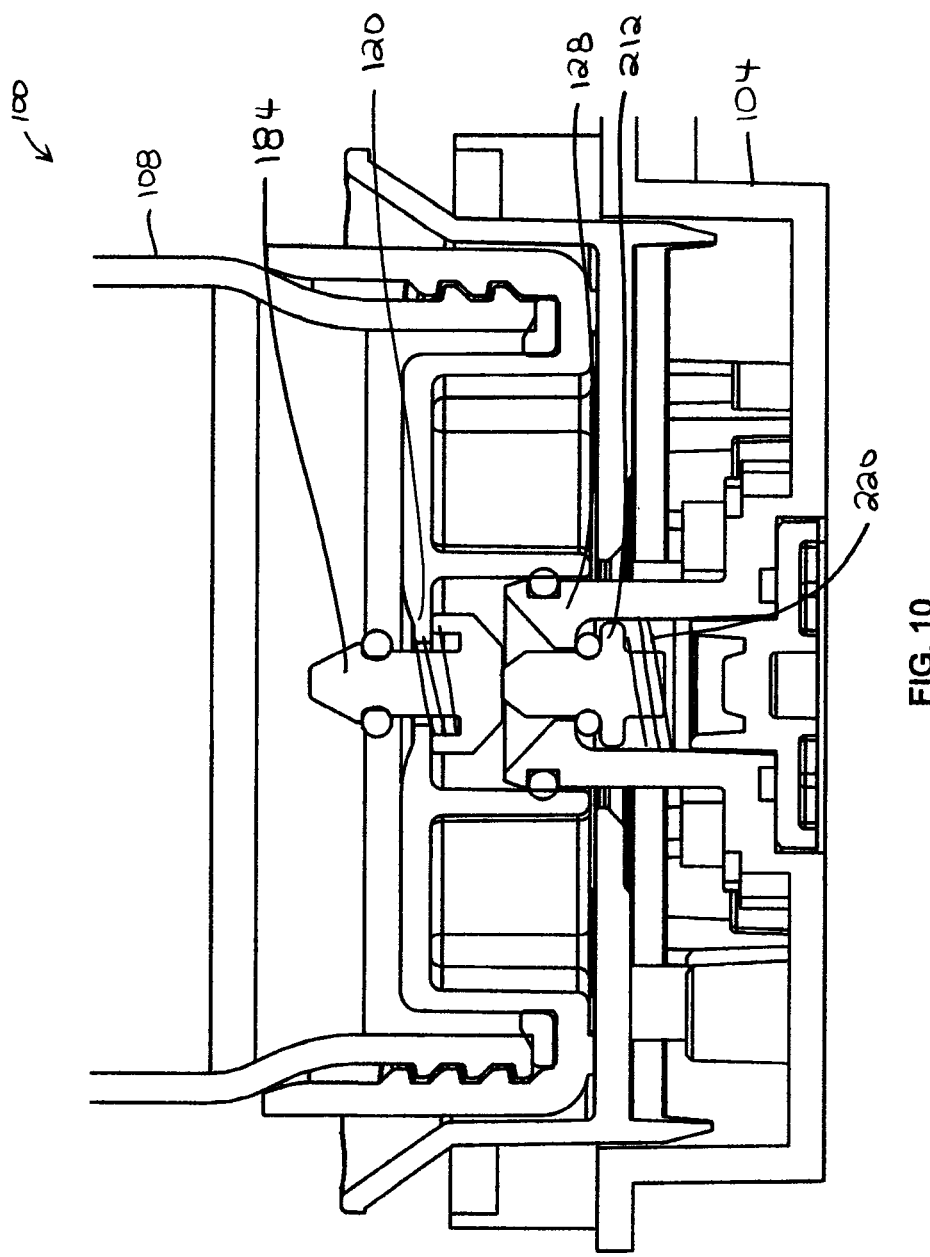
FIG. 10 is a partial cross-sectional view taken along line 7-7 in FIG. 2, with system 100 in a carbonator sealed position.

Reference is now made to FIG. 10, which shows system 100 in a carbonator sealed position, in accordance with an embodiment. As compared with the container engaged position (an example is shown in FIGS. 9A-9B), above-atmospheric gas pressure is sealed (e.g. trapped) within carbonation chamber 140 (FIG. 6), e.g. so that the gas pressure can be used to evacuate carbonation chamber 140 (FIG. 6) of reaction byproduct. As noted above, one option is to seal fluid flow path 136 downstream of the carbonation chamber, such as at carbonator outlet 128. Accordingly, the illustrated example shows carbonator outlet valve 212 closed in the carbonator sealed position. This prevents above-atmospheric system gas pressure in fluid flow path 136 (FIG. 6) from escaping carbonator 104 through carbonator outlet 128.

The carbonator sealed position may include container inlet and outlet 120, 124 remaining open as in FIGS. 9B and 10. Alternatively, the carbonator sealed position may be simultaneous with the container sealed position, in which the container inlet and outlet 120, 124 are closed as in FIGS. 11A-11B. In either case, container inlet and outlet 120, 124 may be sealed to carbonator outlet and inlet 128, 132 in the carbonator sealed position, or at least until the moment container inlet and outlet 120, 124 are closed. This may avoid venting gas through container inlet and outlet 120, 124 before container inlet and outlet 120, 124 are closed.

FIGS. 9B and 10 show an example in which container inlet and outlet 120, 124 remain open in the carbonator sealed position. In some embodiments, container inlet and outlet 120, 124 may be aligned with carbonator outlet and inlet 128, 132, and located in the spacing between carbonator outlet and inlet 128, 132. For example, container inlet and outlet 120, 124 may be aligned longitudinally (e.g. vertically as shown) between carbonator outlet and inlet 128, 132. In this example, carbonator outlet and inlet 128, 132 may be movable toward each other (e.g. in accordance with an engagement sequence) to reduce the longitudinal distance 216 (FIG. 7) between carbonator outlet and inlet 128, 132, whereby carbonator outlet and inlet 128, 132 may bear upon container inlet and outlet 120, 124 and thereby open container inlet and outlet valves 184, 188.

Referring to FIGS. 7-8, in some embodiments, container engagement actuator 176 may move one or both of carbonator outlet and inlet 128, 132 toward the other to reduce longitudinal distance 216 in accordance with an engagement sequence. Similarly, container engagement actuator 176 may move one or both of carbonator outlet and inlet 128, 132 away from the other to increase longitudinal distance 216 in accordance with the disengagement sequence. For example, lever 180 may be mechanically connected to one or both of carbonator outlet and inlet 128, 132 to move the same to increase and decrease longitudinal distance 216. In the illustrated example, lever 180 is mechanically connected to carbonator inlet 132, whereby lever 180 is movable (e.g. rotatable) to extend carbonator inlet 132 towards carbonator outlet 128 for an engagement sequence, and to retract carbonator inlet 132 away from carbonator outlet 128 for the disengagement sequence. The connected movements of lever 180 and carbonator inlet 132 are illustrated in the transition from FIG. 9B, to FIG. 11B, to FIG. 12B.

Returning to FIG. 9A, carbonator outlet valve 212 may be biased from an open position (shown) to a closed position (FIG. 10) by a valve bias 220. Engagement between carbonator outlet valve 212 and container inlet 120 may hold carbonator outlet valve 212 open against the force of bias 220. In the illustrated embodiment, carbonator outlet valve 212 and container inlet valve 184 mutually engage to hold each other open, whereby valve biases 192 and 220 exert opposing forces. As compared to FIGS. 9A-B, FIG. 10 illustrates a state in which carbonator inlet 120 has moved away from carbonator outlet 128, thereby increasing separation distance 216 (FIG. 7). In the example shown, carbonator valve bias 220 is stronger (i.e. exerts greater force) than container valve bias 192 so that the increase in separation distance 216 (FIG. 7) allows carbonator outlet valve 212 to close in preference to container valves 184, 188. In other embodiments, the strength of carbonator valve bias 220 and container valve bias 192 may be tuned so that container and carbonator valves 184, 188, and 212 close simultaneously.

In other embodiments, beverage container 108 may not hold carbonator outlet valve 212 open. For example, carbonator outlet valve 212 may be manually openable (i.e. by hand) after connecting beverage container 108 to beverage carbonator 104. Similarly, carbonator outlet valve 212 may be manually closeable (i.e. by hand) before disconnecting beverage container 108 from beverage carbonator 104. This may simplify the design of beverage carbonation system 100, which may reduce manufacturing costs.

FIGS. 11A-B show beverage carbonation system 100 in a container sealed position, in accordance with an embodiment. As compared with the carbonator sealed position of FIG. 10, container inlet and outlet 120, 124 are closed, whereby container inner volume 116 is sealed. As shown, carbonator valve separation distance 216 (FIG. 7) may be increased as compared with FIG. 10 (e.g. by moving carbonator inlet 132 further away from carbonator outlet 128) to allow container inlet and outlet valves 184, 188 to close. For example, lever 180 is shown positioned closer to the disengaged position (FIG. 12B) as compared with the carbonator sealed position and container engaged position. In the illustrated example, container inlet and outlet 120, 124 remain sealed to carbonator outlet and inlet 128, 132 (e.g. by seals 196).

FIGS. 12A-B show beverage carbonation system 100 in a container disengaged position, in accordance with an embodiment. As compared with the container sealed position of FIGS. 11A-B, container inlet and outlet 120, 124 is unsealed from carbonator outlet and inlet 128, 132. As shown, carbonator vale separation distance 216 (FIG. 7) may be increased as compared with FIGS. 11A-B (e.g. by moving carbonator inlet 132 further away from carbonator outlet 128) to disengage seals 196. For example, lever 180 is shown in the disengaged position (e.g. at the end of lever 180's range of motion). In the container disengaged position, container 108 may be removed and either stored (e.g. refrigerated) for later consumption or opened for immediate consumption. As shown, container 108 may include an openable lid 222. Lid 222 may house container outlet 124 as shown, or container outlet 124 may be located elsewhere on container 108. In the illustrated embodiment, container 108 has a container sidewall 223 that extends between container lower end 224 and container upper end 225, container sidewall 223 borders a container opening 226, and lid 222 is removably connected to container sidewall 223 overlying container opening 226. Container opening 226 may be located at container upper end 225 as shown or elsewhere on container 108.

FIGS. 9-12 illustrate a sequence of positions of an exemplary disengagement sequence. It will be appreciated that in some embodiments, that system 100 may provide an engagement sequence that includes the same positions in the opposite sequence.

Figure 13:
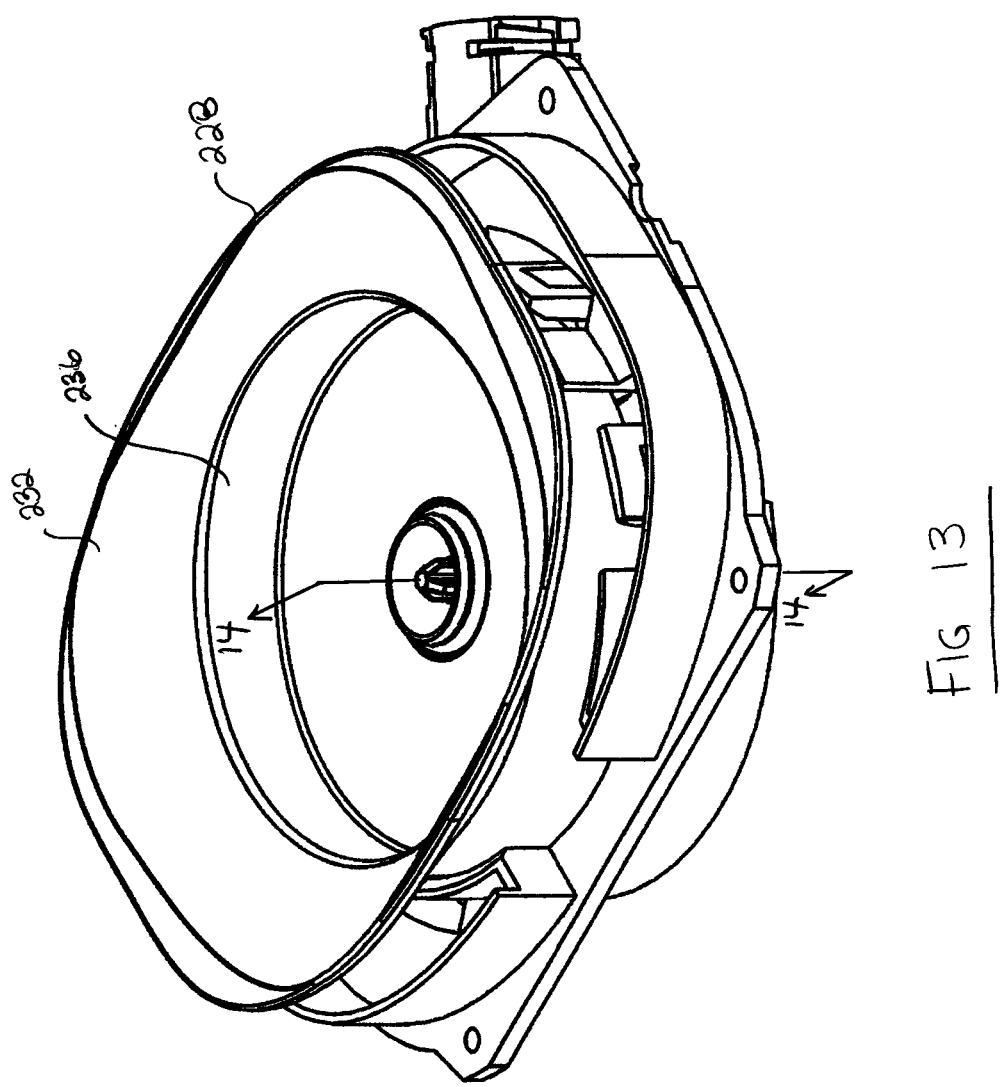
FIG. 13 is a perspective view of a container support of the beverage carbonator of FIG. 1.
Figure 14:
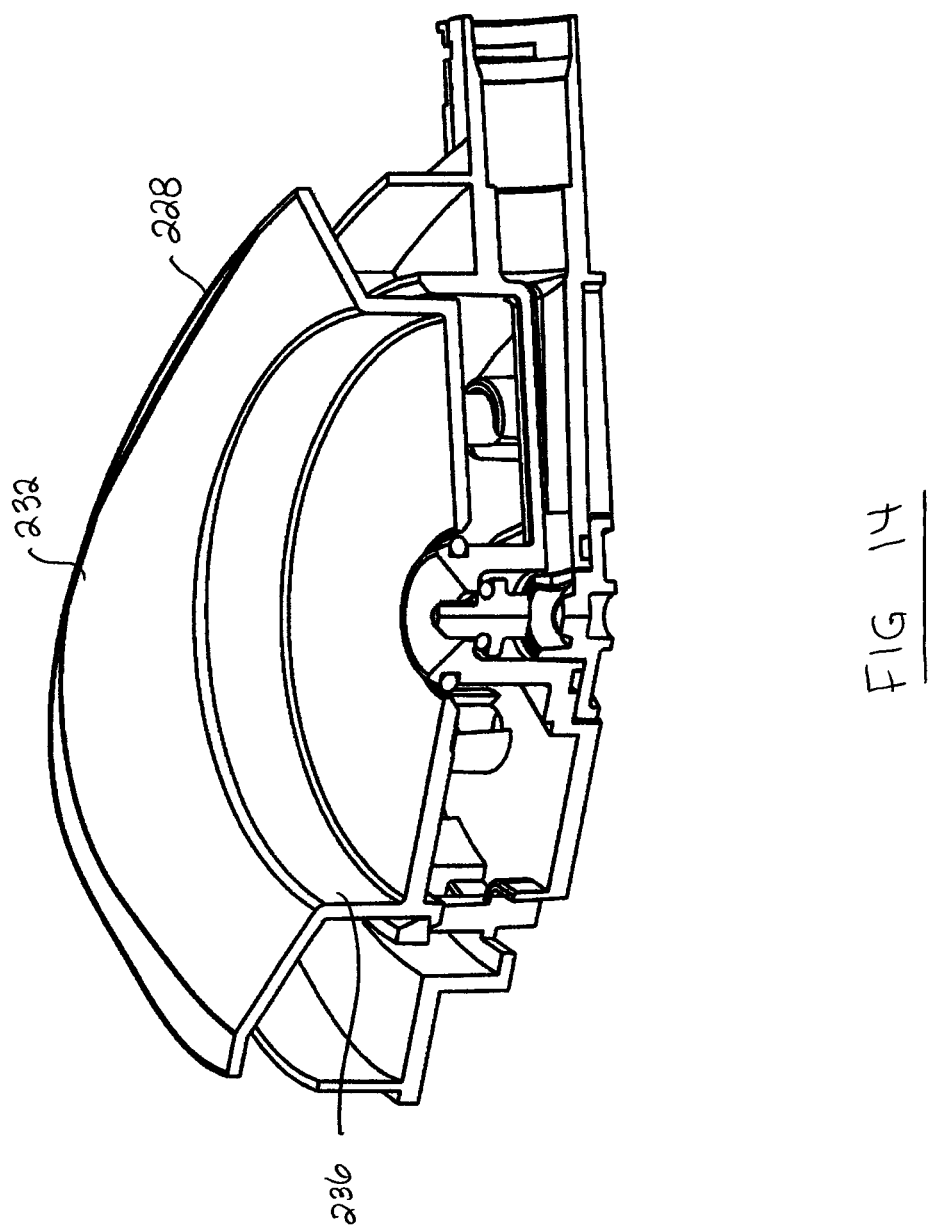
FIG. 14 is a cross-sectional view taken along line 14-14 in FIG. 13.
Figure 15:
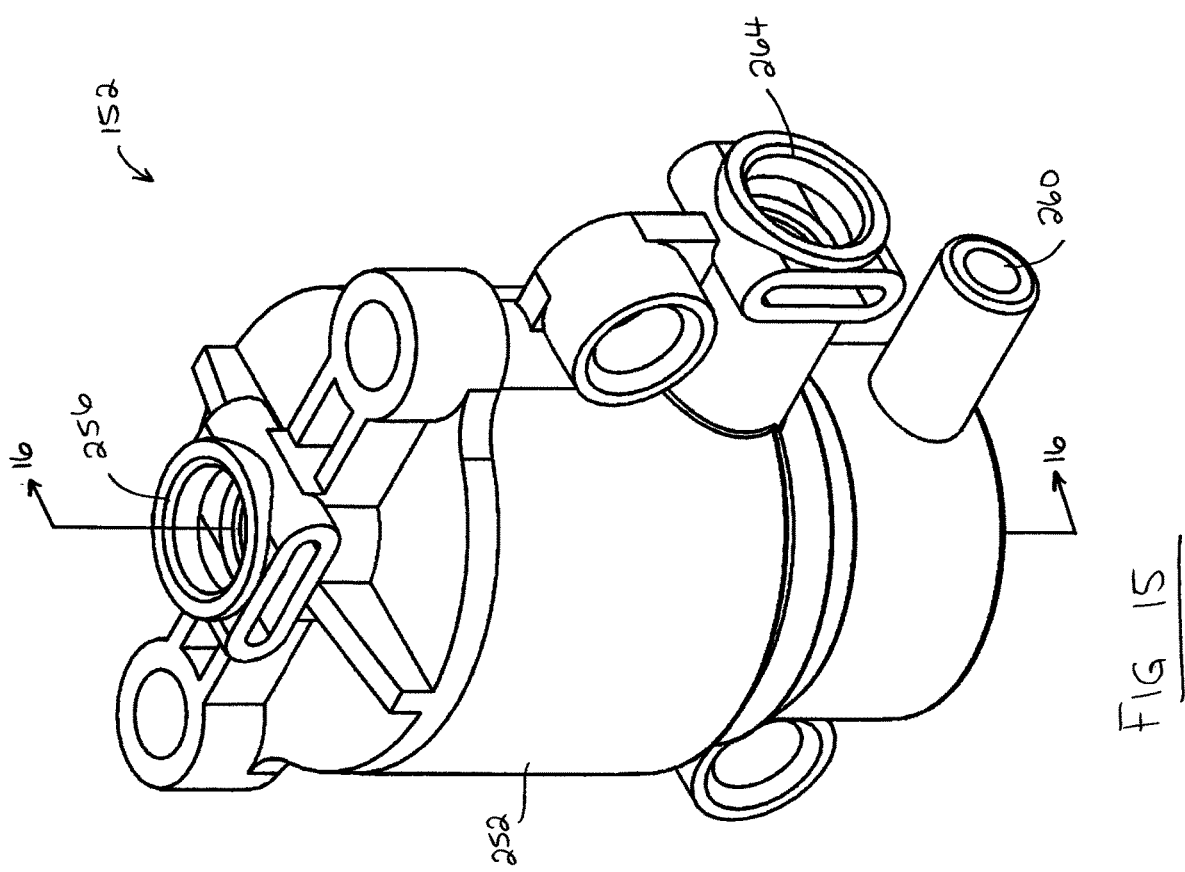
FIG. 15 is a perspective view of a flow valve of the beverage carbonator of FIG. 1.

Reference is now made to FIGS. 2 and 13-14. Optionally, beverage carbonator 104 may include a container support 228 that provides stability to beverage container 108, particularly in the container disengaged position (FIGS. 12A-B). As shown, container support 228 may include a platform 232 on which beverage container 108 is seated when positioned in container receiving region 172. In some embodiments, container support 228 may include a container recess 236 that receives container lower end 240. This may permit container support 228 to assist with aligning beverage container 108 in container receiving region 172 (FIG. 8) to engage with carbonator outlet and inlet 128, 132 (FIG. 8).

Referring to FIGS. 9A and 12A, in some embodiments, container support 228 may be movable with beverage container 108 between the container disengaged position (FIG. 12A) and the container engaged position (FIG. 9A). In the illustrated example, container support 228 moves longitudinally (e.g. vertically) to maintain engagement with container lower end 240. As shown, container support 228 may be biased to the disengaged position (i.e. to the elevated position), such as by a bias 244 (e.g. spring or resiliently deformable member). In the example shown, container support 228 is movable relative to carbonator outlet 128. Container support 228 may include an opening 248 aligned with carbonator outlet 128, and through which carbonator outlet 124 may extend as container support 228 moves between the container engaged position and the container disengaged position.

Reference is now made to FIG. 3. Beverage carbonator 104 may include a flow valve 152 that toggles between fluidly connecting pump 148 to liquid reservoir 144, and fluidly connecting pump 148 to carbonator inlet 132 in response to a system gas pressure (e.g. within fluid flow path 136) exceeding a predetermined threshold. The predetermined threshold gas pressure may be any value suitable for carbonating beverage 112. In some examples, the predetermined threshold gas pressure is between 6 psi and 15 psi (above atmospheric pressure), such as for example between 8 psi and 12 psi, and most preferably about 10 psi. An advantage of this design is that it may allow the system gas pressure upstream and downstream of pump 148 to normalize before the pump is connected to carbonator inlet 132. This may reduce the gas pressure drop across pump 148 (e.g. to less than 20 psi, such as 0 psi to 15 psi), which reduces strain on pump 148. For example, pump 148 may be a diaphragm pump for compatibility with liquid and gas flows, but which may not be able to overcome a large pressure difference. Moreover, elevated system gas pressure contributes to keeping the reaction in the carbonation chamber 140 acquiescent. By delaying gas recirculation, the system gas pressure can rise quickly, and therefore quickly calm the reaction in the carbonation chamber 140, which mitigates the aqueous mixture inside becoming entrained in the gas flow and mixing into the beverage 112.

In some embodiments, flow valve 152 may include electronics and electro-mechanical components. For example, flow valve 152 may include a processor (e.g. microcontroller) that toggles the state of one or more solenoids in response to determining that pressure readings received from one or more pressure sensors indicates a system gas pressure which exceeds the predetermined threshold. An advantage of this design is that the processor can be reprogrammed with different predetermined thresholds, e.g. based on a selected user mode of operation (e.g. carbonation level). However, this design may be more complex and expensive to manufacture as compared with a mechanical solution.

Referring to FIGS. 3 and 15-17, a mechanical flow valve 152 is shown in accordance with an embodiment. Flow valve 152 may operate to toggle fluid connections to pump 148 in response to system gas pressure as described above, without electronics or electro-mechanical components. This may make flow valve 152 less complex and less expensive to manufacture, all else being equal.

Flow valve 152 can have any configuration suitable to toggle fluid connections to pump 148 in response to system gas pressure as described above. In the illustrated example, flow valve 152 has a valve housing 252 including a gas inlet 256, a reservoir inlet 260, and a pump outlet 264. In use, gas inlet 256 is fluidly connected to carbonator inlet 132, reservoir inlet 260 is fluidly connected to liquid reservoir 144, and pump outlet 264 is fluidly connected to pump 148. A spool 268 is shown located inside flow valve housing 252. Spool 268 may be movable between (i) a first position (FIG. 16) in which reservoir inlet 260 is fluidly connected to pump outlet 264 (i.e. liquid can flow from reservoir inlet 260 to pump outlet 264), and gas inlet 256 is fluidly disconnected from pump outlet 264 (i.e. gas cannot flow from gas inlet 256 to pump outlet 264); and (ii) a second position (FIG. 17) in which reservoir inlet 260 is fluidly disconnected from pump outlet 264 (i.e. liquid cannot flow from reservoir inlet 260 to pump outlet 264), and gas inlet 256 is fluidly connected from pump outlet 264 (i.e. gas can flow from gas inlet 256 to pump outlet 264).

Figure 16:
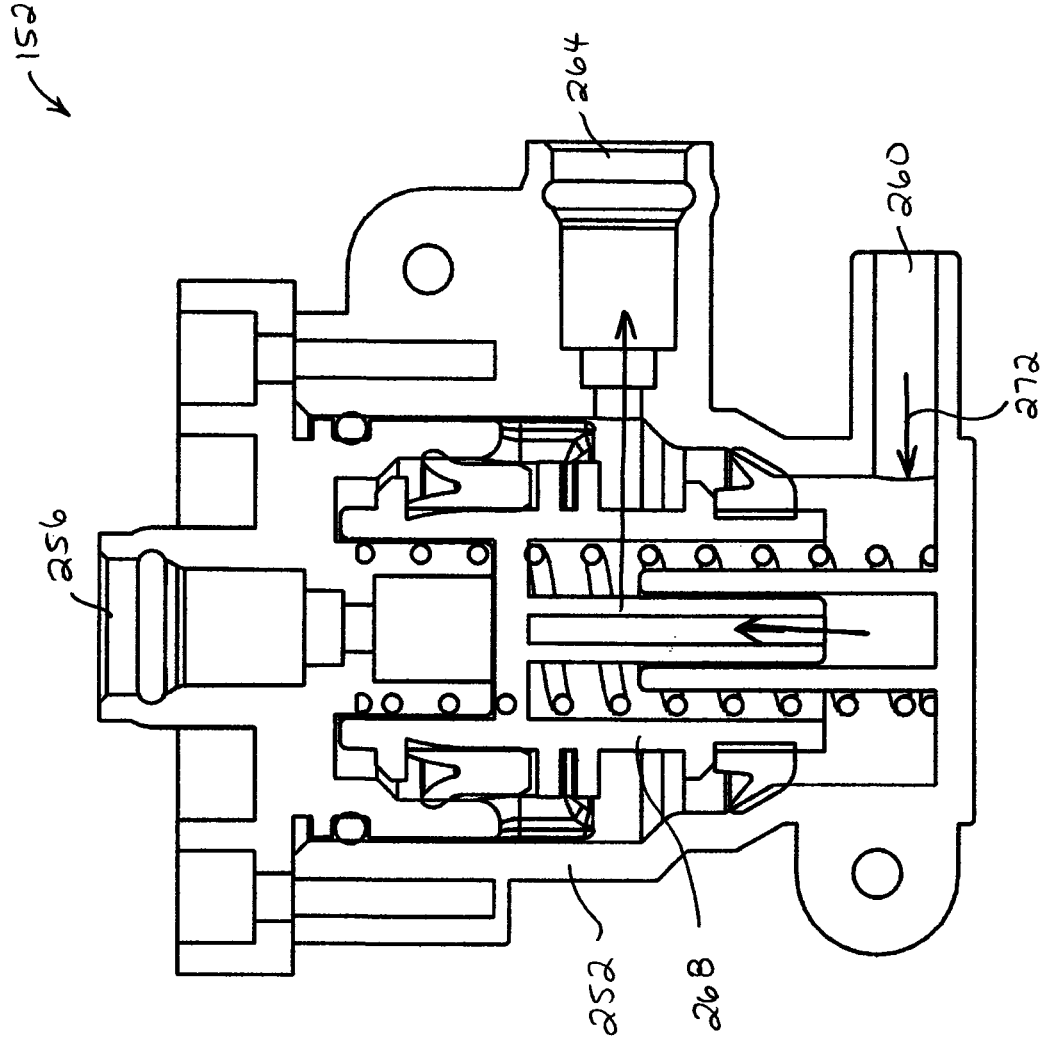
FIG. 16 is a cross-sectional view taken along line 16-16 in FIG. 15, with the flow valve in a first position.
Figure 17:
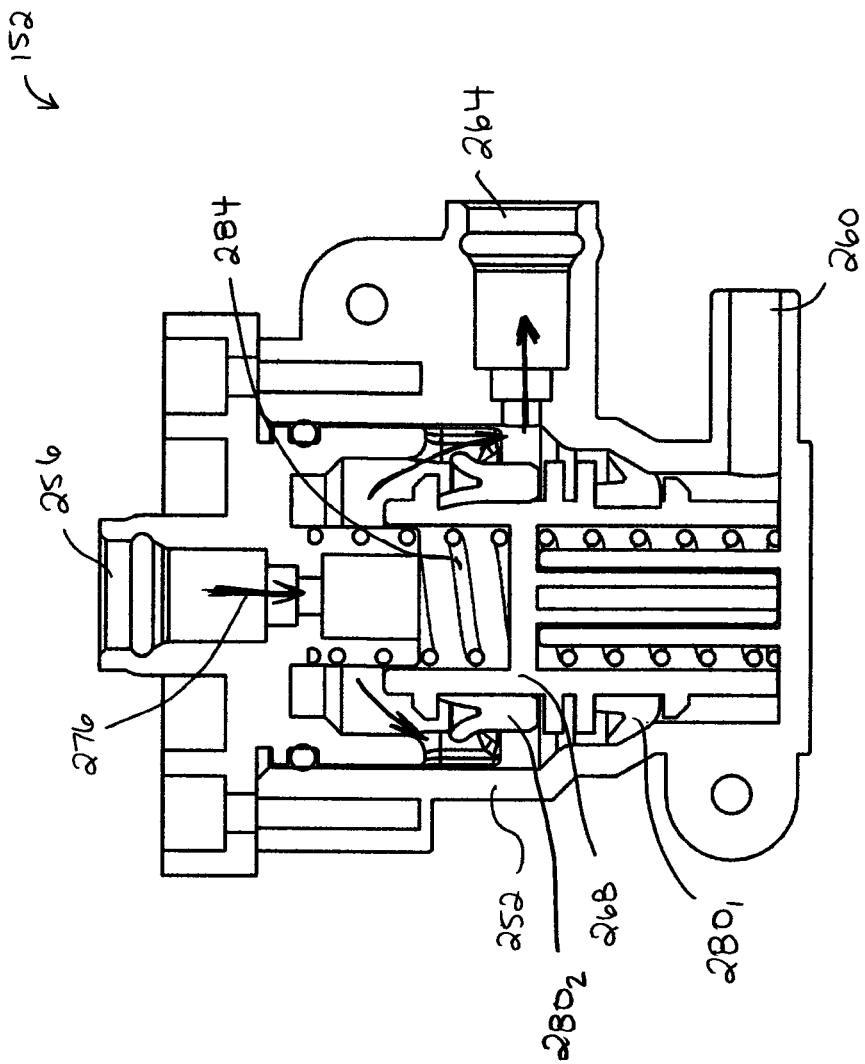
FIG. 17 is a cross-sectional view taken along line 16-16 in FIG. 15, with the flow valve in a second position.

Referring to FIGS. 16 and 17, flow valve housing 252 and spool 268 may have any configuration suitable to provide the first and second positions described above. As shown, flow valve 152 defines a liquid flow path 272 from reservoir inlet 260 to pump outlet 264, and a gas flow path 276 from gas inlet 256 to pump outlet 264. Spool 268 may include one or more seals 280 that collectively close gas flow path 276 in the first position (FIG. 16), and that collectively close liquid flow path 272 in the second position (FIG. 17). In the illustrated embodiment, spool 268 includes a first seal $280_1$, and a second seal $280_2$. As shown, seal $280_1$ closes liquid flow path 272 in the second position (FIG. 17), and does not close liquid flow path 272 in the first position (FIG. 16). Similarly, seal $280_2$ closes gas flow path 276 in the first position (FIG. 16), and does not close gas flow path 276 in the second position (FIG. 17).

In some embodiments, seals 280 may remain upstream of pump outlet 264 in both the first and second positions. For example, seal $280_1$ may remain in liquid flow path 272 upstream of pump outlet 264 in both the first and second positions, and seal $280_2$ may remain in gas flow path 276 upstream of pump outlet 264 in both the first and second positions. This may reduce wear on seals 280, as compared with a design in which a seal moves from gas flow path 276 in the first position (i.e. to seal gas flow path 276) across valve outlet 264 to liquid flow path 272 in the second position (i.e. to seal liquid flow path 272). In turn, this design may increase the working life of flow valve 152.

Still, in alternative embodiments, flow valve 152 may include a seal that moves from gas flow path 276 to liquid flow path 272 across valve outlet 264 in the manner described above. This may provide a simplified design, with fewer seals, at a lower cost, even if the working life is shorter.

Flow valve 152 may have any configuration that positions spool 268 in the first position (FIG. 16) when a system gas pressure within the carbonator is less than predetermined threshold gas pressure (e.g. less than or equal to a predetermined threshold gas pressure), and that positions spool 268 in the second position (FIG. 16) when a system gas pressure within the carbonator is greater than the predetermined threshold gas pressure. In the illustrated embodiment, spool 268 is biased to the first position (FIG. 16) and movable to the second position (FIG. 17) when a gas pressure at gas inlet 256 exceeds a predetermined threshold gas pressure. For example, flow valve 152 may include a bias 284 (e.g. a spring as shown, or other resiliently deformable member) that urges spool 268 to the first position. Gas inlet 256 may be configured so that gas pressure at gas inlet 256 applies a force (also referred to as a "gas force") to spool 268 in opposition to the force of bias 284 (also referred to as a "bias force"). When gas pressure at gas inlet 256 exceeds the predetermined threshold pressure, the gas force may exceed the bias force, whereby spool 268 may move to the second position (FIG. 17).

Reference is now made to FIG. 3. In some embodiments, beverage carbonator 104 includes a carbonation chamber 140 that holds carbonation source 164 and receives liquid 146 in a manner that allows carbonation chamber 140 to receive a predetermined minimum volume of liquid 146 before the liquid 146 contacts carbonation source 164 to create an aqueous mixture in which a reaction takes place that generates carbon dioxide gas. This mitigates the system gas pressure rising prematurely and toggling flow valve 152 to fluidly disconnect pump 148 from liquid reservoir 144 before sufficient liquid 146 for a complete reaction of carbonation source 164 has been delivered to carbonation chamber 140.

Beverage carbonator 104 may have any configuration that allows a predetermined minimum volume of liquid 146 to collect in carbonation chamber 140 before the liquid 146 contacts carbonation source 164. For example, beverage carbonator 104 may include an inlet bucket that collects liquid 146 entering carbonation chamber 140 and that is suspended by off-centered supports, such that the bucket inverts and pours out its contents (e.g. onto the carbonation source 164 below) when sufficiently filled. In other examples, beverage carbonator 104 may include a platform that holds the carbonation source 164 elevated above a bottom of the carbonation chamber 140, such that liquid 146 only contacts the carbonation source 164 after filling the carbonation chamber 140 to the elevation of the carbonation source 164.

The predetermined minimum volume of liquid 146 may be any quantity suitable for mitigating at least one of the problems noted above. In some embodiments, the predetermined minimum volume may be at least 25% (e.g. 25% to 100%) of the total liquid that will be pumped into carbonation chamber 140 during the entire carbonation operation. For example, the predetermined minimum volume may be at least 25% (e.g. 25% to 100%) of the volume of liquid required to provide a complete reaction with the amount (or a targeted, designed, or predetermined amount) of carbonation source deposited into the carbonation chamber. In some embodiments, the predetermined volume may be at least 50 mL, such as 50 mL to 200 mL.

Figure 18:
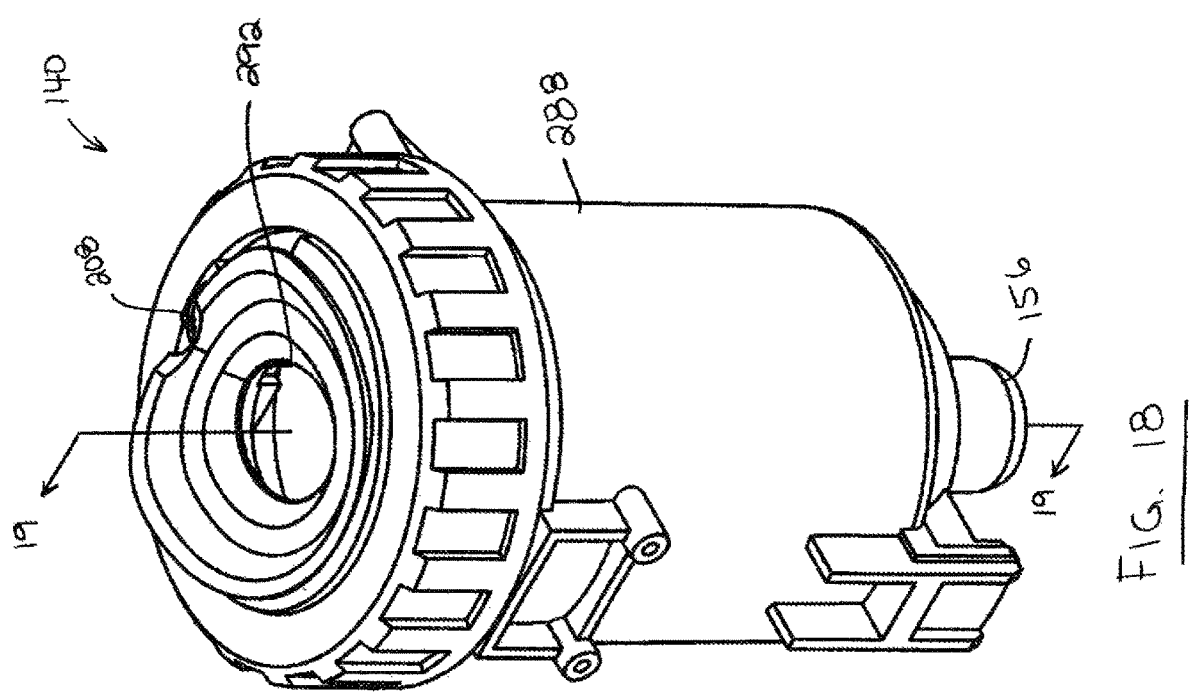
FIG. 18 is a perspective view of a carbonation chamber of the beverage carbonator of FIG. 1.
Figure 19:
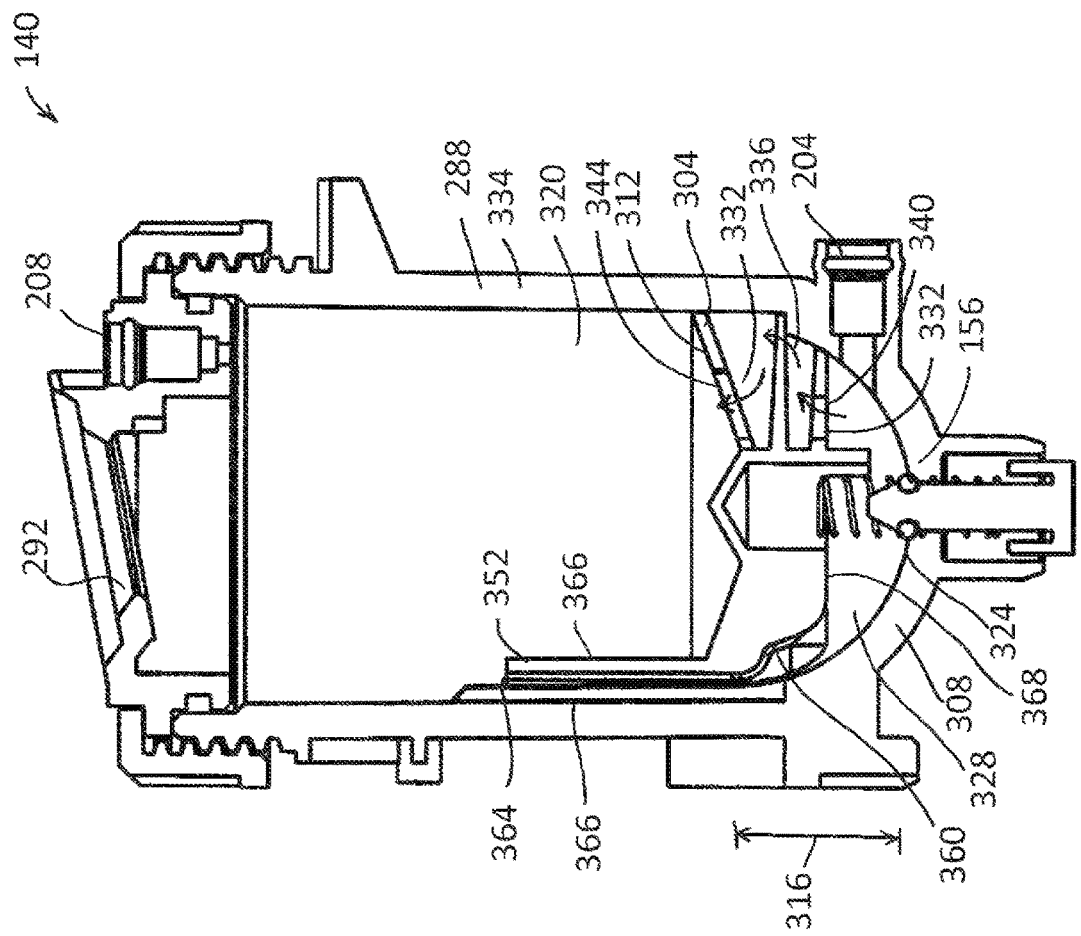
FIG. 19 is a cross-sectional view taken along line 19-19 in FIG. 18.
Figure 20:
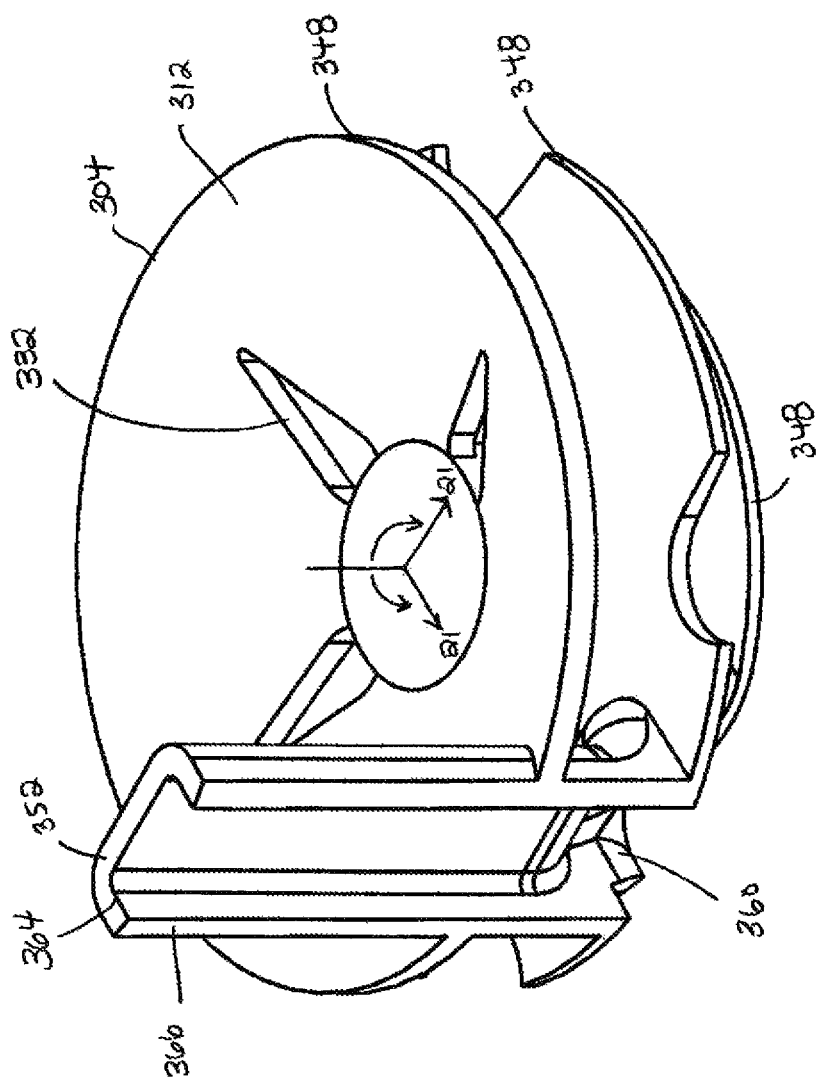
FIG. 20 is a perspective view of a carbonation source carrier of the carbonation chamber of FIG. 18.
Figure 21:
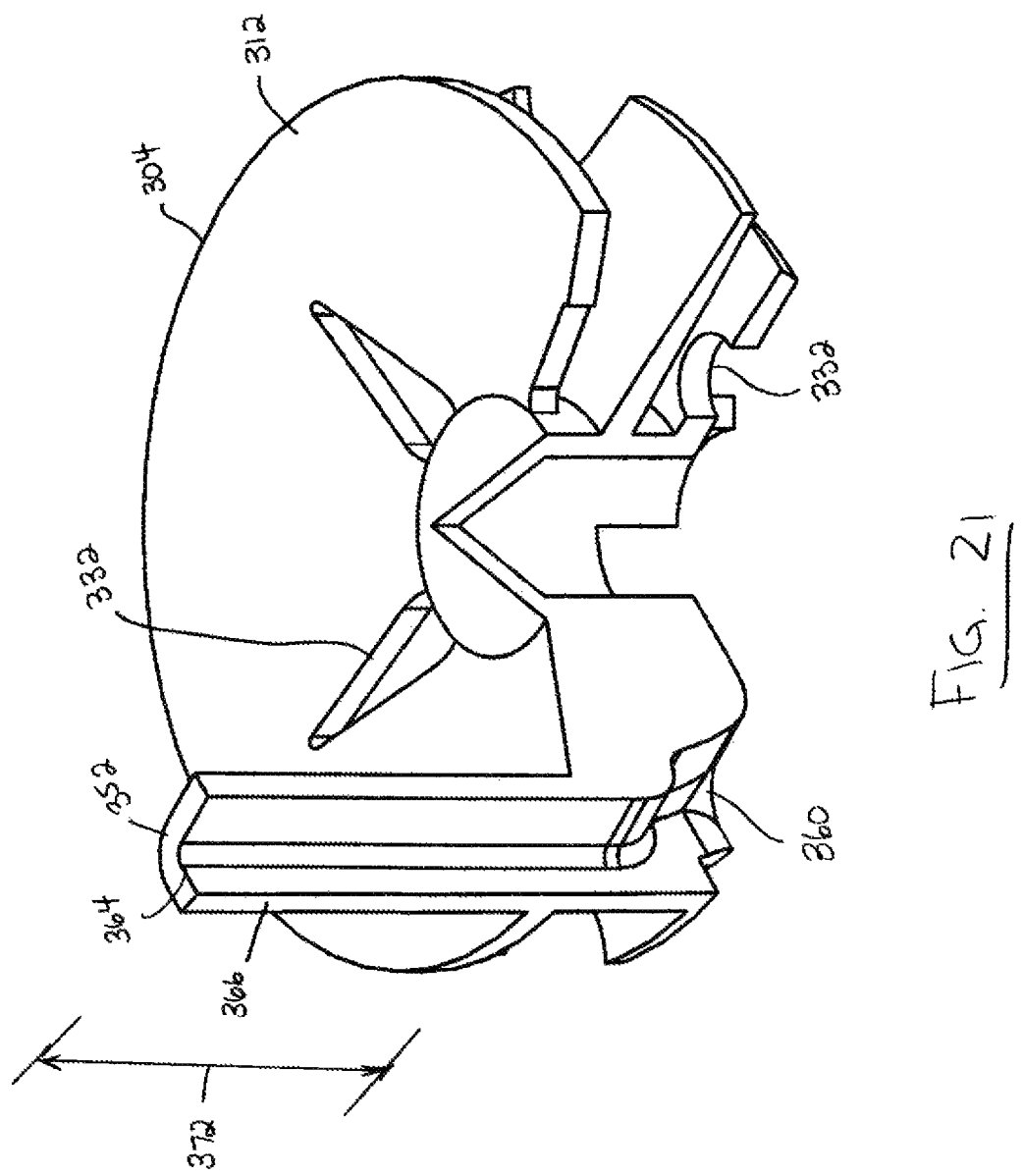
FIG. 21 is an upper cutaway view of the carbonation source carrier of the carbonation chamber of FIG. 18, with quarter section 21-21 of FIG. 20 cut away.
Figure 22:
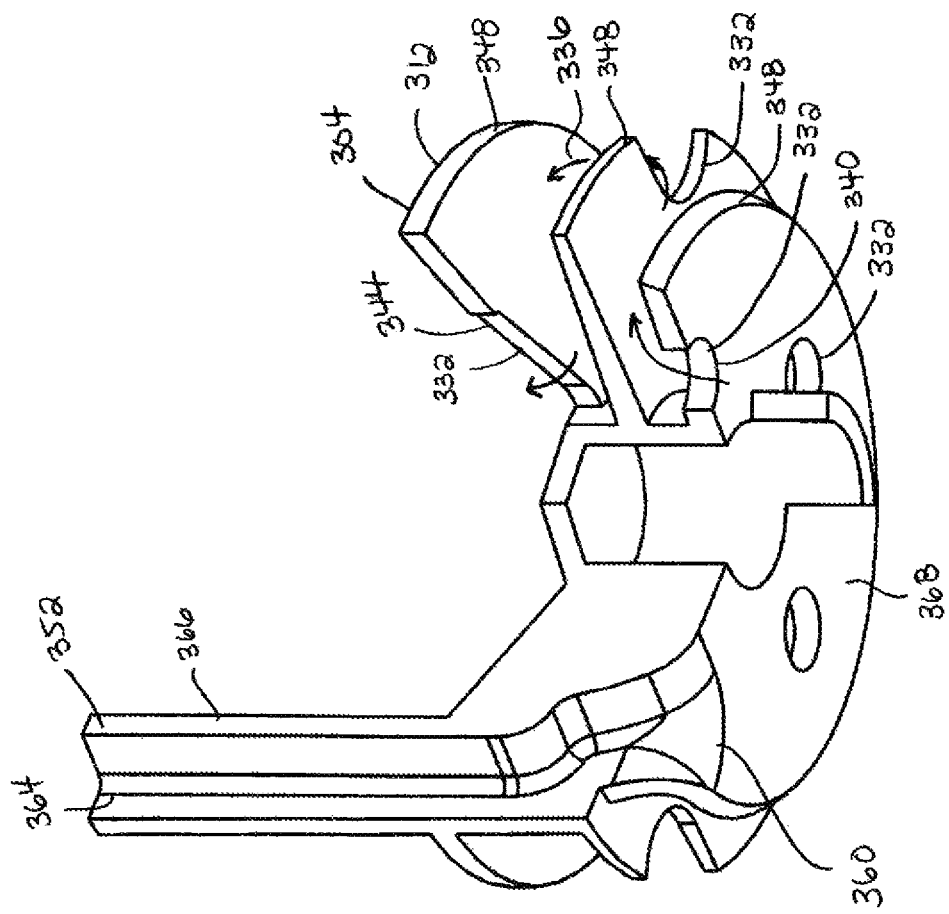
FIG. 22 is a lower cutaway view of the carbonation source carrier of the carbonation chamber of FIG. 18, with quarter section 21-21 of FIG. 20 cut away.

FIGS. 18-19 show a carbonation chamber 140 in accordance with an embodiment. As shown, carbonation chamber 140 may include chamber housing 288 having a fluid inlet 204, a gas outlet 208, a carbonation source inlet 292, and a byproduct outlet 156. As shown in FIG. 3, in use, fluid inlet 204 may be fluidly coupled to pump 148, gas outlet 208 may be fluidly coupled to carbonator outlet 128, and byproduct outlet 156 may be fluidly coupled to byproduct container 160. Returning to FIGS. 18-19, carbonation source inlet 292 may be open or closed according to the corresponding position of an exterior door 296 (FIG. 1).

In the illustrated embodiment, carbonation chamber 140 includes a carbonation source carrier 304 (e.g. platform, plate, table, or tray) located within chamber housing 288. Carbonation source carrier 304 may hold carbonation source at an elevation above chamber lower end 308 so the carbonation source does not enter an aqueous mixture that generates carbon dioxide until the liquid level of liquid within chamber housing 288 rises to the elevation of the carbonation source.

Reference is now made to FIGS. 19-22. As shown, carbonation source carrier 304 may include a carrier surface 312 that holds carbonation source prior to mixing with liquid. For example, carrier surface 312 may be an upwardly facing surface. Carrier surface 312 may define an upper surface of carbonation source carrier 304. In the illustrated embodiment, carrier surface 312 is aligned with (e.g. vertically aligned with) carbonation source inlet 292. This allows carbonation source deposited through carbonation source inlet 292 to (e.g. fall by gravity and) collect on carrier surface 312. In the example shown, carrier surface 312 is located at an elevation 316 above a lower end 324 of chamber inner volume 320. For example, an open portion 328 (i.e. where liquid can pool) of chamber inner volume 320 is located at an elevation below carrier surface 312, and may be equal to or greater than the predetermined minimum volume (e.g. at least 50 mL). Elevation 316 may be any corresponding distance, such as for example at least 5 mm, such as 5-100 mm). Open portion 328 may also be referred to herein as a "lower region" or "first region" of chamber inner volume 320.

Still referring to FIGS. 19-22, carbonation chamber fluid inlet 204 may be located anywhere relative to chamber housing 288 that allows liquid entering through fluid inlet 204 to pool prior to contacting the carbonation source (e.g. located on carrier surface 312). For example, fluid inlet 204 may be located below carrier surface 312 as shown so that the liquid is below carrier surface 312 from the moment of entering chamber housing 288. This may help prevent the entering liquid from inadvertently spraying onto carrier surface 312 upon entry into chamber housing 288. In turn, this may mitigate premature carbon dioxide generation, which may prematurely raise the system gas pressure, and consequently prematurely toggle the flow valve to fluidly disconnect the pump from the liquid reservoir before sufficient liquid for a complete reaction of carbonation source has been delivered to the carbonation chamber.

In other embodiments, fluid inlet 204 may be located above carrier surface 312, and oriented to direct the entering liquid to flow into the open portion 328 of chamber inner volume 320. An advantage of this design is that it can provide more flexibility in the positioning of fluid inlet 204, which may ultimately allow beverage carbonator 104 (FIG. 8) to accommodate a more compact arrangement of internal components. In turn, this may allow beverage carbonation system 100 (FIG. 3) to have a smaller overall form factor, which may be appreciated by users with limited counter space.

In some embodiments, carbonation source carrier 304 is formed essentially of a plate supported above chamber lower end 308 (e.g. by stand-offs). In some embodiments, carrier surface 312 may include one or more fluid openings 332 that allow liquid that has pooled in chamber housing 288 to flow onto carrier surface 312 and mix with the carbonation source supported thereon. Fluid openings 332 may be inset from a perimeter of carrier surface 312 as shown (i.e. may be surrounded by carrier surface 312) or may border carrier surface 312 (e.g. may be bordered by carrier surface 312 and chamber housing sidewall 334).

In some embodiments, fluid openings 332 may provide a passage for reaction byproduct to move from carrier surface 312 to byproduct outlet 156 when carbonation chamber 140 is evacuated. For example, byproduct outlet 156 may be located below carrier surface 312 (e.g. at lower end 324). In the illustrated example, byproduct outlet 156 borders open lower volume 328, such that fluid openings 332 accommodate both upwardly flow of liquid from lower volume 328, and a downwardly flow of reaction byproduct towards lower volume 328.

In alternative embodiments, carrier surface 312 does not have any fluid openings 332. Instead, accumulated liquid may flow onto carrier surface 312 in a different manner (e.g. pour from above).

Still referring to FIGS. 19-22, in some embodiments, carbonation source carrier 304 may include a non-linear liquid flow path 336 extending from a liquid inlet 340 to a liquid outlet 344. The liquid flow path 336 may define the path that liquid must follow to reach carrier surface 312. For example, chamber fluid inlet 204 may be fluidly connected to carrier surface 312 only by liquid flow path 336. This may help mitigate instances of liquid splashing onto carrier surface 312 upon entering chamber housing 288, and causing premature reactions. In some embodiments, liquid flow path 336 provides, in the reverse direction (i.e. from outlet 344 to inlet 340) a path for byproduct to flow to byproduct outlet 156. Moreover, non-linear liquid flow path 336 may prevent or reduce instances (or the amount) of carbonation source falling from carrier surface 312 to below carbonation source carrier 304, and reacting prematurely.

Liquid flow path 336 may be formed in any manner that mitigates liquid splashing onto carrier surface 312 upon entering chamber housing 288, and/or which provides an exit path for byproduct to byproduct outlet 156, and/or mitigates carbonation source falling to below carbonation source carrier 304 and reacting prematurely. In the illustrated embodiment, carbonation source carrier 304 includes a plurality of spaced apart floors 348. The top floor 348 may include carrier surface 312. As shown, each floor may include one or more fluid openings 332. In this example, opening(s) 332 in the top floor 348 may define a flow path outlet 344, and opening(s) 332 in bottom floor 348 may define a flow path inlet 340. As shown, openings 332 of adjacent floors 348 may be staggered (i.e. vertically misaligned) so that the resulting flow path 336 is non-linear (e.g. tortuous). This may help mitigate liquid splashing onto carrier surface 312 upon entering chamber housing 288. This may also help mitigate carbonation source falling to below carbonation source carrier 304 and mixing with liquid prematurely. For example, the offset openings 332 may generally limit carbonation source, which falls through an opening 332 in carrier surface 312 to falling only one floor 348 below.

Carbonation source carrier 304 may include any number of floors 348, and each floor can have any number of openings 332 of any size suitable to provide a non-linear flow path 336 that mitigates one or more of the issues noted above. For example, carbonation source carrier 304 may include at least two floor 348 (e.g. 2 to 20 floors 348), and each floor may have at least one opening 332 (e.g. 1-20 openings 332). In the illustrated embodiment, there are three floors 348, each of which has three openings 332.

In alternative embodiments, carbonation source carrier 304 does not have a plurality of floors 348. This may provide a design for carbonation source carrier 304 that is less complex and expensive to manufacture.

Still referring to FIGS. 19-22, carbonation chamber fluid inlet 204 may admit carbon dioxide gas into carbonation chamber 140 (e.g. during a gas recirculation system state, FIG. 5). The gas may enter chamber housing 288 at fluid inlet 204 and exit through gas outlet 208. In some embodiments, the gas flow from fluid inlet 204 to gas outlet 208 may help to agitate the mixture of liquid and carbonation source to promote a complete reaction (i.e. leaving no unreacted carbonation source). For example, gas entering at fluid inlet 204 may bubble up through the liquid along a path crossing carrier surface 312 before exiting gas outlet 208. This may agitate any remaining carbonation source that has not completely reacted to mix with the liquid and produce carbon dioxide gas. In some embodiments, carbonation chamber 140 may include a fluid flow path 336, and some or all gas entering at fluid inlet 204 may travel along fluid flow path 336 from path inlet 340 to path outlet 344 across carrier surface 312 before exiting through gas outlet 208.

Aside from carbon dioxide gas, the byproduct of the reaction between the carbonation source and liquid is referred to herein as byproduct or reaction byproduct (also referred to as liquid byproduct if it has a liquid form). The byproduct may be have a viscosity greater than water (e.g. a paste-like consistency) or a viscosity equal to or less than water. In some cases, the byproduct may prevent or hinder (e.g. slow) liquid from traveling through fluid flow path 336 into contact with unreacted carbonation source on carrier surface 312. For example, the generated byproduct may clog fluid flow path 336 during a carbonation operation. This may also prevent or hinder gas from flowing through fluid flow path 336 across carrier surface 312 to agitate the aqueous mixture of incompletely reacted carbonation source and liquid.

In some embodiments, chamber housing 288 may include a recirculation conduit 352 that bypasses fluid flow path 336. Recirculation conduit 352 may provide a passage for fluid when, for example fluid flow path 336 is partially or completely obstructed. As shown, recirculation conduit 352 (also referred to as bypass conduit 352) may extend from a conduit inlet 360 to a conduit outlet 364. Conduit inlet 360 may be located proximate chamber lower end 308 (or at least closer to chamber lower end 308 than conduit outlet 364). For example, conduit inlet 360 may be located at or below carrier lower end 368 as shown. Conduit outlet 364 is located above conduit inlet 360. For example, conduit outlet 364 may be located above a liquid level inside chamber housing 288. This may reduce the possibility that byproduct formed in chamber housing 288 will flow into recirculation conduit 352. In the illustrated example, conduit outlet 364 is located above carrier surface 312. For example, an elevation separation 372 between carrier surface 312 and conduit outlet 364 may be at least 5 mm (e.g. between 5 mm and 100 mm). Such separation distance 372 may prevent or reduce byproduct splashing into conduit outlet 364, and may accommodate variation in the liquid level. Other separation distances 372 may be used depending on the context.

In use, gas entering fluid inlet 204 may flow up through recirculation conduit 352, and exit through gas outlet 208. As shown, gas outlet 208 may be located above carrier surface 312, such as at or proximate chamber housing upper end 376. When gas flows through recirculation conduit 352, the gas may drive/carry with it liquid. The entrained liquid may exit conduit outlet 364 and then fall by gravity onto carrier surface 312. Thus, recirculation conduit 352 may also help move liquid to carrier surface 312 to react with incompletely reacted carbonation source.

Still referring to FIGS. 19-22, recirculation conduit 352 may be formed in any manner suitable to allow gas entering carbonation chamber 140 to bypass carrier surface 312. For example, recirculation conduit 352 may be formed by chamber housing 288 (e.g. by chamber housing sidewall 334), by carbonation source carrier 304, or by a discrete member (e.g. conduit extending between chamber housing sidewall 334 and carbonation source carrier 304). In the illustrated embodiment, recirculation conduit 352 includes conduit sidewalls 366 formed collectively by carbonation source carrier 304 and chamber housing sidewall 334. As shown, recirculation conduit 352 may extend (e.g. be located) laterally outboard of carrier surface 312. In alternative embodiments, recirculation conduit 352 may extend through carrier surface 312 (e.g. centrally through carrier surface 312).

In various embodiments, carbonation chamber 140 may include fluid flow path 336, or recirculation conduit 352, or both (as shown), or neither. In some embodiments, carbonation chamber 140 may include a gas inlet separate from fluid inlet 204. The discrete gas inlet may be located above, below, or level with carrier surface 312. As an example, system 100 (FIG. 3) may include a separate gas recirculation pump to recirculate gas from carbonator inlet 132 to carbonator outlet 128 across carbonation chamber 140 (FIG. 5).

Reference is now made to FIGS. 23-33, which illustrate steps in the operation of carbonation chamber 140, in accordance with an embodiment.

Figure 23:
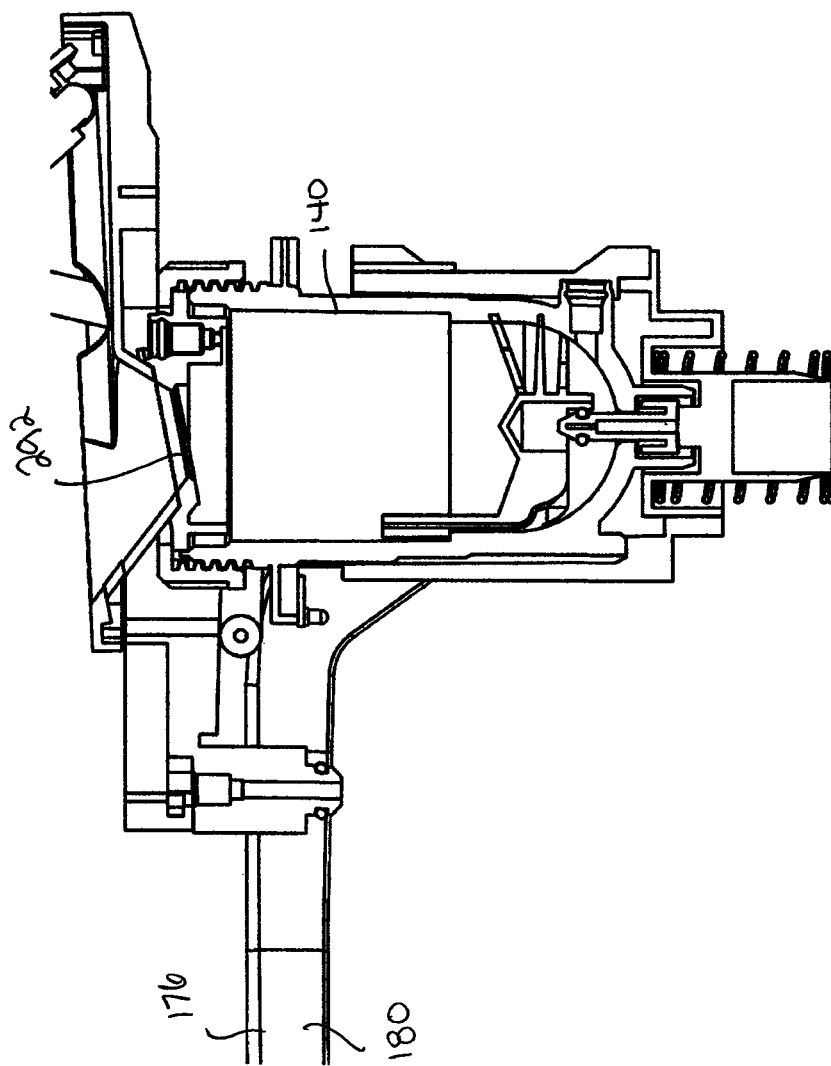
FIG. 23 is a partial cross-sectional view taken along line 8-8 in FIG. 1, with a container engagement actuator in a disengaged position.
Figure 31:
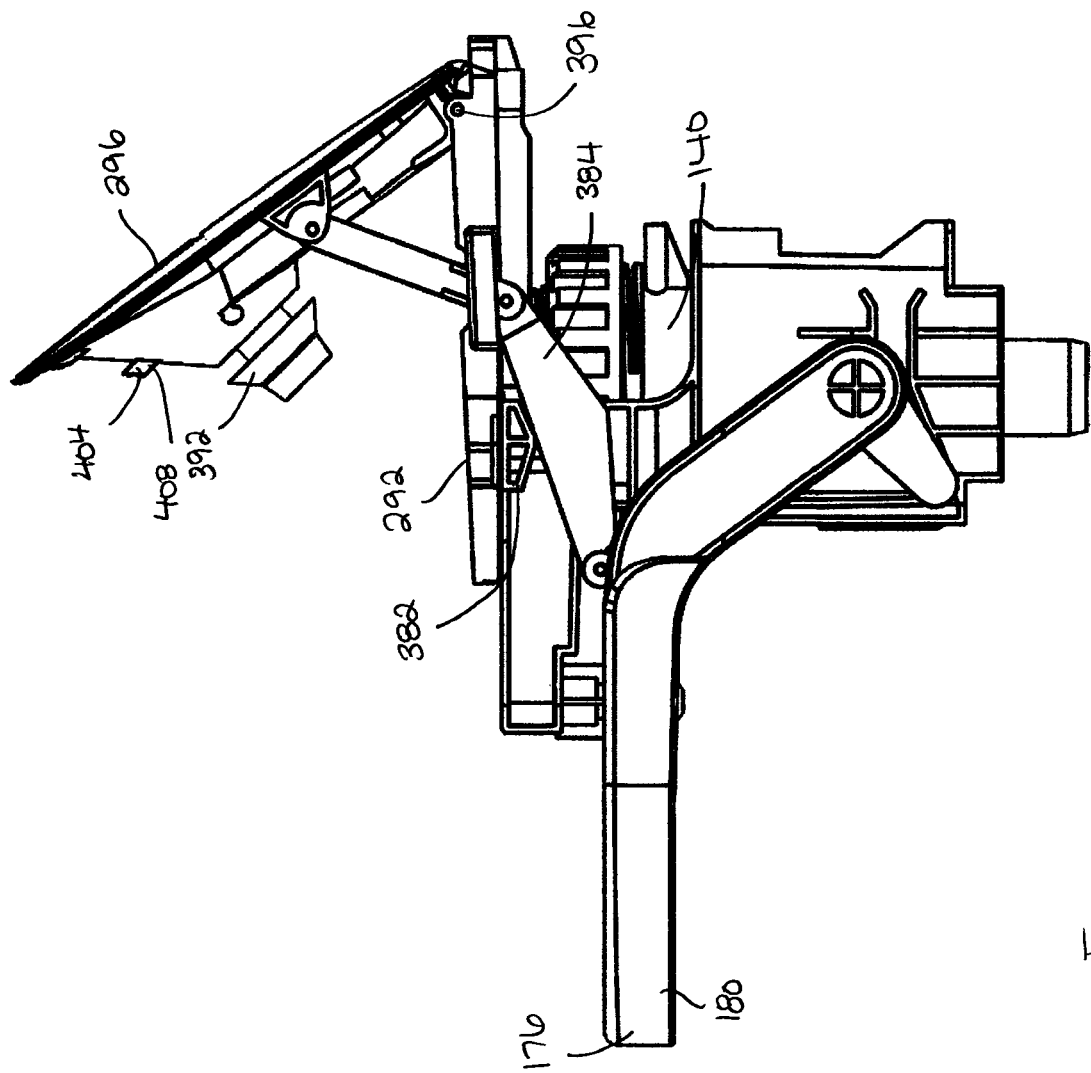
FIG. 31 is a side-elevation view of an engagement actuator and carbonation chamber of the beverage carbonator of FIG. 1, with the engagement actuator in a disengaged position and exterior door opened.

FIGS. 23 and 31 show carbonation chamber 140 when in the container disengaged position, with exterior door 296 open to allow carbonation source to be deposited through carbonation source inlet 292. As shown, container engagement actuator 176 is in the disengaged position (e.g. lever 180 is fully raised). Pump 148 (FIG. 3) is deactivated. In the illustrated state ("container disengaged state"), liquid reservoir 144 (FIG. 8) may be filled if depleted of liquid (e.g. water). For example, liquid reservoir 144 may be filled in-situ (e.g. if not removable from carbonator 104) or may be removed from carbonator 104 to fill and then reconnected to carbonator 104. As shown in FIG. 8, liquid reservoir 144 has a handle 380 that a user can grasp to remove and replace liquid reservoir 144 on carbonator 104.

Figure 24:
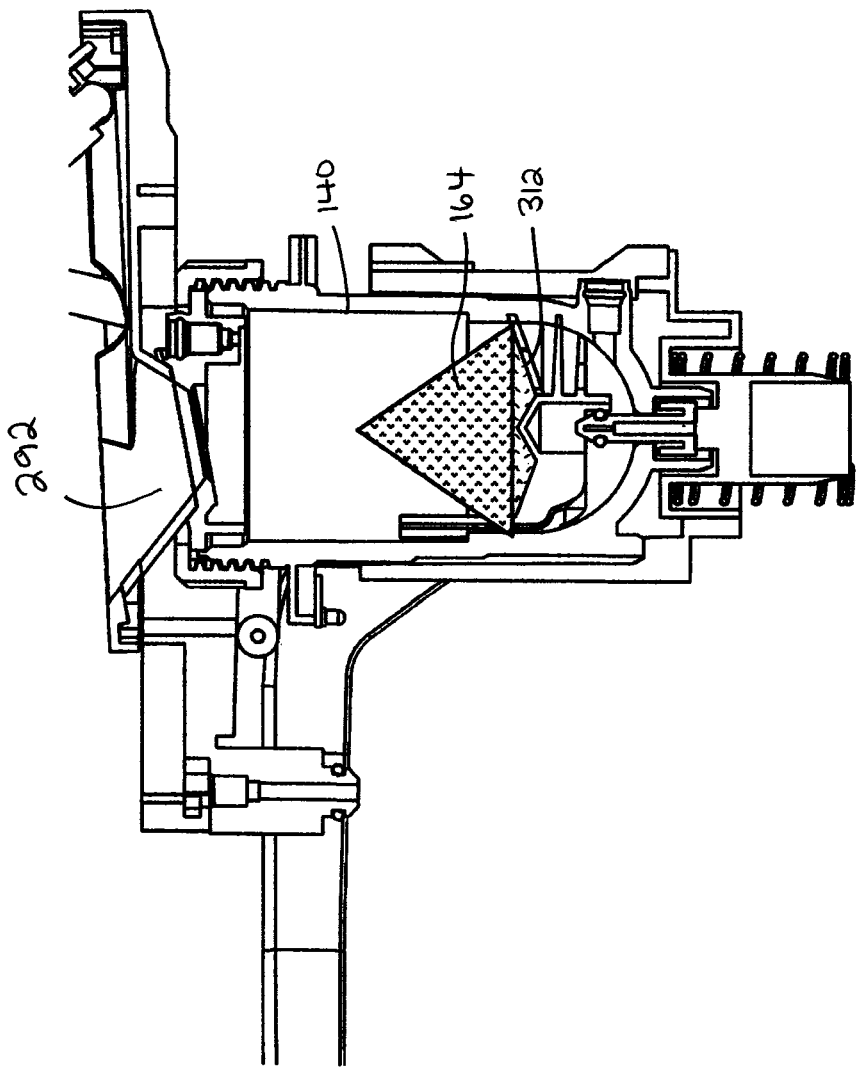
FIG. 24 is the partial cross-sectional view of FIG. 23, with carbonation source deposited into the carbonation chamber.

FIG. 24 shows carbonation chamber 140 after carbonation source 164 has been deposited into carbonation chamber through the opened carbonation source inlet 292. As compared with FIG. 23, carbonation source 164 is seen carried on (e.g. piled onto or mounded on) carrier surface 312. For example, carbonation source 164 may have fallen by gravity from carbonation source inlet 292 onto carrier surface 312.

Figure 25:
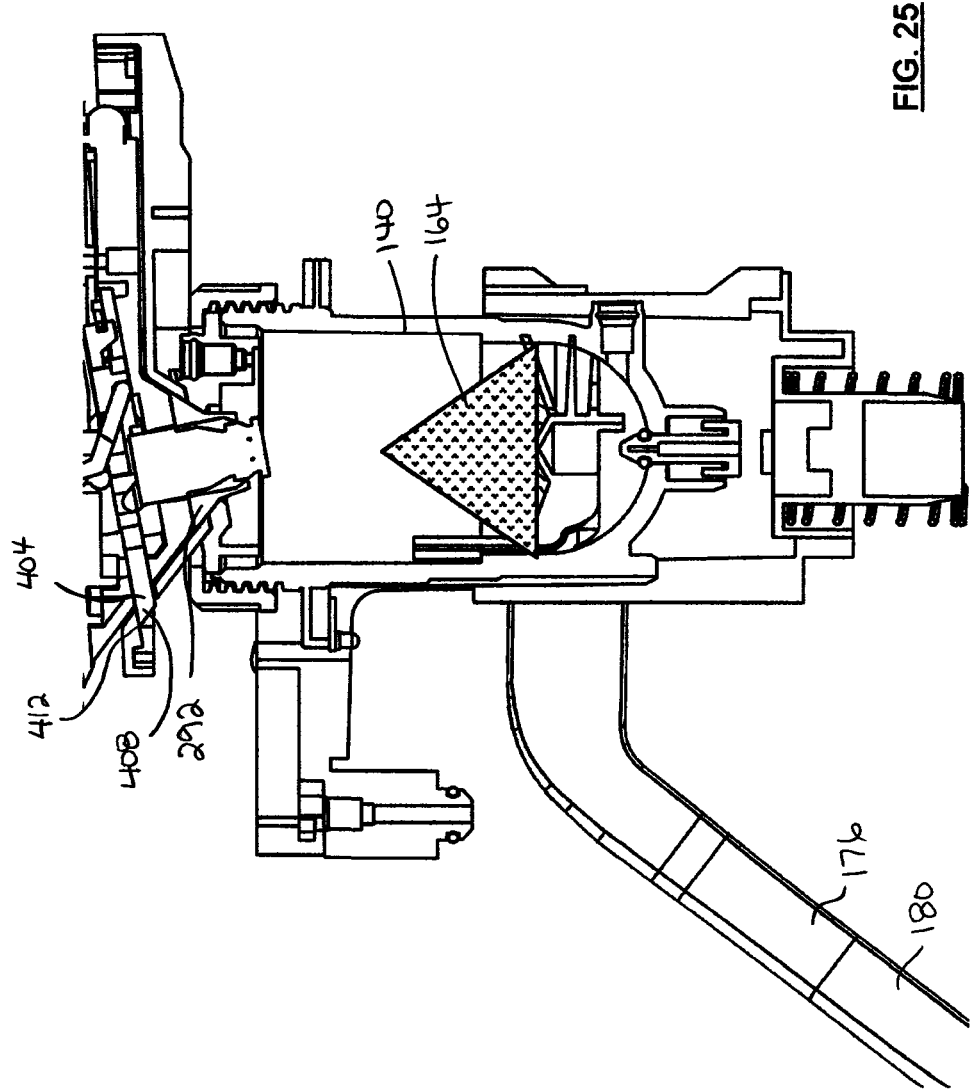
FIG. 25 is the partial cross-sectional view of FIG. 23, with the container engagement actuator in an engaged position.
Figure 32:
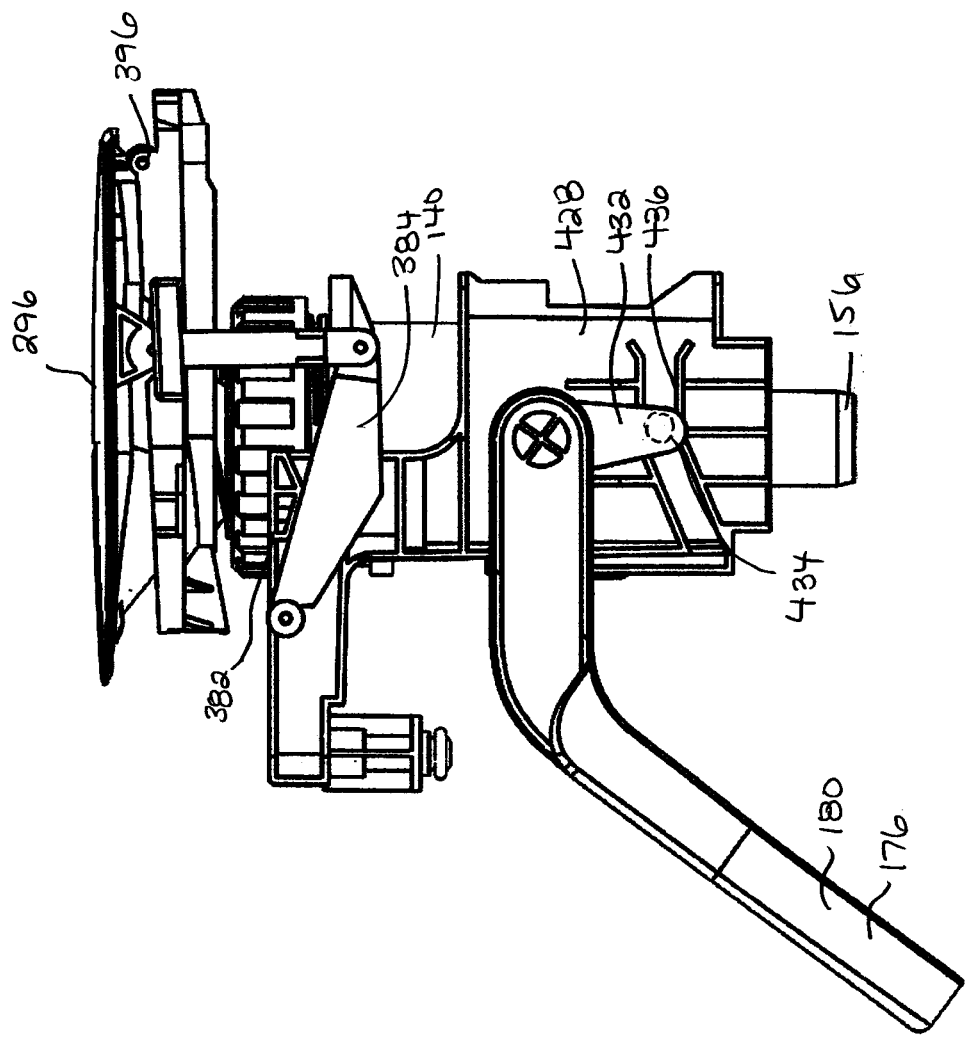
FIG. 32 is the side elevation view of FIG. 31, with the engagement actuator in an engaged position and exterior door closed.

FIGS. 25 and 32 show carbonation chamber 140 after exterior door 296 is closed to seal carbonation source inlet 292. As shown, container engagement actuator 176 is in the engaged position (e.g. lever 180 is fully lowered by the user). In the illustrated example, moving container engagement actuator 176 to the engaged position causes exterior door 296 to close. This may prevent a user from accidentally leaving exterior door 296 open when a carbonation operation is activated. In the illustrated example, container engagement actuator 176 is mechanically connected to exterior door 296. As shown by comparison of FIGS. 31 and 32, container engagement actuator 176 may drive a door closure guide 382 to bear upon door linkage 384, whereby door linkage 384 articulates to move exterior door 296 to the closed position. In other embodiments, an electronic controller 388 (FIG. 35) may activate an electro-mechanical device (e.g. motor or solenoid) to close exterior door 296 in coordination with the movement of container engagement actuator 176 to the container engaged position.

In some embodiments, exterior door 296 can optionally be manually closed by the user prior to moving container engagement actuator 176 to the engagement position. That is, when container engagement actuator 176 is in the disengaged position, exterior door 296 may not be prevented from closing. This mitigates a user damaging exterior door 296 by attempting to manually close exterior door 296 while engagement actuator 176 is in the disengaged position. In this case, moving container engagement actuator 176 to the engaged position causes exterior door 296 to close only if exterior door 296 was not already manually closed by the user.

Exterior door 296 may seal carbonation source inlet 292 in any manner that inhibits carbon dioxide gas generated within carbonation chamber 140 from escaping through carbonation source inlet 292. In the illustrated embodiment, exterior door 296 includes a seal 392 (also referred to as a sealing member, or gasket) that allows exterior door 296 to provide a gas-tight seal of carbonation source inlet 292 when in the closed position. Exterior door 296 may be movable in any manner that allows exterior door 296 to open and close carbonation source inlet 292. For example, exterior door 296 may rotate, translate, or both between the open position (FIG. 31) and the closed position (FIG. 32). In the illustrated example, exterior door 296 is pivotably openable by a hinge 396.

In some embodiments, exterior door 296 may be inhibited from re-opening by a door lock 404. This may prevent a user and/or system gas pressure (e.g. within carbonation chamber 140) from forcing exterior door 296 open during carbonation and/or evacuation operations. Door lock 404 may be movable from a locked position (FIG. 25) in which door lock 404 inhibits exterior door 296 from opening, and an unlocked position in which door lock 404 is disengaged (i.e. does not impede exterior door 296 from opening). Door lock 404 can have any configuration suitable to inhibit exterior door 296 from opening when in the locked position. In the illustrated example, door lock 404 includes a latch bolt 408 that extends into a lock recess 412 in the locked position and retracts from the lock recess 412 in the unlocked position.

Figure 26:
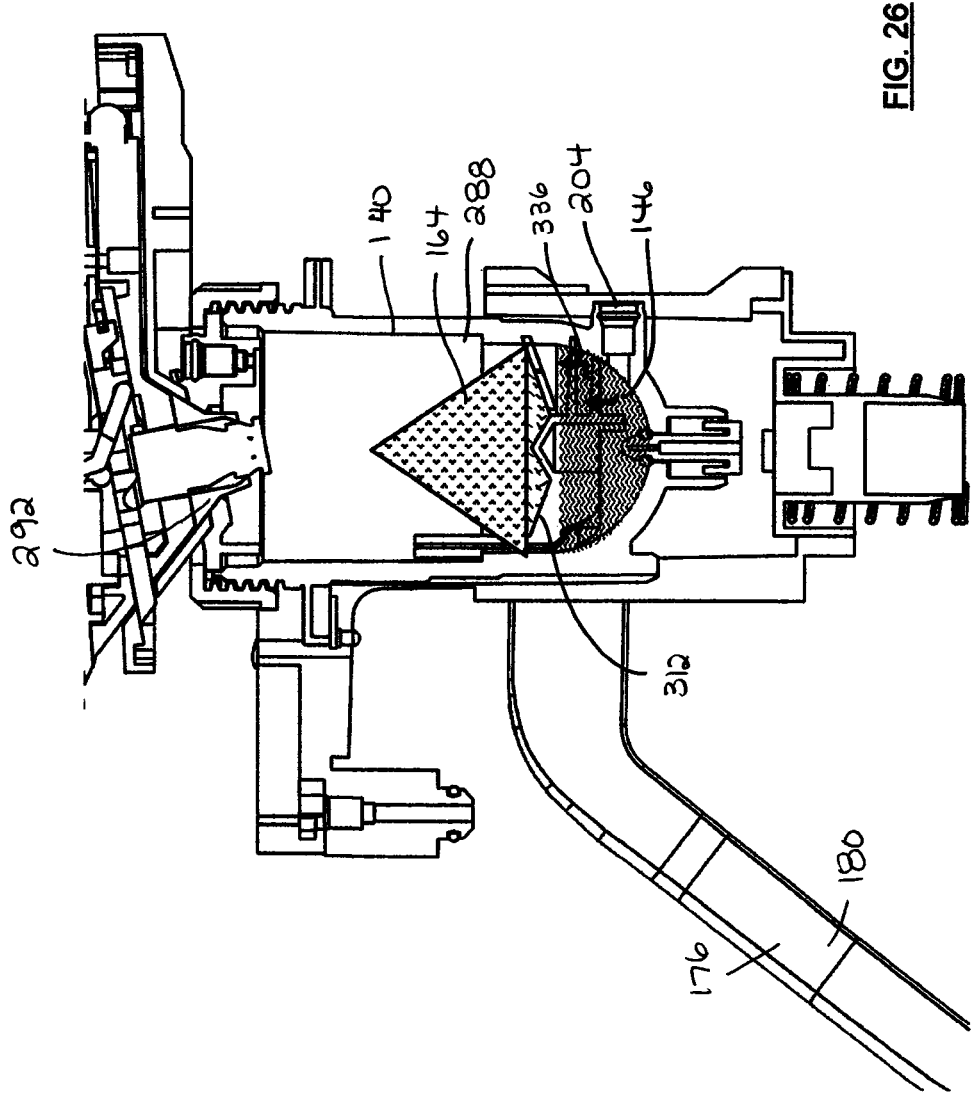
FIG. 26 is the partial cross-sectional view of FIG. 23, with the container engagement actuator in the engaged position and liquid pooling in the carbonation chamber.

Reference is now made to FIG. 26. After depositing carbonation source 164, engaging the beverage container with the beverage carbonator, and closing carbonation source inlet 292, system 100 (FIG. 1) may begin the carbonation operation. The carbonation operation may be started in any suitable manner. For example, the carbonation operation may begin automatically upon moving container engagement actuator 176 to the closed position (indeed, moving container engagement actuator 176 may be performed as part of the carbonation operation). In some embodiments, moving lever 180 to the engaged position signals controller 388 (FIG. 35) to begin the carbonation operation. In the illustrated example, a user may interact with (e.g. make a user-selection using) one or more user inputs 416 (FIG. 1). For example, user inputs 416 may include a "START" button, which may be activated to trigger controller 388 (FIG. 35) to execute the carbonation operation. Optionally, user inputs 416 may permit the user to configure one or more parameters of the carbonation operation, such as for example desired carbonation level (e.g. corresponding to a duration of the gas recirculation state).

FIG. 26 illustrates carbonation chamber 140 when in the reservoir draw state (described above in connection with FIG. 4). As shown, liquid 146 may be pumped into carbonation chamber 140 through fluid inlet 204, and begin pooling within chamber housing 288 prior to making contact with carbonation source 164. In the illustrated example, liquid 146 is shown rising upwardly through fluid flow path 336 towards carrier surface 312.

Figure 27:
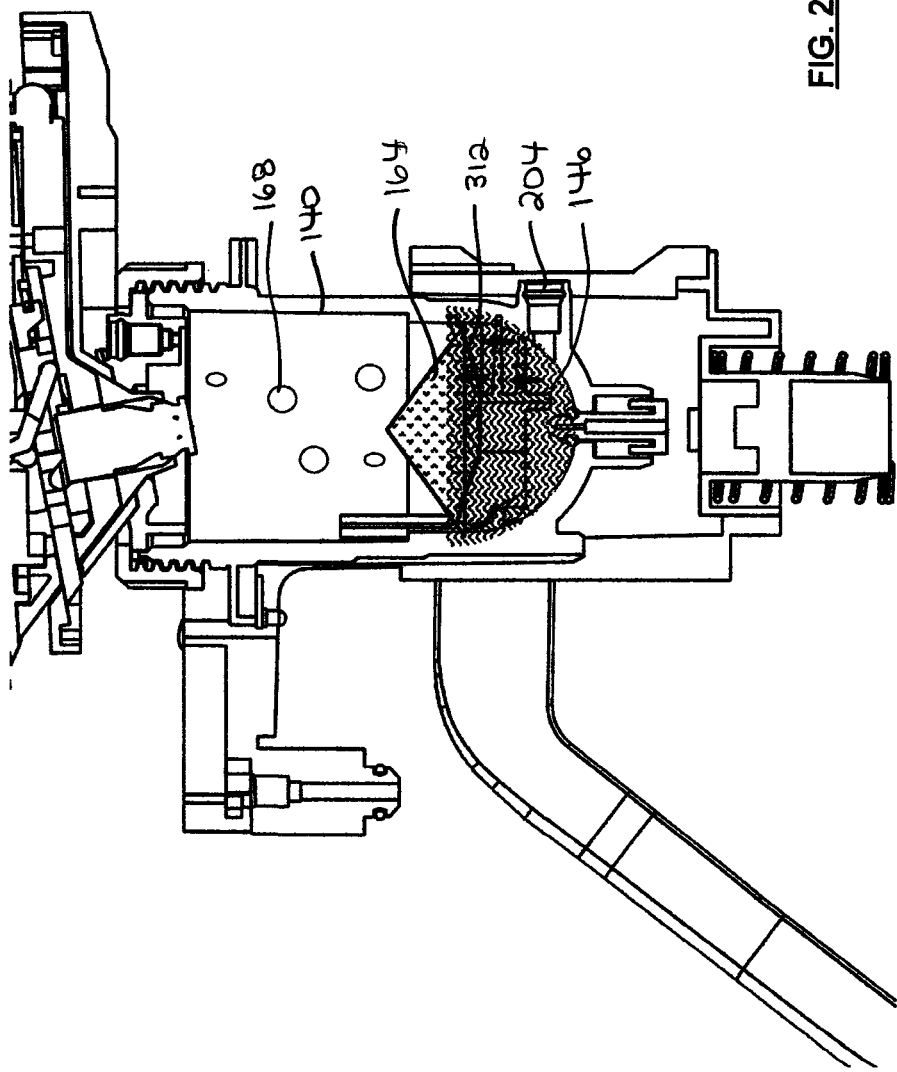
FIG. 27 is the partial cross-sectional view of FIG. 23, with the container engagement actuator in the engaged position, and gas recirculating through the carbonation chamber.

FIG. 27 illustrates carbonation chamber 140 at the start of the gas recirculation state (described above in connection with FIG. 5). As shown, liquid 146 has risen above carrier surface 312 and carbon dioxide production is well underway. The system gas pressure (e.g. within carbonation chamber 140 or elsewhere) may exceed the predetermined threshold, whereby the pump has been fluidly disconnected from the liquid reservoir and instead fluidly connected to the carbonator inlet. Carbon dioxide gas continues to be generated by yet unreacted carbonation source (i.e. carbonation source that has not completely reacted), and is recirculated continuously through the beverage container. The duration of the recirculation state may determine the degree of carbonation of the resulting beverage (i.e. determine the partial pressure of dissolved carbon dioxide gas in the resulting beverage), and in some embodiments this duration is determined by the controller 388 (FIG. 35) based at least in part on user selections made with user input(s) 416 (FIG. 1).

Figure 28:
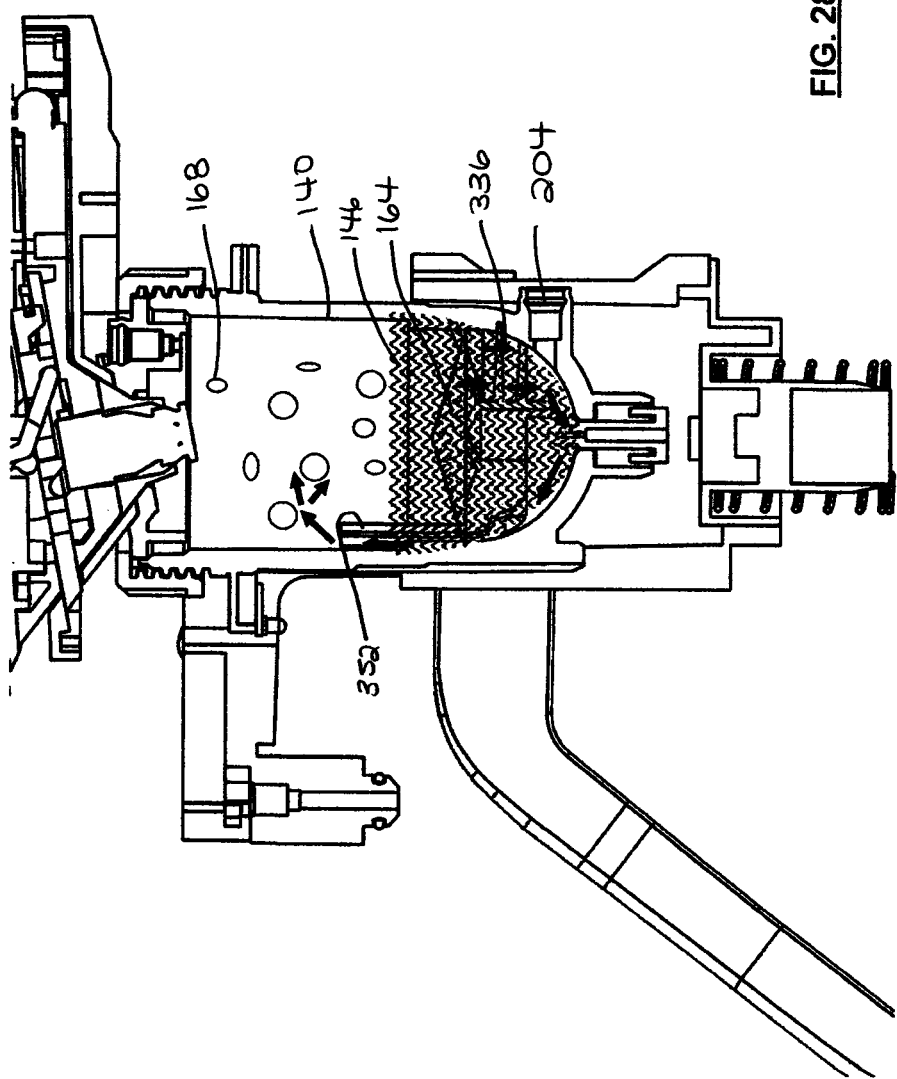
FIG. 28 is the partial cross-sectional view of FIG. 23, with the container engagement actuator in the engaged position, and gas recirculating through the carbonation chamber.

FIG. 28 illustrates carbonation chamber 140 part way through the duration of the gas recirculation state (described above in connection with FIG. 5). As shown, gas entering carbonation chamber 140 through fluid inlet 204 may bubble up through flow path 336 as well as recirculation conduit 352 to promote rapid mixing of carbonation source 164 and liquid 146.

Figure 29:
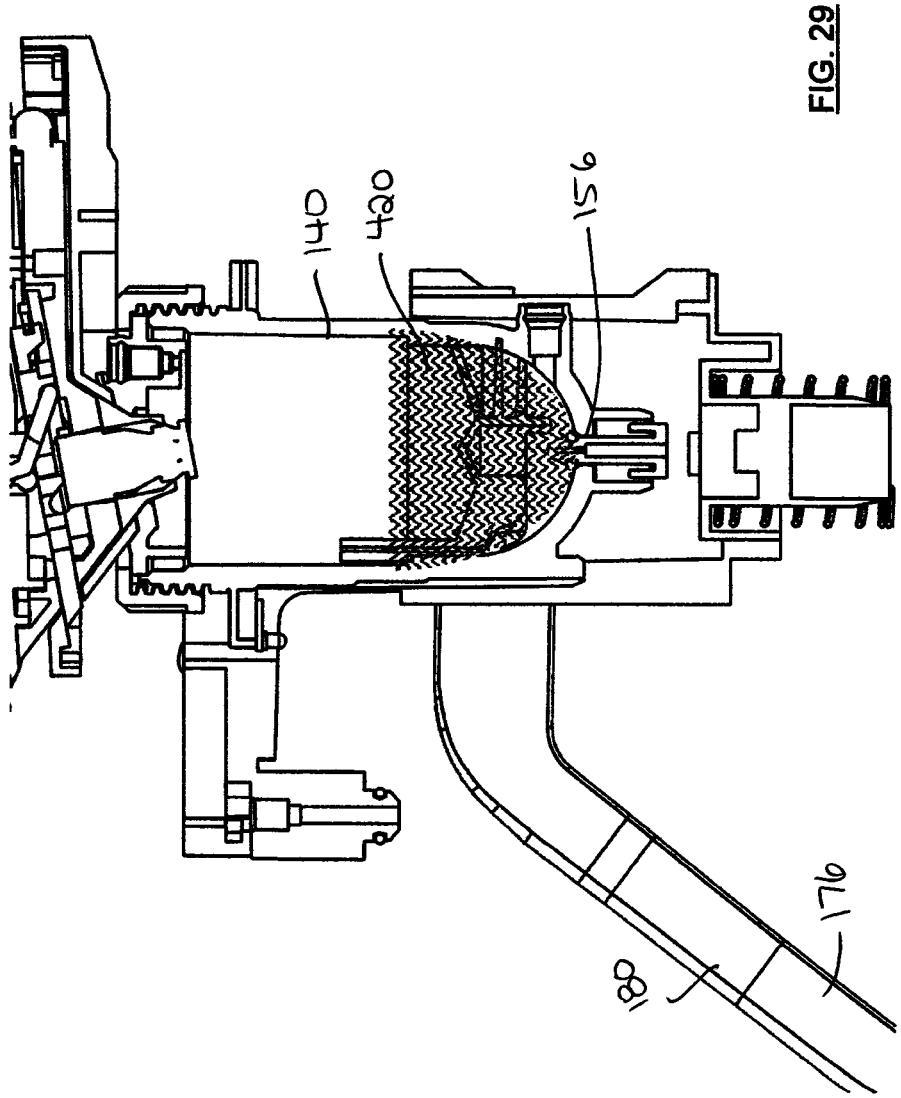
FIG. 29 is the partial cross-sectional view of FIG. 23, with the container engagement actuator in the engaged position, and gas recirculation terminated.

FIG. 29 illustrates carbonation chamber 140 at the moment the gas recirculation state is terminated. As shown, the reaction in the aqueous mixture of carbonation source and liquid has completed, leaving only liquid byproduct 420 behind. Byproduct outlet 156 is shown in a closed position. In the illustrated example, container engagement actuator 176 is still in the engaged position as shown in FIG. 32.

Figure 30:
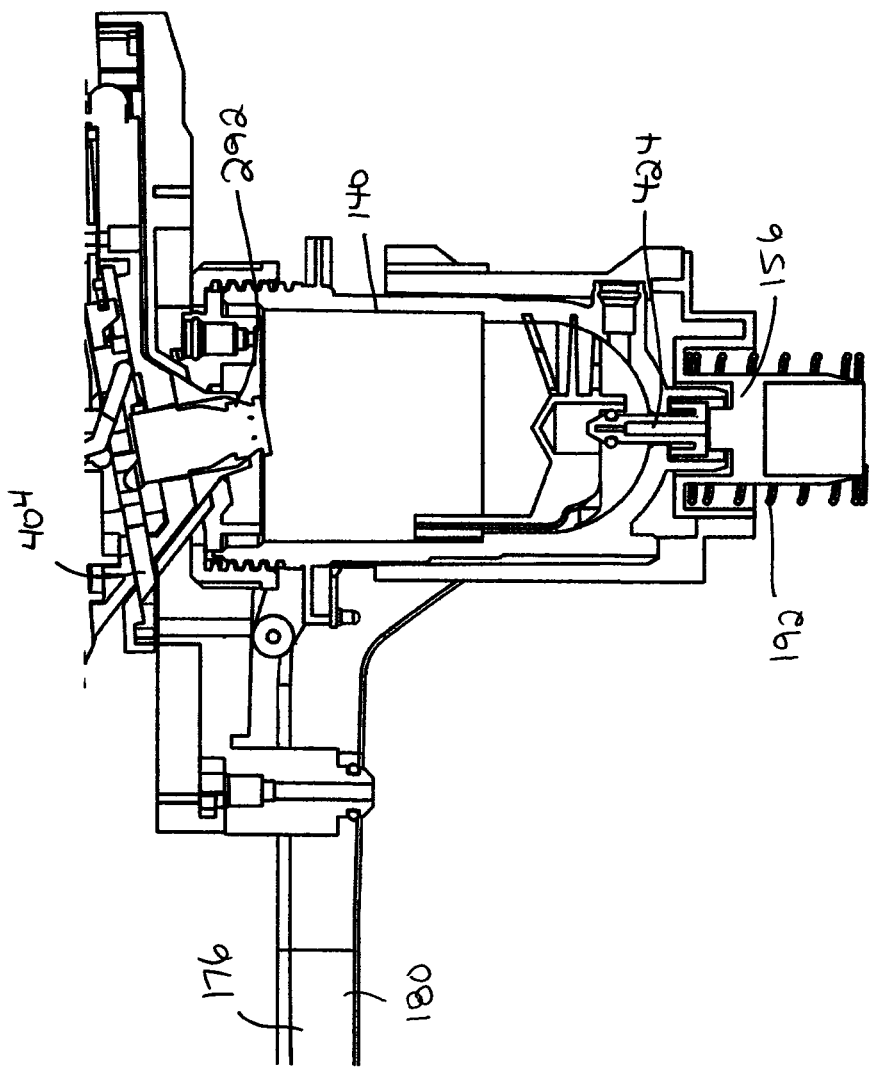
FIG. 30 is the partial cross-sectional view of FIG. 23, with the container engagement actuator in the disengaged position, and byproduct evacuating the carbonation chamber.

FIG. 30 illustrates carbonation chamber 140 after above-atmospheric gas pressure is trapped within carbonation chamber 140, and byproduct outlet 156 is opened whereby liquid byproduct in carbonation chamber 140 is evacuated through byproduct outlet 156 into byproduct chamber 160 (FIG. 6). For example, a pressure difference between the above-atmospheric carbonation chamber 140 and the atmospheric byproduct chamber 160 (FIG. 6) may result in the contents of carbonation chamber 140 exiting rapidly through byproduct outlet 156 into byproduct chamber 160 (FIG. 6) when byproduct outlet 156 is opened.

Byproduct outlet 156 may be configured to be openable in any manner. In the illustrated embodiment, byproduct outlet 156 includes a byproduct outlet valve 424. As shown, byproduct outlet valve 424 may remain in the closed position during the reservoir draw state and gas recirculation state, and may be opened after sealing above-atmospheric system gas pressure within at least carbonation chamber 140 to evacuate carbonation chamber 140 of byproduct.

Byproduct outlet valve 424 may be moved between the open and closed position in any manner. For example, byproduct outlet valve 424 may be directly electronically actuated by electronic controller 388 (FIG. 35), or mechanically actuated (e.g. manually by the user, or automatically by an interaction with other system components). In the illustrated example, byproduct outlet valve 424 is biased to the closed position (e.g. by a valve bias 192), and opens automatically upon moving container engagement actuator 176 to the disengaged position (e.g. raising lever 180 to disengage the beverage container). As can been seen by comparing FIGS. 32-33, container engagement actuator 176 may be coupled to a valve actuator 428 that opens byproduct outlet valve 424 (FIG. 30) in accordance with the position of container engagement actuator 176. For example, when lever 180 is moved (e.g. raised) to the disengaged position (FIG. 33), valve actuator 428 may open outlet valve 424 (FIG. 30) (e.g. against the force of valve bias 192). Similarly, when lever 180 is moved (e.g. lowered) to the disengaged position, valve actuator 428 may disengage byproduct outlet valve 424 (FIG. 30) whereby valve bias 192 (FIG. 30) may close byproduct outlet valve 424 (FIG. 30).

Engagement actuator 176 may be mechanically coupled to valve actuator 428 in any manner that moves valve actuator 428 to engage (i.e. open) byproduct outlet valve 424 and disengage (e.g. close or allow closure of) byproduct outlet valve 424 (FIG. 30) based on the position of container engagement actuator 176. In the illustrated example, lever 180 includes a crank 432 with a slider 434, and valve actuator 428 includes an angled slide track 436. As shown, rotating lever 180 from the engaged position (FIG. 32) and the disengaged position (FIG. 33) moves crank 432 whereby the connected slider 434 slides along angled slide track 436. This causes valve actuator 428 to rise into engagement with byproduct outlet valve 424 (FIG. 30), whereby byproduct outlet valve 424 is opened.

Figure 33:
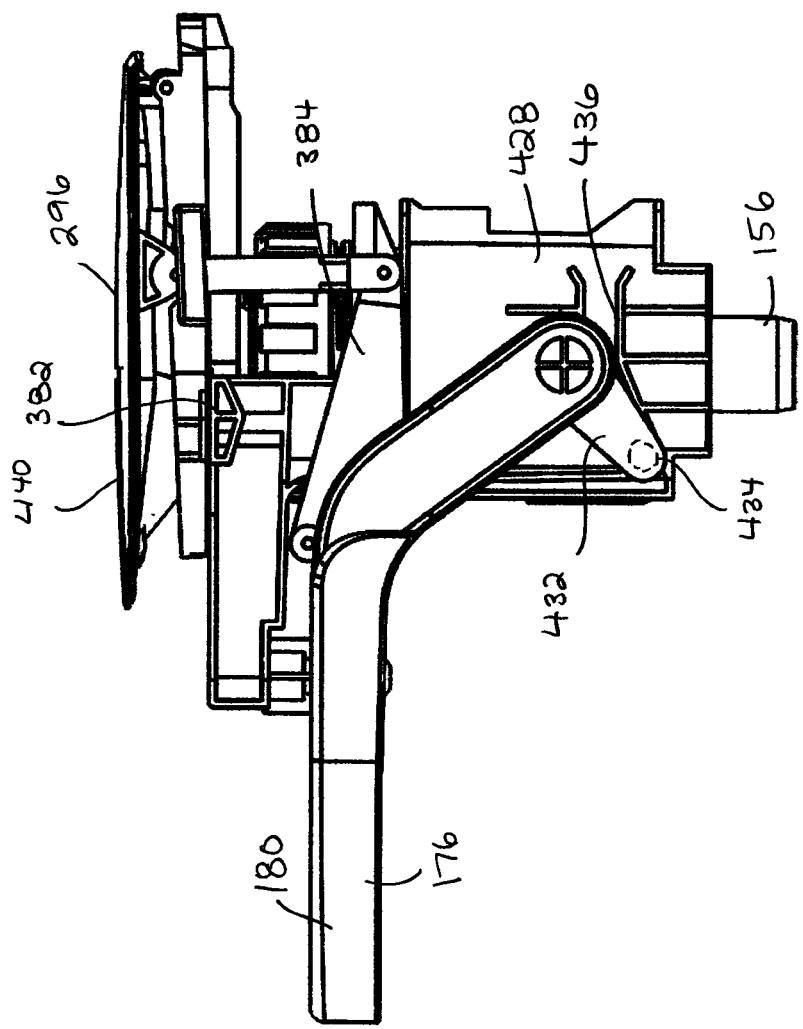
FIG. 33 is the side elevation view of FIG. 31, with the engagement actuator in the disengaged position and exterior door closed.

Referring to FIGS. 30 and 33, when container engagement actuator 176 is moved to the disengaged position (e.g. when system 100 is moved into the container disengaged state), exterior door 296 may remain closed, and door lock 404 may remain engaged. This may inhibit the above-atmospheric system pressure within carbonation chamber 140 from escaping through carbonation source inlet 292, before evacuating through byproduct outlet 156. For example, door closure guide 382 may be positioned so that it does not interact with exterior door linkage 384 when lever 180 is moved to the disengaged position.

When in the container disengaged state, exterior door 296 may be openable in any manner that allows first for the evacuation of carbonation chamber 140 to be completed. For example, electronic controller 388 (FIG. 35) may release door lock 404, and/or open exterior door 296 after a delay (e.g. predetermined delay) from the time container engagement actuator 176 is moved to the disengaged position, or after detecting that carbonation chamber 140 evacuation has completed (e.g. based upon a gas pressure in carbonation chamber 140 being less than or equal to a predetermined threshold—such as atmospheric pressure).

In the illustrated embodiment, door lock 404 may be released and exterior door 296 opened by a user-operable lock release actuator 440. Lock release actuator 440 may be a lever as shown, a button, or another manually user-operable device. In use, the user may activate user-operable release actuator 440, at least a few seconds after raising lever 180 to the disengaged position, to release door lock 404 and open exterior door 296.

Figure 34:
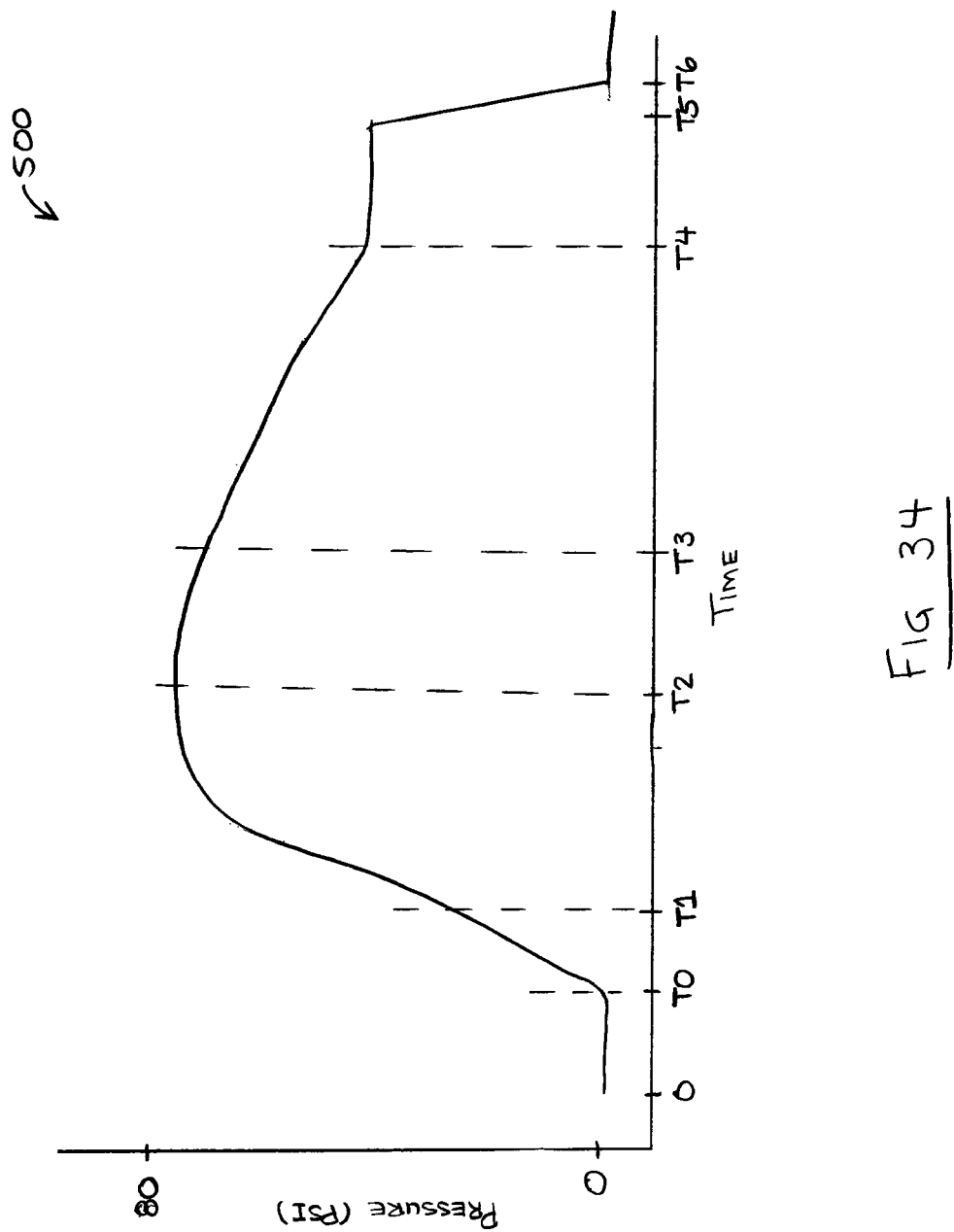
FIG. 34 is a pressure curve of system gas pressure during a carbonation operation.

FIG. 34 shows a pressure curve 500 showing a system gas pressure within the beverage carbonator during a carbonation operation, in accordance with an embodiment. The plotted time and pressure values shown are examples reflecting only some embodiments. Other embodiments may produce a different curve. The general shape of curve 500 may apply to many embodiments. The pressure values shown are gage pressures, where 0 psi means 0 psi above atmospheric pressure.

Referring to FIG. 3 an 34, at time T0 system 100 is in a reservoir draw state and the reaction in the aqueous mixture of liquid 146 and carbonation source 164 has just begun. The system gas pressure within beverage carbonator 104 rises to the predetermined threshold for flow valve 152 at T1. Thus, at T1 system 100 changes to the gas recirculation state. Hereafter, beginning at T1, system gas pressure is (i) increased by carbon dioxide generation inside carbonation chamber 140 and (ii) decreased by carbon dioxide absorption by beverage 112.

At T2, the system gas pressure peaks and then begins to fall, which illustrates that the rate of carbon dioxide absorption equals and then begins to exceed the rate of carbon dioxide generation. This happens as a result of the unreacted carbonation source 164 within carbonation chamber 140 beginning to deplete.

At T3, all of the carbonation source 164 has been fully reacted and no further carbon dioxide gas is generated. The loss of system gas pressure is a result of carbon dioxide absorption into beverage 112.

At T4, system 100 is in a container sealed state, and the remaining system gas pressure is retained in at least carbonation chamber 140.

At T5, byproduct outlet 156 is opened, and the system gas pressure is vented through byproduct outlet 156 to evacuate carbonation chamber 140 into byproduct container 160.

At T6, evacuation of byproduct container 160 is completed and the system gas pressure is at atmospheric. Byproduct container 160 may be removed from carbonator 104 and emptied (e.g. in a byproduct bin or sink) and then reconnected to carbonator 104.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1: A method of carbonating a beverage comprising:
(i) providing a beverage container connected to a beverage carbonator,
the beverage container having a container inner volume, a carbonated beverage in the container inner volume, a container inlet valve, and a container outlet valve,
the beverage carbonator having a carbonator outlet valve, a carbonator inlet valve, and a fluid flow path extending between the carbonator outlet valve and the carbonator inlet valve,
wherein the container inlet valve and the carbonator outlet valve are both open and fluidly coupled to each other, and the container outlet valve is open and fluidly coupled to the carbonator inlet;
(ii) after (i), closing the carbonator outlet valve thereby retaining an above-atmospheric system pressure within the fluid flow path; and
(iii) simultaneously with or after (ii), closing the container inlet valve and the container outlet valve to hermetically seal the container inner volume.

Item 2: The method of any preceding item, further comprising:
(iv) simultaneously with or after (iii), unsealing the carbonator outlet from the container inlet and unsealing the container outlet from the carbonator inlet.

Item 3: The method of any preceding item, wherein:
step (i) comprises creating reaction byproduct in a carbonation chamber that is in the fluid flow path and that is fluidly coupled to the carbonator outlet valve; and
said closing the carbonator outlet valve stops gas contained within the carbonation chamber at the above-atmospheric system pressure from exhausting through the carbonator outlet valve.

Item 4: The method of any preceding item, further comprising:
- (iv) after (ii), opening a carbonation chamber byproduct outlet to a byproduct container, whereby a gas pressure difference between the carbonation chamber and the byproduct container drives the reaction byproduct from the carbonation chamber into the byproduct container.

Item 5: The method of any preceding item, further comprising:
- manually moving a lever of the beverage carbonator to a disengaged position,
- wherein steps (ii) and (iii) are performed as a consequence of said manually moving the lever to the disengaged position.

Item 6: The method of any preceding item, wherein:
- steps (ii) and (iii) are performed by a mechanical force provided by said manually moving the lever.

Item 7: The method of any preceding item, further comprising:
- manually moving a lever of the beverage carbonator to a disengaged position,
- wherein steps (ii), (iii), and (iv) are performed as a consequence of said manually raising the lever.

Item 8: The method of any preceding item, wherein step (i) comprises:
- engaging the carbonator inlet with the container outlet valve to open the container outlet valve, and
- engaging the carbonator outlet valve with the container inlet valve to open the container inlet valve.

Item 9: The method of any preceding item, wherein step (i) further comprises:
- manually moving a lever of the beverage carbonator to an engaged position,
- wherein said engaging the carbonator inlet and said engaging the carbonator outlet valve are performed as a consequence of said manually moving the lever to the engaged position.

Item 10: The method of any preceding item, wherein:
- step (i) further comprises closing an exterior door to a carbonation chamber of the beverage carbonator, and
- said moving the lever of the beverage carbonator to an engaged position engages a door lock that inhibits the exterior door from opening.

Item 11: The method of any preceding item, further comprising:
- manually moving the lever to a disengaged position,
- wherein steps (ii) and (iii) are performed as a consequence of said manually moving the lever to the disengaged position, and the door lock remains engaged upon said manually moving the lever to the disengaged position.

Item 12: A beverage carbonation system comprising:
- a beverage container having a container inner volume, a container inlet valve, and a container outlet valve; and
- a beverage carbonator having a carbonator outlet valve, a carbonator inlet, a fluid flow path extending between the carbonator outlet valve and the carbonator inlet, and a user-operable container engagement actuator,
- wherein when the beverage container is connected to the beverage carbonator, the container engagement actuator is movable according to a disengagement sequence comprising, in order:
  - (i) a container engaged position, in which the beverage container inlet valve and the carbonator outlet valve are both open and fluidly coupled to each other, and the container outlet valve is open and fluidly coupled to the carbonator inlet,
  - (ii) a carbonator sealed position, in which the carbonator outlet valve is closed thereby sealing an above-atmospheric system pressure within the fluid flow path, and
  - (iii) simultaneously with or after (ii), a container sealed position, in which the container inlet valve and the container outlet valve are closed thereby hermetically sealing the container inner volume.

Item 13: The system of any preceding item, wherein the disengagement sequence further comprises:
- (iv) simultaneously with or after (iii), a container disengaged position, in which the carbonator outlet is unsealed from the container inlet, and the container outlet is unsealed from the carbonator inlet.

Item 14: The system of any preceding item, wherein:
- at least one of the beverage container and the beverage carbonator comprises an inlet seal,
- at least one of the beverage container and the beverage carbonator comprises an outlet seal, and
- in the container engaged position, the inlet seal seals the beverage container inlet to the carbonator outlet, and the outlet seal seals the beverage container outlet to the carbonator inlet.

Item 15: The system of any preceding item, wherein:
- the beverage carbonator comprises a carbonation chamber having a byproduct outlet, the byproduct outlet openable when the container engagement actuator is in the carbonator sealed position to vent the above-atmospheric system pressure through the byproduct outlet thereby emptying the carbonation chamber.

Item 16: The system of any preceding item, wherein:
- the carbonation chamber has an exterior door,
- the beverage carbonator comprises a door lock, the door lock having a locked position in which the door lock inhibits the exterior door from opening, and
- the door lock is in the locked position when the container engagement actuator is in the container engaged position.

Item 17: The system of any preceding item, wherein:
- the door lock remains in the locked position upon moving the container engagement actuator to the carbonator sealed position.

Item 18: The system of any preceding item, wherein:
- the container engagement actuator comprises a user-operable lever movable in a single motion to effect the disengagement sequence.

Item 19: The system of any preceding item, wherein:
- the beverage carbonator comprises a pump positioned in the fluid flow path,
- wherein when the container engagement actuator is in the carbonator sealed position, the pump cooperates with the carbonator outlet valve to seal the above-atmospheric system pressure within the fluid flow path.

Item 20: A method of carbonating a beverage comprising:
- pumping liquid from a reservoir across a flow valve to a carbonation chamber;
- generating carbon dioxide gas in the carbonation chamber from an aqueous solution including the pumped liquid and a carbonation source in the carbonation chamber;
- directing the generated carbon dioxide gas along a fluid flow path into contact with a beverage in a beverage container;
- toggling the flow valve in response to a system gas pressure exceeding a predetermined threshold, the flow valve when toggled fluidly disconnecting the reservoir from the pump and fluidly connecting the pump to the fluid flow path at a location downstream of the beverage container; and recirculating, using the pump, carbon dioxide gas exiting the beverage container back along the fluid flow path and back into the beverage container.

Item 21: The method of any preceding item, wherein:
the system gas pressure is a gas pressure of carbon dioxide exiting the beverage container.

Item 22: The method of any preceding item, wherein:
said toggling the flow valve comprises exposing the flow valve to carbon dioxide gas that has exited the beverage container and which has a gas pressure exceeding the predetermined threshold.

Item 23: The method of any preceding item, wherein said pumping liquid comprises:
accumulating a predetermined volume of the pumped liquid in the carbonation chamber prior to the pumped liquid contacting the carbonation source.

Item 24: The method of any preceding item, wherein:
the predetermined volume is at least 25% of a total volume of liquid pumped from the reservoir until said toggling the flow valve.

Item 25: The method of any preceding item, wherein said pumping liquid comprises:
raising a liquid level inside the carbonation chamber at least until the pumped liquid makes contact with the carbonation source, which is located within the carbonation chamber on an elevated surface.

Item 26: The method of any preceding item, wherein said contacting comprises:
bubbling the generated carbon dioxide through the beverage in the beverage container.

Item 27: A beverage carbonator comprising:
a carbonator outlet, a carbonator inlet, and a fluid flow path extending between the carbonator outlet and the carbonator inlet;
a carbonation chamber having a carbonation chamber gas outlet fluidly coupled to the fluid flow path, and a carbonation chamber fluid inlet;
a liquid reservoir positioned upstream from the carbonation chamber fluid inlet;
a flow valve movable between
  a reservoir-connected position in which the liquid reservoir is fluidly connected to the carbonation chamber fluid inlet and the flow valve inhibits gas flow from the carbonator inlet towards the carbonator outlet, and
  a gas-recirculation position in which the flow valve inhibits liquid flow from the liquid reservoir to the carbonation chamber fluid inlet and the carbonator inlet is fluidly connected to the carbonator outlet; and
a pump fluidly coupled to the fluid flow path downstream of the flow valve.

Item 28: The beverage carbonator of any preceding item, wherein:
the flow valve is biased to the reservoir-connected position, and movable to the gas-recirculation position in response to a system gas pressure within the beverage carbonator exceeding a predetermined threshold.

Item 29: The beverage carbonator of any preceding item, wherein:
the flow valve is biased to the reservoir-connected position, and movable to the reservoir-connected position in response to a system gas pressure exceeding a predetermined threshold in the fluid flow path between the carbonator inlet and the flow valve.

Item 30: The beverage carbonator of any preceding item, wherein:
the flow valve is positioned in the fluid flow path between the carbonator inlet and the carbonation chamber, and in the reservoir-connected position the flow valve closes the fluid flow path at a position between the carbonator inlet and the carbonation chamber.

Item 31: The beverage carbonator of any preceding item, wherein:
the pump is positioned in the fluid flow path between the flow valve and the carbonator outlet.

Item 32: The beverage carbonator of any preceding item, wherein:
the pump is positioned in the fluid flow path between the flow valve and the carbonation chamber fluid inlet.

Item 33: The beverage carbonator of any preceding item, wherein:
the carbonation chamber has an openable byproduct outlet,
the carbonator outlet has a carbonator outlet valve, and
when the carbonator outlet valve is closed and the pump is deactivated thereby sealing the fluid flow path from the carbonator outlet valve to the pump, the byproduct outlet is openable to vent gas pressure in the fluid flow path thereby evacuating the carbonation chamber.

Item 34: The beverage carbonator of any preceding item, wherein:
when the flow valve is in the reservoir-connected position, the fluid reservoir is connected to the flow path by the flow valve.

Item 35: A beverage carbonator comprising:
a carbonation chamber having a carbonation source inlet, a fluid inlet, a gas outlet, and a carbonation source carrier,
the carbonation source carrier positioned to receive carbonation source deposited into the carbonation chamber through the carbonation source inlet,
the carbonation source carrier and fluid inlet arranged to hold carbonation source carried on the carbonation source carrier apart from liquid admitted into the carbonation chamber through the fluid inlet until a predetermined volume of liquid has accumulated in the carbonation chamber.

Item 36: The beverage carbonator of any preceding item, wherein
the predetermined volume is at least 50 mL.

Item 37: The beverage carbonator of any preceding item, wherein:
the fluid inlet is positioned so that liquid admitted into the carbonation chamber through the fluid inlet accumulates initially in a first region of the carbonation chamber, and
the carbonation source carrier is positioned to carry carbonation source at an elevation above the first region.

Item 38: The beverage carbonator of any preceding item, wherein:
the carbonation source carrier comprises an upward facing support surface located below the carbonation source inlet, and above the fluid inlet.

Item 39: The beverage carbonator of any preceding item, wherein:
the carbonation source carrier has a lower liquid inlet, has an upper liquid outlet to the support surface, and defines a non-linear liquid flow path extending from the lower liquid inlet to the upper liquid outlet.

Item 40: The beverage carbonator of any preceding item, wherein the liquid flow path is tortuous.

Item 41: A method of generating carbon dioxide for a beverage, the method comprising:
depositing carbonation source through a carbonation source inlet of a carbonation chamber onto a carbonation source carrier within the carbonation chamber;
delivering a predetermined volume of liquid through a carbonation chamber fluid inlet into the carbonation chamber, the predetermined volume of liquid accumulating in the carbonation chamber without contacting the carbonation source; and
continuing to delivering liquid through the carbonation chamber fluid inlet into the carbonation chamber, the liquid contacting the carbonation source whereby carbon dioxide is generated.

Item 42: The method of any preceding item, wherein the predetermined volume is at least 50 mL.

Item 43: The method of any preceding item, further comprising:
carrying the carbonation source on a support surface of the carbonation source carrier located at an elevation above the fluid inlet.

Item 44: The method of any preceding item, wherein delivering said predetermined volume of liquid comprises:
directing the liquid through a non-linear liquid flow path extending from a lower liquid inlet of the carbonation source carrier to an upper liquid outlet of the carbonation source carrier.

Item 45: The method of any preceding item, wherein the liquid flow path is tortuous.

The invention claimed is:

1. A beverage carbonator comprising:
a carbonator outlet, a carbonator inlet, and a fluid flow path extending between the carbonator outlet and the carbonator inlet;
a carbonation chamber having a carbonation chamber gas outlet fluidly coupled to the fluid flow path, and a carbonation chamber fluid inlet;
a liquid reservoir positioned upstream from the carbonation chamber fluid inlet;
a flow valve movable between
a reservoir-connected position in which the liquid reservoir is fluidly connected to the carbonation chamber fluid inlet and the flow valve inhibits gas flow from the carbonator inlet towards the carbonator outlet, and
a gas-recirculation position in which the flow valve inhibits liquid flow from the liquid reservoir to the carbonation chamber fluid inlet and the carbonator inlet is fluidly connected to the carbonator outlet; and
a pump fluidly coupled to the fluid flow path downstream of the flow valve.

2. The beverage carbonator of claim 1, wherein:
the flow valve is biased to the reservoir-connected position, and movable to the gas-recirculation position in response to a system gas pressure within the beverage carbonator exceeding a predetermined threshold.

3. The beverage carbonator of claim 1, wherein:
the flow valve is biased to the reservoir-connected position, and movable to the reservoir-connected position in response to a system gas pressure exceeding a predetermined threshold in the fluid flow path between the carbonator inlet and the flow valve.

4. The beverage carbonator of claim 1, wherein:
the flow valve is positioned in the fluid flow path between the carbonator inlet and the carbonation chamber, and in the reservoir-connected position the flow valve closes the fluid flow path at a position between the carbonator inlet and the carbonation chamber.

5. The beverage carbonator of claim 4, wherein:
the pump is positioned in the fluid flow path between the flow valve and the carbonator outlet.

6. The beverage carbonator of claim 5, wherein:
the pump is positioned in the fluid flow path between the flow valve and the carbonation chamber fluid inlet.

7. The beverage carbonator of claim 6, wherein:
the carbonation chamber has an openable byproduct outlet,
the carbonator outlet has a carbonator outlet valve, and
when the carbonator outlet valve is closed and the pump is deactivated thereby sealing the fluid flow path from the carbonator outlet valve to the pump, the byproduct outlet is openable to vent gas pressure in the fluid flow path thereby evacuating the carbonation chamber.

8. The beverage carbonator of claim 4, wherein:
when the flow valve is in the reservoir-connected position, the fluid reservoir is connected to the flow path by the flow valve.

* * * * *